(12) United States Patent
Freeman et al.

(10) Patent No.: US 10,855,554 B2
(45) Date of Patent: Dec. 1, 2020

(54) SYSTEMS AND METHODS FOR DETERMINING SERVICE LEVEL AGREEMENT COMPLIANCE

(71) Applicant: Actifio, Inc., Waltham, MA (US)

(72) Inventors: Kenneth Freeman, Concord, MA (US); Jonathan Raymond Choate, Princeton, MA (US); Micah Waldman, Newton, MA (US); Rajendraprasad Basappa Hosamani, Lexington, MA (US); Michael Harold Salins, Aurora, IL (US); Vijay Kumar Pothireddy, Burlington, MA (US)

(73) Assignee: Actifio, Inc., Waltham, MA (US)

( * ) Notice: Subject to any disclaimer, the term of this patent is extended or adjusted under 35 U.S.C. 154(b) by 195 days.

(21) Appl. No.: 15/967,382

(22) Filed: Apr. 30, 2018

(65) Prior Publication Data

US 2018/0316577 A1 Nov. 1, 2018

Related U.S. Application Data

(60) Provisional application No. 62/491,761, filed on Apr. 28, 2017.

(51) Int. Cl.
*H04L 12/24* (2006.01)
(52) U.S. Cl.
CPC ...... *H04L 41/5009* (2013.01); *H04L 41/5019* (2013.01)
(58) Field of Classification Search
CPC .................. H04L 41/5009; H04L 41/5019
See application file for complete search history.

(56) References Cited

U.S. PATENT DOCUMENTS

| 4,626,829 A | 12/1986 | Hauck |
| 5,381,545 A | 1/1995 | Baker et al. |
| 5,410,667 A | 4/1995 | Belsan et al. |

(Continued)

OTHER PUBLICATIONS

Alapati, "NetApp Technical Report: SnapMirror Sync and SnapMirror Semi-Sync Overview and Design Considerations," NetApp, Jul. 2010 (24 pages).

(Continued)

*Primary Examiner* — Michael A Keller
*Assistant Examiner* — Jsing Forng Lin
(74) *Attorney, Agent, or Firm* — Wilmer Cutler Pickering Hale and Dorr LLP

(57) ABSTRACT

Iteratively determining compliance of a backup system with a service level agreement (SLA) of service level policies (SLPs), including receiving an SLP having a data management schedule and indicating a first backup time of a first backup job; determining an SLP schedule type of windowed or continuous based on the SLP, and a first compliance analysis time based on the SLP schedule type and the first backup time; determining a first monitoring event associated with the first compliance analysis time and with a first compliance analysis type; performing a first compliance analysis of the first compliance analysis type to generate a first compliance status of the first monitoring event; and creating a second monitoring event associated with a second analysis time based on the first compliance status, and with a second compliance analysis type, and being based on the first compliance status.

12 Claims, 29 Drawing Sheets

(56) References Cited

U.S. PATENT DOCUMENTS

| | | | |
|---|---|---|---|
| 5,497,483 | A | 3/1996 | Beardsley et al. |
| 5,535,381 | A | 7/1996 | Kopper |
| 5,819,292 | A | 10/1998 | Hitz et al. |
| 5,828,876 | A | 10/1998 | Fish et al. |
| 5,857,208 | A | 1/1999 | Ofek |
| 5,963,962 | A | 10/1999 | Hitz et al. |
| 6,065,018 | A | 5/2000 | Beier et al. |
| 6,081,875 | A | 6/2000 | Clifton et al. |
| 6,119,208 | A | 9/2000 | White et al. |
| 6,131,148 | A | 10/2000 | West et al. |
| 6,148,412 | A | 11/2000 | Cannon et al. |
| 6,163,856 | A | 12/2000 | Dion et al. |
| 6,192,444 | B1 | 2/2001 | White et al. |
| 6,199,146 | B1 | 3/2001 | Pence |
| 6,202,071 | B1 | 3/2001 | Keene |
| 6,212,531 | B1 | 4/2001 | Blea et al. |
| 6,226,759 | B1 | 5/2001 | Miller et al. |
| 6,269,381 | B1 | 7/2001 | St. Pierre et al. |
| 6,269,431 | B1 | 7/2001 | Dunham |
| 6,324,548 | B1 | 11/2001 | Sorenson |
| 6,330,614 | B1 | 12/2001 | Aggarwal et al. |
| 6,434,681 | B1 | 8/2002 | Armangau |
| 6,460,055 | B1 | 10/2002 | Midgley et al. |
| 6,484,186 | B1 | 11/2002 | Rungta |
| 6,487,561 | B1 | 11/2002 | Ofek et al. |
| 6,557,089 | B1 | 4/2003 | Reed et al. |
| 6,625,704 | B2 | 9/2003 | Winokur |
| 6,654,772 | B1 | 11/2003 | Crow et al. |
| 6,654,912 | B1 | 11/2003 | Viswanathan et al. |
| 6,665,815 | B1 | 12/2003 | Goldstein et al. |
| 6,668,264 | B1 | 12/2003 | Patterson et al. |
| 6,772,302 | B1 | 8/2004 | Thompson |
| 6,779,094 | B2 | 8/2004 | Selkirk et al. |
| 6,823,336 | B1 | 11/2004 | Srinivasan et al. |
| 6,823,436 | B2 | 11/2004 | Krishnamurthy |
| 6,850,929 | B2 | 2/2005 | Chang et al. |
| 6,898,688 | B2 | 5/2005 | Martin et al. |
| 6,915,397 | B2 | 7/2005 | Lubbers et al. |
| 6,928,526 | B1 | 8/2005 | Zhu et al. |
| 6,948,039 | B2 | 9/2005 | Biessener et al. |
| 6,957,362 | B2 | 10/2005 | Armangau |
| 7,072,916 | B1 | 7/2006 | Lewis et al. |
| 7,143,251 | B1 | 11/2006 | Patterson |
| 7,222,194 | B2 | 5/2007 | Kano et al. |
| 7,325,111 | B1 | 1/2008 | Jiang |
| 7,346,623 | B2 | 3/2008 | Prahlad et al. |
| 7,386,695 | B2 | 6/2008 | Fuente |
| 7,389,300 | B1 | 6/2008 | Shah et al. |
| 7,428,657 | B2 | 9/2008 | Yamasaki |
| 7,647,355 | B2 | 1/2010 | Best et al. |
| 7,689,633 | B1 | 3/2010 | Li et al. |
| 7,707,184 | B1 | 4/2010 | Zhang et al. |
| 7,814,128 | B2 | 10/2010 | Silvers et al. |
| 7,937,547 | B2 | 5/2011 | Liu et al. |
| 8,037,032 | B2 | 10/2011 | Pershin et al. |
| 8,139,575 | B2 | 3/2012 | Biran et al. |
| 8,150,808 | B2 | 4/2012 | Zha et al. |
| 8,180,740 | B1 | 5/2012 | Stager et al. |
| 8,180,742 | B2 | 5/2012 | Claudatos et al. |
| 8,299,944 | B2 | 10/2012 | Provenzano |
| 8,407,191 | B1 | 3/2013 | Nanda |
| 8,706,833 | B1 | 4/2014 | Bergant et al. |
| 8,788,769 | B2 | 7/2014 | Abercrombie et al. |
| 9,098,432 | B1 | 8/2015 | Bachu et al. |
| 2002/0129214 | A1 | 9/2002 | Sarkar |
| 2002/0183972 | A1* | 12/2002 | Enck .................. G06F 11/3409 702/186 |
| 2003/0101321 | A1 | 5/2003 | Ohran |
| 2003/0140070 | A1 | 7/2003 | Kaczmarski et al. |
| 2004/0199570 | A1 | 10/2004 | Terao |
| 2005/0066095 | A1 | 3/2005 | Mullick et al. |
| 2005/0165794 | A1 | 7/2005 | Mosescu |
| 2006/0047712 | A1 | 3/2006 | Shitomi et al. |
| 2006/0074945 | A1 | 4/2006 | Mori |
| 2006/0190243 | A1 | 8/2006 | Barkai et al. |
| 2007/0234361 | A1* | 10/2007 | Iannucci ................. G06F 9/485 718/100 |
| 2009/0222496 | A1 | 9/2009 | Liu et al. |
| 2009/0307285 | A1 | 12/2009 | Gipp et al. |
| 2011/0047405 | A1 | 2/2011 | Marowsky-Bree et al. |
| 2011/0184915 | A1 | 7/2011 | Wu et al. |
| 2011/0258161 | A1 | 10/2011 | Constantinescu et al. |
| 2012/0123999 | A1* | 5/2012 | Ashutosh ............ G06F 11/1453 707/618 |
| 2013/0339302 | A1 | 12/2013 | Zhang et al. |
| 2014/0052693 | A1 | 2/2014 | Zha et al. |
| 2015/0143064 | A1* | 5/2015 | Bhargava ............ G06F 11/1451 711/162 |
| 2016/0203054 | A1 | 7/2016 | Zhang et al. |
| 2016/0283335 | A1 | 9/2016 | Yao et al. |
| 2017/0068595 | A1 | 3/2017 | Nautiyal et al. |
| 2017/0132089 | A1* | 5/2017 | Roehrsheim ........ G06F 11/3452 |
| 2017/0250892 | A1* | 8/2017 | Cooper .................. G06F 21/44 |
| 2017/0324813 | A1* | 11/2017 | Jain .................... H04L 41/5009 |
| 2018/0067819 | A1* | 3/2018 | Kotha ................. G06F 11/1464 |

OTHER PUBLICATIONS

American Megatrends, Inc., "StorTrends/ManageTrends (Version 2.7) User's Guide for the StorTends 1300 Storage Appliance," Mar. 23, 2009 (378 pages).
Arrell et al., "Using RVA and SnapShot for Business Intelligence Applications with OS/390 and DB2," IBM, Redbooks, Aug. 1998 (70 pages).
Azagury et al., "Point-in-Time Copy: Yesterday, Today and Tomorrow," IBM Research Lab in Haifa, 2002 (pp. 259-270).
Baird, "Virtual Storage Architecture Guide (VSAG)," IEEE, 1995 (pp. 312-326).
Baker, "Disk-Based Mirroring Is A Lot More Than Just Safe," Computer Technology Review, 2000 (pp. 55-57).
Brown et al., "SnapMirror and SnapRestore: Advances in Snapshot Technology," (13 pages) retrieved online at <<https://web.archive.org/web/2011126183455/http://www.netapp.com/tech_library/3043.html>>.
Cederqvist et al., "Version Management with CVS," 1992 (122 pages).
Chang et al., "Performance Analysis of Two Frozen Image Based Backup/Restore Methods," IEEE International Conference on Electron Information Technology 2005, May 22-25, 2005 (7 pages).
Chapman et al., "SnapMirror® Best Practices Guide," Network Appliance, Inc., Apr. 2006 (63 pages).
Chatterjee et al., "Efficient Replication Leveraging Information Lifecycle Management in Data Storage Systems," US Provisional Patent Application filed Feb. 9, 2009 (25 pages).
Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).
Chutani et al., "The Episode File System," Usenix Association, Proceedings of the Winter 1992 Usenix Conference, San Francisco, California, Jan. 20-24, 1992 (19 pages).
CommVault, "CommVault® Simpana® Quick Recovery® Software for Critical Data Center Applications and File Systems," 2010 (35 pages).
Dantz Development Corporation, "Retrospect® User's Guide," 2002 (262 pages).
Degwekar, "Using SnapMirror® with SnapDrive® for Unix®," 2007 (11 pages).
Delphix Corp.'s Invalidity Contentions Under Patent L.R. 3-3, Jul. 24, 2014 (27 pages).
Edwards et al., "FlexVol: Flexible, Efficient File Volume Virtualization in WAFL," Usenix Association, Usenix '08: 2008 Usenix Annual Technical Conference, 2008 (pp. 129-142).
EMC Corporation, "Backup of Oracle in EMC Symmetrix Environments with EMC NetWorker PowerSnap," Aug. 2008 (25 pages).
EMC Corporation, "EMC Celerra Version 5.6 Technical Primer: SLA-Driven Replication with Celerra Replicator (V2): Technology Concepts and Business Considerations," Jul. 2008 (20 pages).

(56) References Cited

OTHER PUBLICATIONS

EMC Corporation, "EMC DL1500 and DL3000 with EMC NetWorker: Best Practices Planning," Jul. 2009 (36 pages).
EMC Corporation, "EMC TimeFinder Product Description Guide," 1998 (34 pages).
EMC Corporation, "Next-Generation Backup-to-Disk: Building the Foundation for Effective Operational Recovery Management," Jan. 31, 2005 (9 pages).
EMC Corporation, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, 2001 (4 pages).
Exhibit 1006 IPR2015-01689, File History for U.S. Appl. No. 12/947,393, filed Apr. 14, 2015 (108 pages).
Exhibit 1006v2 IPR2015-01689, Version 2, File History for U.S. Appl. No. 12/947,393, filed Nov. 16, 2010, (177 pages).
Exhibit 1006v3 IPR2015-01689, Version 3, File History for U.S. Appl. No. 12/947,393, filed Nov. 16, 2010, (150 pages).
Exhibit 1006v4 IPR2015-01689, Version 4, File History for U.S. Appl. No. 12/947,393, filed Nov. 16, 2010, (98 pages).
Exhibit 1007 IPR2015-01678, Microsoft Computer Dictionary Fourth Edition, Microsoft Press, Redmond, Washington, 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, filed Nov. 16, 2010, (100 pages).
Exhibit 1008v2 IPR2015-01678, Version 2, File History for U.S. Appl. No. 12/947,438, filed Nov. 16, 2010, (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," Apr. 1992 (20 pages), retrieved online at <<https://www.ietf.org/rfc/rfc1321.txt>>.
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("the '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("the '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).

(56) References Cited

OTHER PUBLICATIONS

Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade The European Online Magazine for the IT Professional, vol. 2, No. 6, Dec. 2001 (8 pages).
Garrett et al., "Syncsort Backup Express and NetApp: Advanced Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).

Green et al., "Designing a Fast, On-Line Backup System for a Log-Structured File System," Digital Technical Journal, vol. 8, No. 2, 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin II et al., "The Viva File System," Jun. 14, 1997 (26 pages), retrieved online at http://www.cs.wisc.edu/~shankar/Viva/viva.html>>.
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," Jun. 5, 1997 (15 pages), retrieved online at <<http://www.sgi.com/Technology/xfs-whitepaper.html>>.
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).
Innovation Data Processing, "FDR InstantBackup™ . . . Innovation Instant Solutions," 2 pages.
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, 2004 (10 pages).
Kim et al., "Volume Management in SAN Environment," IEEE, 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, 1996 (pp. 84-92).
Legato, "Legato NetWorker Release 6.1 UNIX Version: Administrator's Guide," 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).

(56) References Cited

OTHER PUBLICATIONS

Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," 2006 (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, filed Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).

Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, 2000 (pp. 1284-1291).
Schuettinger et al., "Helping DBAs Become More Efficient: NetApp Efficiency and Manageability Advantages," NetApp, Inc., Jul. 2009 (12 pages).
Rock Solid & Leading Data Back-Up, Unlimited Machines, Award Winning!, "Network Appliance Adds SnapRestore, SnapMirror to OnTap," Computergram International, Apr. 26, 1999 (2 pages).
Solter et al., "OpenSolaris™ Bible," Wiley Publishing, Inc., Indianapolis, Indiana, 2009 (9 pages).
Sweeney, "xFS In-core Inode Management," Nov. 29, 1993 (10 pages), retrieved online at <<http://linux-xfs.sgi.com/projects/xfs/design_docs/>>.
Symantec Corporation, "Symantec Backup Exec Quick Recovery & Off-Host Backup Solutions for Microsoft Exchange Server 2003 & Microsoft SQL Server," 2005 (9 pages).
Syncsort Incorporated, "Near-Instant Oracle Cloning with Syncsort AdvancedClient Technologies," 2007 (12 pages).
Syncsort Incorporated, "Syncsort Backup Express Advanced Recovery for NetApp," 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
Vmware, "Vmware Consolidated Backup: Best Practices and Deployment Considerations for SAN Environments," 2007 (39 pages), retrieved online at https://web.archive.org/web/20080804070141/http://www.vmware.com/files/pdf/vcb_best_practices>>.
Wolf, "VM Backup Bliss? The State of VM Data Protection in the Enterprise," Burton Group, Midvale, Utah, Aug. 1, 2007 (45 pages).
You et al., "Deep Store: An Archival Storage System Architecture," Proceedings of the 21st International Conference on Data Engineering, 2005 (12 pages).
Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).
Zhu et al., "Avoiding the Disk Bottleneck in the Data Domain Deduplication File System," Proceedings of the 6th Usenix Conference on File and Storage Technologies FAST 2008, San Jose, California, 2008 (14 pages).

\* cited by examiner

2400 Compliance History Database

| Field | Description |
|---|---|
| Id | the internal identifier |
| Policy | The policy involved |
| Appname | The name of the application involved |
| Jobclass | The class of jobs associated with the policy (snapshot, etc) |
| Checktime | The timestamp for when compliance was checked |
| Reasoncode | A code indicating the reason for the compliance transition |
| compliancestate | The compliance state at the time the record is created |
| Compliantdate | The data of the last time the application was in compliance |
| message | An informative message about the reason for the compliance transition |

FIG. 24

2600 Policy Database

| Field | Description |
|---|---|
| Id | Internal identifier |
| Name | Name of the policy |
| Schedule Type | The type of schedule – daily, weekly, etc. |
| Repeat interval | How often the schedule should execute |
| Selection | For schedule types that require it, defines the specific times that the policy should execute (for instance in a month by day policy – last Sunday of the month) |
| Exclusion | Dates or date patterns on which the schedule should not execute |
| RPO | The RPO of the policy |
| Retention | How long to retain the backups |
| Priority | The priority of the policy relative to other policies |
| isContinuous | A flag to indicate if the policy is continuous |
| Start time | The starting time for a windowed policy |
| End time | The ending time for a windowed policy |
| Compliance interval | How often compliance should be checked for the policy |

FIG. 26

2700 Job History Database

| Field | Description |
|---|---|
| Id | Internal identifier |
| Jobname | Name of the job |
| Hostname | Name of the host |
| Appname | Name of the application |
| Policyname | The name of the policy |
| jobclass | The type of job that was run (snapshot, etc.) |
| Startdate | Timestamp of when the job started |
| enddate | Timestamp of when the job ended |
| consistencydate | Timestamp of when the backup was taken |
| Status | The outcome of the job – success or failure |
| Message | Informative information about the job or details on why it failed. |

FIG. 27

2800 Monitoring Event Schedule Database

| Field | Description |
|---|---|
| Id | Internal identifier |
| Policyid | The id of the policy to analyze |
| nextchecktime | A timestamp of the next time an analysis needs to run for the given policy |
| checktype | The type of analysis to perform at nextchecktime |

FIG. 28

SYSTEMS AND METHODS FOR DETERMINING SERVICE LEVEL AGREEMENT COMPLIANCE

CROSS-REFERENCE TO RELATED APPLICATIONS

This application claims the benefit of U.S. Provisional Application No. 62/491,761, filed Apr. 28, 2017, the entire contents of which are hereby incorporated by reference herein.

TECHNICAL FIELD

This disclosure relates generally to data management, data protection, disaster recovery and business continuity. More specifically, this disclosure relates to managing data with service level agreements that may specify non-uniform copying of data, including data snapshot, backup and replication. In particular, the disclosure relates to determining compliance with a service level agreement.

BACKGROUND

The business requirements for managing the lifecycle of application data have been traditionally met by deploying multiple point solutions, each of which addresses a part of the lifecycle. This has resulted in a complex and expensive infrastructure where multiple copies of data are created and moved multiple times to individual storage repositories. The adoption of server virtualization has become a catalyst for simple, agile and low-cost compute infrastructure. This has led to larger deployments of virtual hosts and storage, further exacerbating the gap between the emerging compute models and the current data management implementations.

Applications that provide business services depend on storage of their data at various stages of its lifecycle. FIG. 1 shows a typical set of data management operations that would be applied to the data of an application such as a database underlying a business service such as payroll management. In order to provide a business service, application 102 requires primary data storage 122 with some contracted level of reliability and availability.

Backups 104 are made to guard against corruption or the primary data storage through hardware or software failure or human error. Typically backups may be made daily or weekly to local disk or tape 124, and moved less frequently (weekly or monthly) to a remote physically secure location 125.

Concurrent development and test 106 of new applications based on the same database requires a development team to have access to another copy of the data 126. Such a snapshot might be made weekly, depending on development schedules.

Compliance with legal or voluntary policies 108 may require that some data be retained for safely future access for some number of years; usually data is copied regularly (say, monthly) to a long-term archiving system 128.

Disaster Recovery services 110 guard against catastrophic loss of data if systems providing primary business services fail due to some physical disaster. Primary data is copied 130 to a physically distinct location as frequently as is feasible given other constraints (such as cost). In the event of a disaster the primary site can be reconstructed and data moved back from the safe copy.

Business Continuity services 112 provide a facility for ensuring continued business services should the primary site become compromised. Usually this requires a hot copy 132 of the primary data that is in near-lockstep with the primary data, as well as duplicate systems and applications and mechanisms for switching incoming requests to the Business Continuity servers.

Thus, data management is currently a collection of point applications managing the different parts of the lifecycle. This has been an artifact of evolution of data management solutions over the last two decades.

In addition, most computer software backup and disaster recovery products use a system based on counting to determine if a user's backup Service Level Agreement (SLA) has been met. They calculate the number of backup jobs expected to run during each backup window and report whether that number succeeded. For a typical daily schedule, one job per day would be expected. Other possible schedules could include backing up an application every hour during working hours (9-5) and/or backing up an app every 4 hours during a 12-hour overnight window (7 pm to 7 am). One problem with these counting systems is that they do not support other types of scheduling.

SUMMARY

In accordance with the disclosed subject matter, systems, methods, and non-transitory computer-readable media are provided for iteratively determining compliance of a backup system with a service level agreement.

The disclosed subject matter includes a method of iteratively determining compliance of a backup system with a service level agreement. The method includes receiving, by a computing device, a service level policy, the service level policy being associated with a service level agreement representing a plurality of service level policies, each of the plurality of service level policies including a schedule for performing data management functions for a corresponding application, the schedule indicating a first backup time of a first backup job. The method further includes determining, by the computing device, a first compliance analysis time and a service level policy schedule type, the service level policy schedule type being based on the service level policy, the service level policy schedule type being one of a windowed type and a continuous type, the first compliance analysis time being based on the service level policy schedule type and the first backup time. The method further includes determining, by the computing device, a first monitoring event associated with the first compliance analysis time, the first monitoring event associated with a first compliance analysis type, the first compliance analysis type including one of out-of-compliance, compliance, and end-of-window. The method further includes performing, by the computing device, a first compliance analysis associated with the first compliance analysis type to generate a first compliance status of the first monitoring event, the first compliance status including of one of an in-compliance status, an out-of-compliance status, and a no determination status. The method further includes creating, by the computing device, a second monitoring event, the second monitoring event associated with a second analysis time and a second compliance analysis type, the second compliance analysis type being based on the first compliance status and including one of out of compliance, compliance, and end of window, the second analysis time being based on the first compliance status, thereby iteratively determining compliance of a backup system with a service level agreement.

The disclosed subject matter includes a computing system for iteratively determining compliance of a backup system with a service level agreement. The computing system includes a processor, and a memory coupled to the processor and including instructions that, when executed by the processor, cause the processor to receive, by a computing device, a service level policy, the service level policy being associated with a service level agreement representing a plurality of service level policies, each of the plurality of service level policies including a schedule for performing data management functions for a corresponding application, the schedule indicating a first backup time of a first backup job. The memory further includes instructions that, when executed by the processor, cause the processor to determine, by the computing device, a first compliance analysis time and a service level policy schedule type, the service level policy schedule type being based on the service level policy, the service level policy schedule type being one of a windowed type and a continuous type, the first compliance analysis time being based on the service level policy schedule type and the first backup time. The memory further includes instructions that, when executed by the processor, cause the processor to determine, by the computing device, a first monitoring event associated with the first compliance analysis time, the first monitoring event associated with a first compliance analysis type, the first compliance analysis type including one of out-of-compliance, compliance, and end-of-window. The memory further includes instructions that, when executed by the processor, cause the processor to perform, by the computing device, a first compliance analysis associated with the first compliance analysis type to generate a first compliance status of the first monitoring event, the first compliance status including of one of an in-compliance status, an out-of-compliance status, and a no determination status. The memory further includes instructions that, when executed by the processor, cause the processor to create, by the computing device, a second monitoring event, the second monitoring event associated with a second analysis time and a second compliance analysis type, the second compliance analysis type being based on the first compliance status and including one of out of compliance, compliance, and end of window, the second analysis time being based on the first compliance status, thereby iteratively determining compliance of a backup system with a service level agreement.

The disclosed subject matter includes a non-transitory computer readable medium having executable instructions operable to cause an apparatus to transmit instructions for iteratively determining compliance of a backup system with a service level agreement. The non-transitory computer readable medium having executable instructions operable to cause an apparatus to receive, by a computing device, a service level policy, the service level policy being associated with a service level agreement representing a plurality of service level policies, each of the plurality of service level policies including a schedule for performing data management functions for a corresponding application, the schedule indicating a first backup time of a first backup job. The non-transitory computer readable medium having executable instructions operable to cause an apparatus to determine, by the computing device, a first compliance analysis time and a service level policy schedule type, the service level policy schedule type being based on the service level policy, the service level policy schedule type being one of a windowed type and a continuous type, the first compliance analysis time being based on the service level policy schedule type and the first backup time. The non-transitory computer readable medium having executable instructions operable to cause an apparatus to determine, by the computing device, a first monitoring event associated with the first compliance analysis time, the first monitoring event associated with a first compliance analysis type, the first compliance analysis type including one of out-of-compliance, compliance, and end-of-window. The non-transitory computer readable medium having executable instructions operable to cause an apparatus to perform, by the computing device, a first compliance analysis associated with the first compliance analysis type to generate a first compliance status of the first monitoring event, the first compliance status including of one of an in-compliance status, an out-of-compliance status, and a no determination status. The non-transitory computer readable medium having executable instructions operable to cause an apparatus to create, by the computing device, a second monitoring event, the second monitoring event associated with a second analysis time and a second compliance analysis type, the second compliance analysis type being based on the first compliance status and including one of out of compliance, compliance, and end of window, the second analysis time being based on the first compliance status, thereby iteratively determining compliance of a backup system with a service level agreement.

In some embodiments, the first backup job is associated with a first backup job success status, the first backup job success status indicating one of a successful status, an unsuccessful status, and a running status, the successful status indicating that the first backup job succeeded, the unsuccessful status indicating that the first backup job failed, and the running status indicating that the first backup job is currently running, and a first backup job consistency time when the first backup job is associated with the successful status, the first backup job consistency time indicating a restoration time associated with the first backup job. In some embodiments, the service level policy schedule type is associated with a compliance interval indicator when the service policy schedule type is associated with a compliance interval, the compliance interval being a maximum time window for performing a backup job to generate the in-compliance status.

In some embodiments, performing the first compliance analysis includes performing out-of-compliance analysis when the first compliance analysis type is the out-of-compliance, performing the out-of-compliance analysis includes generating, by the computing device, the first compliance status as the out-of-compliance status when one of the first backup job success status is the unsuccessful status, and the first backup job success status is the successful status and one of the service level policy schedule type is the windowed type and the first backup time is before a start time of a current analysis window, and the service level policy schedule type is the continuous type and the first backup job consistency time is before an analysis time of a last monitoring event; and generating, by the computing device, the first compliance status as the in-compliance status when one of the service level policy schedule type is the windowed type and the first backup time is after a start time of a current analysis window, and the service level policy schedule type is the continuous type and the first backup job consistency time is after an analysis time of a last monitoring event, and creating the second monitoring event further includes setting the second compliance analysis type as out-of-compliance when the first compliance status is out-of-compliance status, and setting the second compliance analysis type as compliance when the first compliance status is in-compliance status.

In some embodiments, performing the first compliance analysis includes performing compliance analysis when the first compliance analysis type is the compliance, performing the compliance analysis includes generating, by the computing device, the first compliance status as the out-of-compliance status when one of the first backup job success status is the unsuccessful status and the first backup time is between the first analysis time and after an analysis time of a last monitoring event, the first backup job success status is the successful status, the compliance interval indicator is compliance interval positive, the service level policy schedule type is the windowed type, and the first backup job consistency time is before the first analysis time less the consistency time, and the first backup job success status is successful, the compliance interval indicator is compliance interval positive, the service level policy schedule type is the continuous type, and the first backup job consistency time is one of before the first analysis time less the consistency time and before an analysis time of a last monitoring event; generating, by the computing device, the first compliance status as the in-compliance status when one of the first backup job success status is successful, the compliance interval indicator is compliance interval positive, the service level policy schedule type is the windowed type, and the first backup job consistency time is after the first analysis time less the consistency time, and the first backup job success status is successful, the compliance interval indicator is compliance interval positive, the service level policy schedule type is the continuous type, the first backup job consistency time is after the first analysis time less the consistency time and after an analysis time of a last monitoring event; and generating, by the computing device, the first compliance status as the no determination status when one of the first backup job success status is the unsuccessful status and the first backup time is outside the first analysis time and after an analysis time of a last monitoring event, and the first backup job success status is successful, the compliance interval indicator is compliance interval null.

In some embodiments, performing the first compliance analysis includes performing end-of-window analysis when the first compliance analysis type is the end-of-window, performing the end-of-window analysis includes at the end of a current analysis window, generating, by the computing device, the first compliance status as the out-of-compliance status when the first backup time is between a start time and an end time of a current analysis window, and the first backup job success status is the unsuccessful status; generating, by the computing device, the first compliance status as the in-compliance status when one of the first backup time is between a start time and an end time of the current analysis window, and the first backup job success status is the running status, and the first backup time is between a start time and an end time of the current analysis window, the first backup job success status is the successful status, and the compliance interval indicator is compliance interval positive; and generating, by the computing device, the first compliance status as the no determination status when one of the first backup time is outside a start time and an end time of the current analysis window, and the first backup time is between a start time and an end time of a current analysis window, the first backup job success status is the successful status, and the compliance interval indicator is compliance interval null.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 24 is a diagram of a compliance history database 2400, according to some embodiments of the present disclosure.

FIG. 26 is a diagram of a compliance database 2600, according to some embodiments of the present disclosure.

FIG. 27 is a diagram of a job history database 2700, according to some embodiments of the present disclosure.

FIG. 28 is a diagram of a monitoring event schedule database 2800, according to some embodiments of the present disclosure.

DETAILED DESCRIPTION

Figure 1:
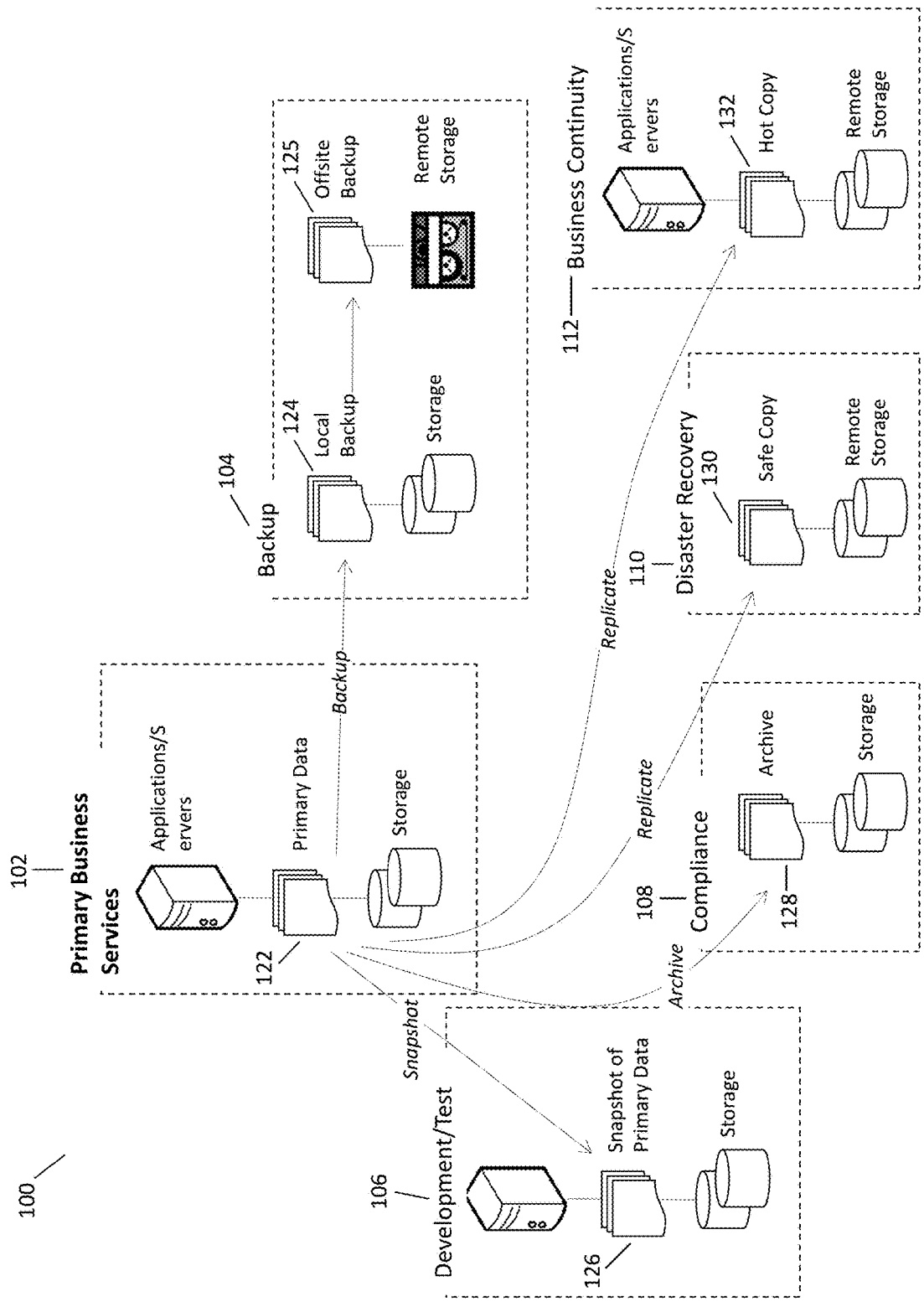
FIG. 1 is a simplified diagram of current methods deployed to manage the data lifecycle for a business service.

Current Data Management architecture and implementations such as described above involve multiple applications addressing different parts of data lifecycle management, all of them performing certain common functions: (a) make a copy of application data (the frequency of this action is commonly termed the Recovery Point Objective (RPO)), (b) store the copy of data in an exclusive storage repository, typically in a proprietary format, and (c) retain the copy for certain duration, measured as Retention Time. A primary difference in each of the point solutions is in the frequency of the RPO, the Retention Time, and the characteristics of the individual storage repositories used, including capacity, cost and geographic location.

This disclosure pertains to Data Management Virtualization. Data Management activities, such as Backup, Replication and Archiving are virtualized in that they do not have to be configured and run individually and separately. Instead, the user defines their business requirement with regard to the lifecycle of the data, and the Data Management Virtualization System performs these operations automatically. A snapshot is taken from primary storage to secondary storage; this snapshot is then used for a backup operation to other secondary storage. Essentially an arbitrary number of these backups may be made, providing a level of data protection specified by a Service Level Agreement.

This disclosure also pertains to a system for managing data in accordance with service level agreements (SLAs) that specify schedules on a calendar basis for performing prescribed data management functions and for reducing inter-function redundancy. This system may include a data management engine for performing data management functions, including at least a snapshot function, and at least one back-up function. The data management engine may include a service level policy engine that receives SLAs in electronic form and which controls the scheduling of the data management functions in accordance with the SLAs. Each electronic SLA may be associated with a corresponding application that uses data and may specify at least one service level policy, each policy specifying a source pool for data, a destination pool where a copy should be made of the source pool data, a copy frequency indicating the frequency of operation for that policy, a retention period indicating how long a given copy should be retained before being allowed to expire, and schedule information indicating hours and days of operation when the policy is in place, such that a collection of policies within a SLA is capable of expressing a non-uniform schedule for when a given function should be performed and is capable of expressing multiple data management functions that should be performed on a given source of data. The data management engine may perform preparatory operations with the application and with the source pool so that the source pool of data has a coherent image of data to be copied, and these preparatory operations may be performed only once even if the SLA specifies multiple data management functions to be performed on that source pool at the current time.

Data Management Virtualization technology according to this disclosure is based on an architecture and implementation based on the following guiding principles.

First, define the business requirements of an application with a Service Level Agreement (SLA) for its entire data lifecycle. The SLA is much more than a single RPO, Retention and Recovery Time Objective (RTO). It describes the data protection characteristics for each stage of the data lifecycle. Each application may have a different SLA.

Second, provide a unified Data Management Virtualization Engine that manages the data protection lifecycle, moving data across the various storage repositories, with improved storage capacity and network bandwidth. The Data Management Virtualization system achieves these improvements by leveraging extended capabilities of modern storage systems by tracking the portions of the data that have changed over time and by data deduplication and compression algorithms that reduce the amount of data that needs to be copied and moved.

Third, leverage a single master copy of the application data to be the basis for multiple elements within the lifecycle. Many of the Data Management operations such as backup, archival and replication depend on a stable, consistent copy of the data to be protected. The Data Management Virtualization System leverages a single copy of the data for multiple purposes. A single instance of the data maintained by the system may serve as the source, from which each data management function may make additional copies as needed. This contrasts with requiring application data to be copied multiple times by multiple independent data management applications in the traditional approach.

Fourth, abstracting physical storage resources into a series of data protection storage pools, which are virtualized out of different classes of storage including local and remote disk, solid state memory, tape and optical media, private, public and/or hybrid storage clouds. The storage pools provide access independent of the type, physical location or underlying storage technology. Business requirements for the lifecycle of data may call for copying the data to different types of storage media at different times. The Data Management Virtualization system allows the user to classify and aggregate different storage media into storage pools, for example, a Quick Recovery Pool, which consists of high speed disks, and a Cost Efficient Long-term Storage Pool, which may be a deduplicated store on high capacity disks, or a tape library. The Data Management Virtualization System can move data amongst these pools to take advantage of the unique characteristics of each storage medium. The abstraction of Storage Pools provides access independent of the type, physical location or underlying storage technology.

Fifth, improve the movement of the data between storage pools and disaster locations utilizing underlying device capabilities and post-deduplicated application data. The Data Management Virtualization System discovers the capabilities of the storage systems that comprise the Storage Pools, and takes advantage of these capabilities to move data efficiently. If the Storage System is a disk array that supports the capability of creating a snapshot or clone of a data volume, the Data Management Virtualization System will take advantage of this capability and use a snapshot to make a copy of the data rather than reading the data from one place and writing it to another. Similarly, if a storage system supports change tracking, the Data Management Virtualization System will update an older copy with just the changes to efficiently create a new copy. When moving data across a network, the Data Management Virtualization system uses a deduplication and compression algorithm that avoids sending data that is already available on the other side of the network.

One key aspect of improving data movement is recognizing that application data changes slowly over time. A copy of an application that is made today will, in general, have a lot of similarities to the copy of the same application that was made yesterday. In fact today's copy of the data could be represented as yesterday's copy with a series of delta transformations, where the size of the delta transformations themselves are usually much smaller than all of the data in the copy itself. The Data Management Virtualization system captures and records these transformations in the form of bitmaps or extent lists. In one embodiment of the system, the underlying storage resources—a disk array or server virtualization system—are capable of tracking the changes made to a volume or file; in these environments, the Data Management Virtualization system queries the storage resources to obtain these change lists, and saves them with the data being protected.

In the preferred embodiment of the Data Management Virtualization system, there is a mechanism for eavesdropping on the primary data access path of the application, which enables the Data Management Virtualization system to observe which parts of the application data are modified, and to generate its own bitmap of modified data. If, for example, the application modifies blocks 100, 200 and 300 during a particular period, the Data Management Virtualization system will eavesdrop on these events, and create a bitmap that indicates that these particular blocks were modified. When processing the next copy of application data, the Data Management Virtualization system will only process blocks 100, 200 and 300 since it knows that these were the only blocks that were modified.

In one embodiment of the system, where the primary storage for the application is a modern disk array or storage virtualization appliance, the Data Management Virtualization system takes advantage of a point-in-time snapshot capability of an underlying storage device to make the initial copy of the data. This virtual copy mechanism is a fast, efficient and low-impact technique of creating the initial copy that does not guarantee that all the bits will be copied, or stored together. Instead, virtual copies are constructed by maintaining metadata and data structures, such as copy-on-write volume bitmaps or extents, that allow the copies to be reconstructed at access time. The copy has a lightweight impact on the application and on the primary storage device. In another embodiment, where the application is based on a Server Virtualization System such as VMware or Xen, the Data Management Virtualization system uses the similar virtual-machine-snapshot capability that is built into the Server Virtualization systems. When a virtual copy capability is not available, the Data Management Virtualization System may include its own built-in snapshot mechanism.

It is possible to use the snapshot as a data primitive underlying all of the data management functions supported by the system. Because it is lightweight, the snapshot can be used as an internal operation even when the requested operation is not a snapshot per se; it is created to enable and facilitate other operations.

At the time of creation of a snapshot, there may be certain preparatory operations involved in order to create a coherent snapshot or coherent image, such that the image may be restored to a state that is usable by the application. These preparatory operations need only be performed once, even if the snapshot will be leveraged across multiple data management functions in the system, such as backup copies which are scheduled according to a policy. The preparatory operations may include application quiescence, which includes flushing data caches and freezing the state of the application; it may also include other operations known in the art and other operations useful for retaining a complete image, such as collecting metadata information from the application to be stored with the image.

Systems and methods are also disclosed for calculating compliance with Service Level Agreements for a backup or disaster-recovery system. In some embodiments the calculation for compliance is based on user-settable time thresholds for job success. For example, continuous backup schedules can define a threshold based on a recovery point objective, measured as the elapsed time since the consistency time of the previous successful backup job. In some embodiments, windowed schedules that expect one job to complete in each window define a threshold as the time since the start of the backup window. Windowed schedules that expect multiple jobs to complete during the window define the threshold for the first job as the time since the start of the window, and the threshold for subsequent jobs as the time since the consistency time of the previous successful job. Schedules that depend on other schedules, such as schedules to de-duplicate or vault a snapshot image, measure compliance based upon both their own schedule settings and those of the underlying snapshot policy.

In addition, embodiments of the systems and methods described herein provide visualizations of time in compliance and violation and to highlight all applications that have been in violation for an extended period of time. It also includes a mechanism to notify users of both actual violations and pending violations before the violation occurs.

The service level policy engine and data management virtualization engine are described in more detail in U.S. application Ser. No. 12/947,385, titled "System and Method for Managing Data with Service Level Agreements That May Specify Non-Uniform Copying of Data," filed Nov. 16, 2010, the contents of which are incorporated herein by reference.

Figure 2:
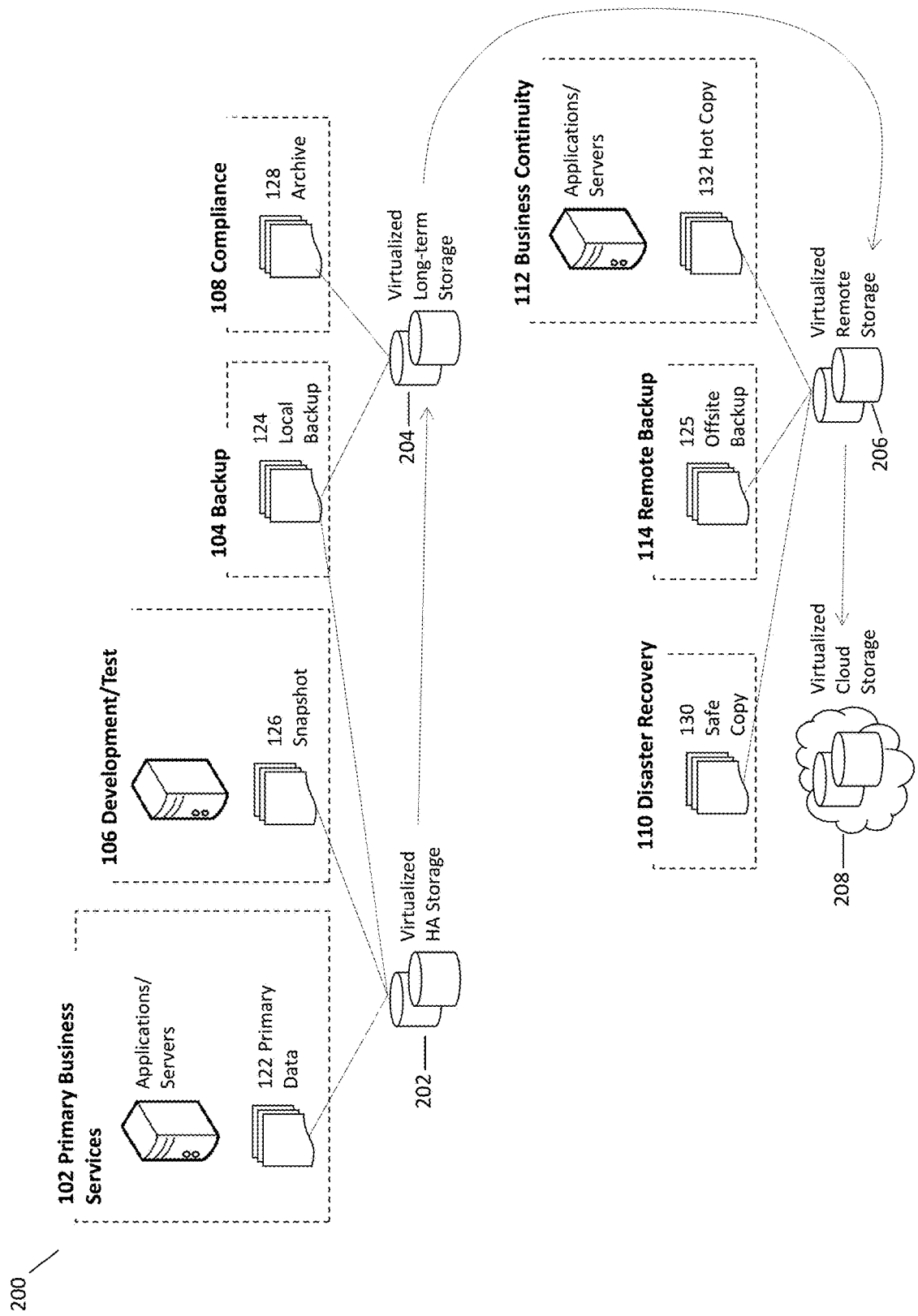
FIG. 2 is an overview of the management of data throughout its lifecycle by a single Data Management Virtualization System.

FIG. 2 illustrates one way that a Virtualized Data Management system can address the data lifecycle requirements described earlier in accordance with these principles.

To serve local backup requirements, a sequence of efficient snapshots are made within local high-availability storage 202. Some of these snapshots are used to serve development/test requirements without making another copy. For longer term retention of local backup, a copy is made efficiently into long-term local storage 204, which in this implementation uses deduplication to reduce repeated copying. The copies within long-term storage may be accessed as backups or treated as an archive, depending on the retention policy applied by the SLA. A copy of the data is made to remote storage 206 in order to satisfy requirements for remote backup and business continuity—again a single set of copies suffices both purposes. As an alternative for remote backup and disaster recovery, a further copy of the data may be made efficiently to a repository 208 hosted by a commercial or private cloud storage provider. An SLA Compliance System may check whether the Virtualized Data Management system is in compliance with the SLA or whether there has been a violation.

The Data Management Virtualization System

Figure 3:
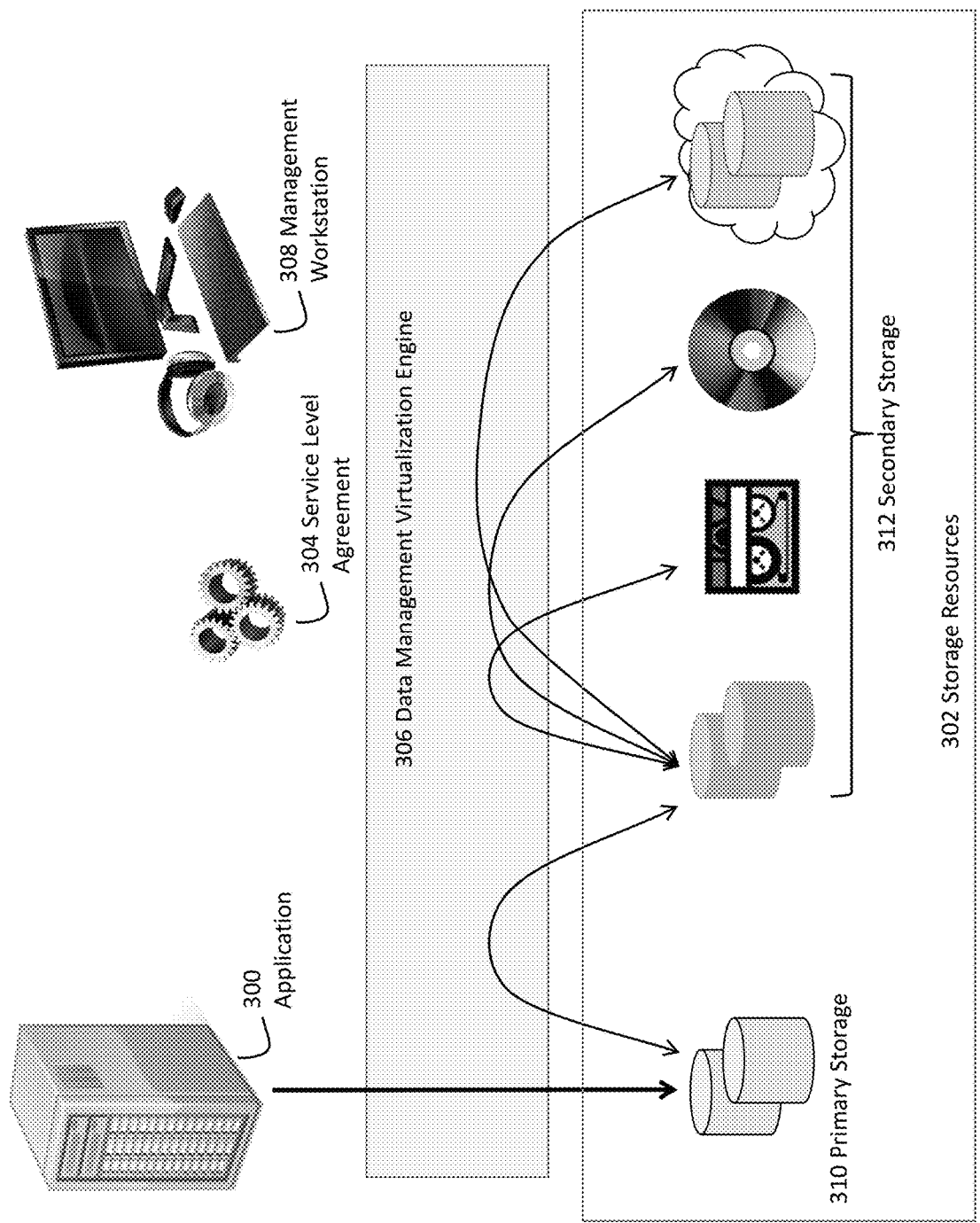
FIG. 3 is a simplified block diagram of the Data Management Virtualization system.

FIG. 3 illustrates the high level components of the Data Management Virtualization System that implements the above principles. Preferably, the system comprises these basic functional components further described below.

Application 300 creates and owns the data. This is the software system that has been deployed by the user, as for example, an email system, a database system, or financial reporting system, in order to satisfy some computational need. The Application typically runs on a server and utilizes storage. For illustrative purposes, only one application has been indicated. In reality there may be hundreds or even thousands of applications that are managed by a single Data Management Virtualization System.

Storage Resources 302 is where application data is stored through its lifecycle. The Storage Resources are the physical storage assets, including internal disk drives, disk arrays, optical and tape storage libraries and cloud-based storage systems that the user has acquired to address data storage requirements. The storage resources consist of Primary Storage 310, where the online, active copy of the application data is stored, and Secondary Storage 312 where additional copies of the application data are stored for the purposes such as backup, disaster recovery, archiving, indexing, reporting and other uses. Secondary storage resources may include additional storage within the same enclosure as the primary storage, as well as storage based on similar or different storage technologies within the same data center, another location or across the internet.

One or more Management Workstations 308 allow the user to specify a Service Level Agreement (SLA) 304 that defines the lifecycle for the application data. A Management workstation is a desktop or laptop computer or a mobile computing device that is used to configure, monitor and control the Data Management Virtualization System. A Service Level Agreement is a detailed specification that captures the detailed business requirements related to the creation, retention and deletion of secondary copies of the application data. The SLA is much more than the simple RTO and RPO that are used in traditional data management applications to represent the frequency of copies and the anticipated restore time for a single class of secondary storage. The SLA captures the multiple stages in the data lifecycle specification, and allows for non uniform frequency and retention specifications within each class of secondary storage. The SLA is described in greater detail in FIG. 7.

Data Management Virtualization Engine 306 manages all of the lifecycle of the application data as specified in SLA. It manages potentially a large number of SLAs for a large number of applications. The Data Management Virtualization Engine takes inputs from the user through the Management Workstation and interacts with the applications to discover the applications primary storage resources. The Data Management Virtualization Engine makes decisions regarding what data needs to be protected and what secondary storage resources best fulfill the protection needs. For example, if an enterprise designates its accounting data as requiring copies to be made at very short intervals for business continuity purposes as well as for backup purposes, the Engine may decide to create copies of the accounting data at a short interval to a first storage pool, and to also create backup copies of the accounting data to a second storage pool at a longer interval, according to an appropriate set of SLAs. This is determined by the business requirements of the storage application.

The Engine then makes copies of application data using advanced capabilities of the storage resources as available. In the above example, the Engine may schedule the short-interval business continuity copy using a storage appliance's built-in virtual copy or snapshot capabilities. Data Management Virtualization Engine moves the application data amongst the storage resources in order to satisfy the business requirements that are captured in the SLA. The Data Management Virtualization Engine is described in greater detail in FIG. 4.

An SLA Compliance Engine 450 can be included to check whether the Virtual Data Management System is in compliance with the SLA, or whether there has been a violation. The SLA Compliance Engine 450 can also include local storage 452. As described in more detail below, local storage includes compliance information (e.g., backup job status information) that SLA Compliance Engine 450 uses to determine whether a backup job is in compliance. The SLA Compliance Engine 450 can reside within the Data Management Virtualization Engine, or can be separately provided. The SLA Compliance Engine 450 is described in greater detail in FIGS. 11-28.

The Data Management Virtualization System as a whole may be deployed within a single host computer system or appliance, or it may be one logical entity but physically distributed across a network of general-purpose and purpose-built systems. Certain components of the system may also be deployed within a computing or storage cloud.

In one embodiment of the Data Management Virtualization System the Data Management Virtualization Engine largely runs as multiple processes on a fault tolerant, redundant pair of computers. Certain components of the Data Management Virtualization Engine may run close to the application within the application servers. Some other components may run close to the primary and secondary storage, within the storage fabric or in the storage systems themselves. The Management stations are typically desktop and laptop computers and mobile devices that connect over a secure network to the Engine.

The Data Management Virtualization Engine

Figure 4:
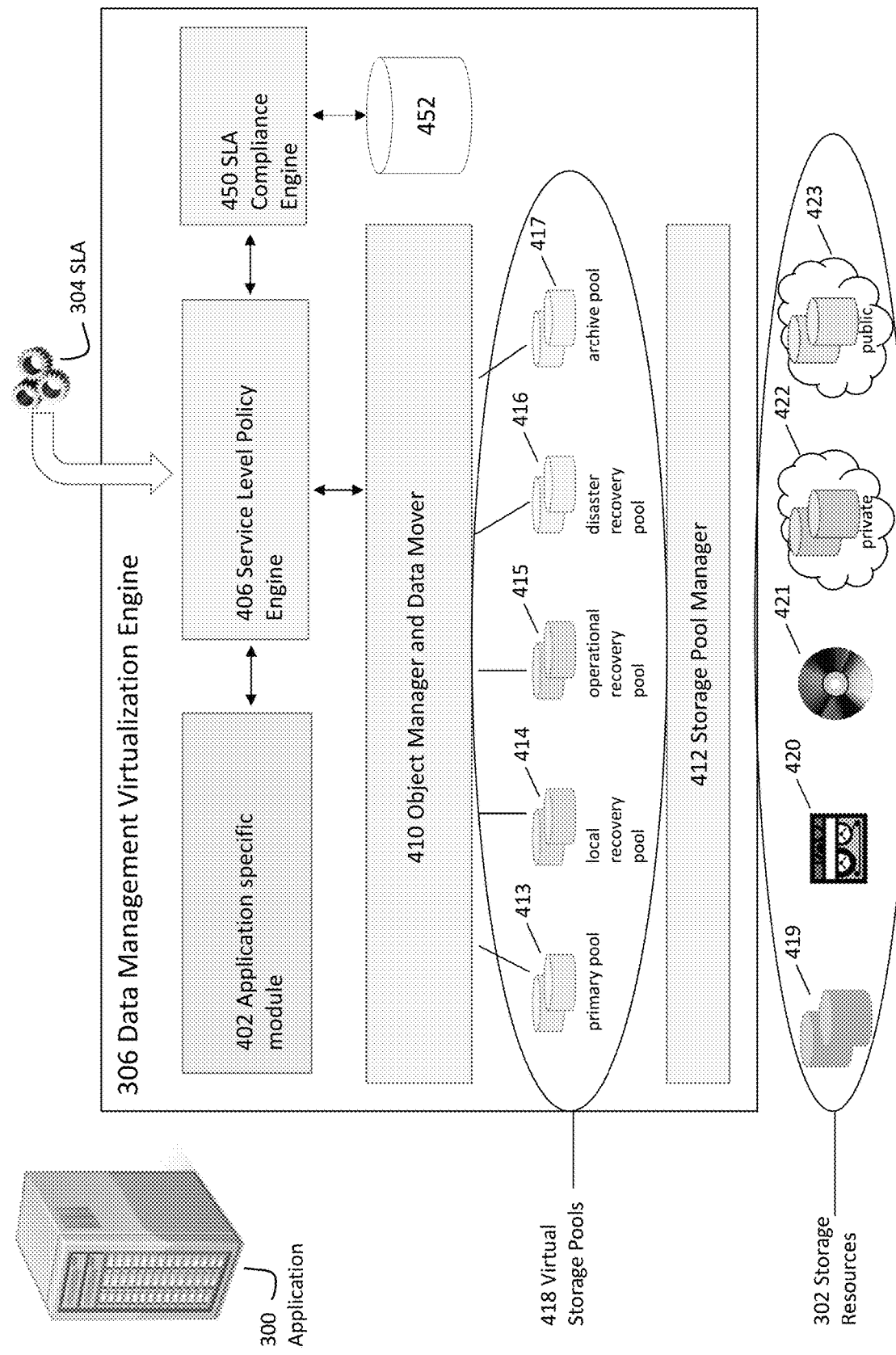
FIG. 4 is a view of the Data Management Virtualization Engine.

FIG. 4 illustrates an architectural overview of the Data Management Virtualization Engine 306 according to certain embodiments of the disclosure. The 306 Engine includes the following modules:

Application Specific Module 402: This module is responsible for controlling and collecting metadata from the application 300. Application metadata includes information about the application such as the type of application, details about its configuration, location of its datastores, its current operating state. Controlling the operation of the application includes actions such as flushing cached data to disk, freezing and thawing application I/O, rotating or truncating log files, and shutting down and restarting applications. The Application Specific module performs these operations and sends and receives metadata in responses to commands from the Service Level Policy Engine 406, described below. The Application Specific Module is described in more detail in connection with FIG. 8.

Service Level Policy Engine 406 acts on the SLA 304 provided by the user to make decisions regarding the creation, movement and deletion of copies of the application data. Each SLA describes the business requirements related to protection of one application. The Service Level Policy Engine analyzes each SLA and arrives at a series of actions each of which involve the copying of application data from one storage location to another. The Service Level Policy Engine then reviews these actions to determine priorities and dependencies, and schedules and initiates the data movement jobs. The Service Level Policy Engine is described in more detail in connection with FIG. 9.

Object Manager and Data Movement Engine 410 creates a composite object consisting of the Application data, the Application Metadata and the SLA which it moves through different storage pools per instruction from the Policy Engine. The Object Manager receives instructions from the Service Policy Engine 406 in the form of a command to create a copy of application data in a particular pool based on the live primary data 413 belonging to the application 300, or from an existing copy, e.g., 415, in another pool. The copy of the composite object that is created by the Object Manager and the Data Movement Engine is self contained and self describing in that it contains not only application data, but also application metadata and the SLA for the application. The Object Manager and Data Movement Engine are described in more detail in connection with FIG. 5.

Storage Pool Manager 412 is a component that adapts and abstracts the underlying physical storage resources 302 and presents them as virtual storage pools 418. The physical storage resources are the actual storage assets, such as disk arrays and tape libraries that the user has deployed for the purpose of supporting the lifecycle of the data of the user's applications. These storage resources might be based on different storage technologies such as disk, tape, flash memory or optical storage. The storage resources may also have different geographic locations, cost and speed attributes, and may support different protocols. The role of the Storage Pool Manager is to combine and aggregate the storage resources, and mask the differences between their programming interfaces. The Storage Pool Manager presents the physical storage resources to the Object Manager 410 as a set of storage pools that have characteristics that make these pools suitable for particular stages in the lifecycle of application data. The Storage Pool Manager is described in more detail in connection with FIG. 6.

The Service Level Policy Engine 406 may also have a SLA Compliance Engine 450 to check whether the Virtualized Data Management system is in compliance with the SLA, or whether there has been a violation. The SLA Compliance Engine 450 may alternatively reside in the Data Management Virtualization Engine 306 as shown in FIG. 4, or it may be provided separate from the Data Management Virtualization Engine 306. The SLA Compliance Engine 450 receives information about the SLA 304 and what actions have been taken from the Service Level Policy Engine 406. The SLA Compliance Engine 450 is described in more detail in connection with FIGS. 11-28.

Object Manager and Data Movement Engine

Figure 5:
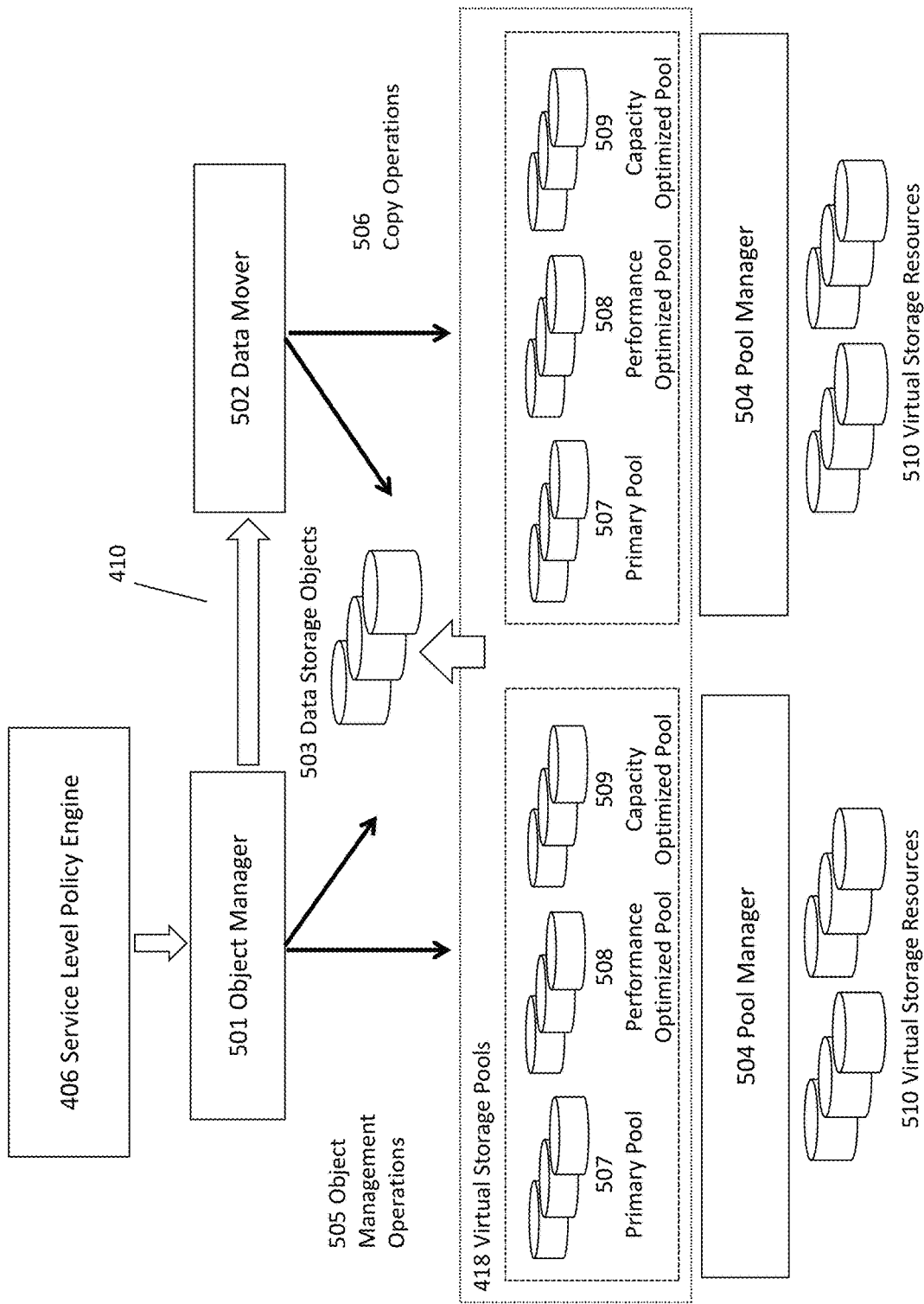
FIG. 5 illustrates the Object Management and Data Movement Engine.

FIG. 5 illustrates the Object Manager and Data Movement Engine 410. The Object Manager and Data Movement Engine discovers and uses Virtual Storage Resources 510 presented to it by the Pool Managers 504. It accepts requests from the Service Level Policy Engine 406 to create and maintain Data Storage Object instances from the resources in a Virtual Storage Pool, and it copies application data among instances of storage objects from the Virtual Storage Pools according to the instructions from the Service Level Policy Engine. The target pool selected for the copy implicitly designates the business operation being selected, e.g. backup, replication or restore. The Service Level Policy Engine resides either locally to the Object Manager (on the same system) or remotely, and communicates using a protocol over standard networking communication. TCP/IP may be used in a preferred embodiment, as it is well understood, widely available, and allows the Service Level Policy Engine to be located locally to the Object Manager or remotely with little modification.

In one embodiment, the system may deploy the Service Level Policy Engine on the same computer system as the Object Manager for ease of implementation. In another embodiment, the system may employ multiple systems, each hosting a subset of the components if beneficial or convenient for an application, without changing the design.

The Object Manager 501 and the Storage Pool Managers 504 are software components that may reside on the computer system platform that interconnects the storage resources and the computer systems that use those storage resources, where the user's application resides. The placement of these software components on the interconnect platform is designated as a preferred embodiment, and may provide the ability to connect customer systems to storage via communication protocols widely used for such applications (e.g. Fibre Channel, iSCSI, etc.), and may also provide ease of deployment of the various software components.

The Object Manager 501 and Storage Pool Manager 504 communicate with the underlying storage virtualization platform via the Application Programming Interfaces made available by the platform. These interfaces allow the software components to query and control the behavior of the computer system and how it interconnects the storage resources and the computer system where the user's Application resides. The components apply modularity techniques as is common within the practice to allow replacement of the intercommunication code particular to a given platform.

The Object Manager and Storage Pool Managers communicate via a protocol. These are transmitted over standard networking protocols, e.g. TCP/IP, or standard Interprocess Communication (IPC) mechanisms typically available on the computer system. This allows comparable communication between the components if they reside on the same computer platform or on multiple computer platforms connected by a network, depending on the particular computer platform. The current configuration has all of the local software components residing on the same computer system for ease of deployment. This is not a strict requirement of the design, as described above, and can be reconfigured in the future as needed.

Object Manager

Object Manager 501 is a software component for maintaining Data Storage Objects, and provides a set of protocol operations to control it. The operations include creation, destruction, duplication, and copying of data among the objects, maintaining access to objects, and in particular allow the specification of the storage pool used to create copies. There is no common subset of functions supported by all pools; however, in a preferred embodiment, primary pools may be performance-optimized, i.e. lower latency, whereas backup or replication pools may be capacity-optimized, supporting larger quantities of data and content-addressable. The pools may be remote or local. The storage pools are classified according to various criteria, including means by which a user may make a business decision, e.g. cost per gigabyte of storage.

First, the particular storage device from which the storage is drawn may be a consideration, as equipment is allocated for different business purposes, along with associated cost and other practical considerations. Some devices may not even be actual hardware but capacity provided as a service, and selection of such a resource can be done for practical business purposes.

Second, the network topological "proximity" is considered, as near storage is typically connected by low-latency, inexpensive network resources, while distant storage may be connected by high-latency, bandwidth limited expensive network resources; conversely, the distance of a storage pool relative to the source may be beneficial when geographic diversity protects against a physical disaster affecting local resources.

Third, storage optimization characteristics are considered, where some storage is optimized for space-efficient storage, but requires computation time and resources to analyze or transform the data before it can be stored, while other storage by comparison is "performance optimized," taking more storage resources by comparison but using comparatively little computation time or resource to transform the data, if at all.

Fourth, "speed of access" characteristics are considered, where some resources intrinsic to a storage computer platform are readily and quickly made available to the user's Application, e.g. as a virtual SCSI block device, while some can only be indirectly used. These ease and speed of recovery is often governed by the kind of storage used, and this allows it to be suitably classified.

Fifth, the amount of storage used and the amount available in a given pool are considered, as there may be benefit to either concentrating or spreading the storage capacity used.

The Service Level Policy Engine, described below, combines the SLA provided by the user with the classification criteria to determine how and when to maintain the application data, and from which storage pools to draw the needed resources to meet the Service Level Agreement (SLA).

The object manager 501 creates, maintains and employs a history mechanism to track the series of operations performed on a data object within the performance pools, and to correlate those operations with others that move the object to other storage pools, in particular capacity-optimized ones. This series of records for each data object is maintained at the object manager for all data objects in the primary pool, initially correlated by primary data object, then correlated by operation order: a time line for each object and a list of all such time lines. Each operation performed exploits underlying virtualization primitives to capture the state of the data object at a given point in time.

Additionally, the underlying storage virtualization appliance may be modified to expose and allow retrieval of internal data structures, such as bitmaps, that indicate the modification of portions of the data within the data object. These data structures are exploited to capture the state of a data object at a point in time: e.g., a snapshot of the data object, and to provide differences between snapshots taken at a specific time, and thereby enables optimal backup and restore. While the particular implementations and data structures may vary among different appliances from different vendors, a data structure is employed to track changes to the data object, and storage is employed to retain the original state of those portions of the object that have changed: indications in the data structure correspond to data retained in the storage. When accessing the snapshot, the data structure is consulted and for portions that have been changed, the preserved data is accessed rather than the current data, as the data object has been modified at the areas so indicated. A typical data structure employed is a bitmap, where each bit corresponds to a section of the data object. Setting the bit indicates that section has been modified after the point in time of the snapshot operation. The underlying snapshot primitive mechanism maintains this for as long as the snapshot object exists.

The time line described above maintains a list of the snapshot operations against a given primary data object, including the time an operation is started, the time it is stopped (if at all), a reference to the snapshot object, and a reference to the internal data structure (e.g. bitmaps or extent lists), so that it can be obtained from the underlying system. Also maintained is a reference to the result of copying the state of the data object at any given point in time into another pool—as an example, copying the state of a data object into a capacity-optimized pool 407 using content addressing results in an object handle. That object handle corresponds to a given snapshot and is stored with the snapshot operation in the time line. This correlation is used to identify suitable starting points.

Optimal backup and restore consult the list of operations from a desired starting point to an end point. A time ordered list of operations and their corresponding data structures (bitmaps) are constructed such that a continuous time series from start to finish is realized: there is no gap between start times of the operations in the series. This ensures that all changes to the data object are represented by the corresponding bitmap data structures. It is not necessary to retrieve all operations from start to finish; simultaneously existing data objects and underlying snapshots overlap in time; it is only necessary that there are no gaps in time where a change might have occurred that was not tracked. As bitmaps indicate that a certain block of storage has changed but not what the change is, the bitmaps may be added or composed together to realize a set of all changes that occurred in the time interval. Instead of using this data structure to access the state at a point in time, the system instead exploits the fact that the data structure represents data modified as time marches forward. Rather, the end state of the data object is accessed at the indicated areas, thus returning the set of changes to the given data object from the given start time to the end time.

The backup operation exploits this time line, the correlated references, and access to the internal data structures to realize our backup operation. Similarly, it uses the system in a complementary fashion to accomplish our restore operation. The specific steps are described below in the section for "Optimal Backup/Restore."

Virtual Storage Pool Types

FIG. 5 illustrates several representative storage pool types. Although one primary storage pool and two secondary storage pools are depicted in the figure, many more may be configured in some embodiments.

Primary Storage Pool 507—contains the storage resources used to create the data objects in which the user Application stores its data. This is in contrast to the other storage pools, which exist to primarily fulfill the operation of the Data Management Virtualization Engine.

Performance Optimized Pool 508—a virtual storage pool able to provide high performance backup (i.e. point in time duplication, described below) as well as rapid access to the backup image by the user Application Capacity Optimized Pool 509—a virtual storage pool that chiefly provides storage of a data object in a highly space-efficient manner by use of deduplication techniques. The virtual storage pool provides access to the copy of the data object, but does not do so with high performance as its chief aim, in contrast to the Performance Optimized pool above.

The initial deployments contain storage pools as described above, as a minimal operational set. The design fully expects multiple Pools of a variety of types, representing various combinations of the criteria illustrated above, and multiple Pool Managers as is convenient to represent all of the storage in future deployments. The tradeoffs illustrated above are typical of computer data storage systems.

From a practical point of view, these three pools represent a preferred embodiment, addressing most users requirements in a very simple way. Most users will find that if they have one pool of storage for urgent restore needs, which affords quick recovery, and one other pool that is low cost, so that a large number of images can be retained for a large period of time, almost all of the business requirements for data protection can be met with little compromise.

The format of data in each pool is dictated by the objectives and technology used within the pool. For example, the quick recovery pool is maintained in the form very similar to the original data to minimize the translation required and to improve the speed of recovery. The long-term storage pool, on the other hand, uses deduplication and compression to reduce the size of the data and thus reduce the cost of storage.

Object Management Operations 505

The Object Manager 501 creates and maintains instances of Data Storage Objects 503 from the Virtual Storage Pools 418 according to the instructions sent to it by the Service Level Policy Engine 406. The Object Manager provides data object operations in five major areas: point-in-time duplication or copying (commonly referred to as "snapshots"), standard copying, object maintenance, mapping and access maintenance, and collections.

Object Management operations also include a series of Resource Discovery operations for maintaining Virtual Storage Pools themselves and retrieving information about them. The Pool Manager 504 ultimately supplies the functionality for these.

Point-In-Time Copy ("Snapshot") Operations

Snapshot operations create a data object instance representing an initial object instance at a specific point in time. More specifically, a snapshot operation creates a complete virtual copy of the members of a collection using the resources of a specified Virtual Storage Pool. This is called a Data Storage Object. Multiple states of a Data Storage Object are maintained over time, such that the state of a Data Storage Object as it existed at a point in time is available. As described above, a virtual copy is a copy implemented using an underlying storage virtualization API that allows a copy to be created in a lightweight fashion, using copy-on-write or other in-band technologies instead of copying and storing all bits of duplicate data to disk. This may be implemented using software modules written to access the capabilities of an off-the-shelf underlying storage virtualization system such as provided by EMC, vmware or IBM in some embodiments. Where such underlying virtualizations are not available, the described system may provide its own virtualization layer for interfacing with unintelligent hardware.

Snapshot operations require the application to freeze the state of the data to a specific point so that the image data is coherent, and so that the snapshot may later be used to restore the state of the application at the time of the snapshot. Other preparatory steps may also be required. These are handled by the Application-Specific Module 302, which is described in a subsequent section. For live applications, therefore, the most lightweight operations are desired.

Snapshot operations are used as the data primitive for all higher-level operations in the system. In effect, they provide access to the state of the data at a particular point in time. As well, since snapshots are typically implemented using copy-on-write techniques that distinguish what has changed from what is resident on disk, these snapshots provide differences that can also be composed or added together to efficiently copy data throughout the system. The format of the snapshot may be the format of data that is copied by Data Mover 502, which is described below.

Standard Copy Operations

When a copy operation is not a snapshot, it may be considered a standard copy operation. A standard copy operation copies all or a subset of a source data object in one storage pool to a data object in another storage pool. The result is two distinct objects. One type of standard copy operation that may be used is an initial "baseline" copy. This is typically done when data is initially copied from one Virtual Storage Pool into another, such as from a performance-optimized pool to a capacity-optimized storage pool. Another type of standard copy operation may be used wherein only changed data or differences are copied to a target storage pool to update the target object. This would occur after an initial baseline copy has previously been performed.

A complete exhaustive version of an object need not be preserved in the system each time a copy is made, even though a baseline copy is needed when the Data Virtualization System is first initialized. This is because each virtual copy provides access to a complete copy. Any delta or difference can be expressed in relation to a virtual copy instead of in relation to a baseline. This has the positive side effect of virtually eliminating the common step of walking through a series of change lists.

Standard copy operations are initiated by a series of instructions or requests supplied by the Pool Manager and received by the Data Mover to cause the movement of data among the Data Storage Objects, and to maintain the Data Storage Objects themselves. The copy operations allow the creation of copies of the specified Data Storage Objects using the resources of a specified Virtual Storage Pool. The result is a copy of the source Data Object in a target Data Object in the storage pool.

The Snapshot and Copy operations are each structured with a preparation operation and an activation operation. The two steps of prepare and activate allow the long-running resource allocation operations, typical of the prepare phase, to be decoupled from the actuation. This is required by applications that can only be paused for a short while to fulfill the point-in-time characteristics of a snapshot operation, which in reality takes a finite but non-zero amount of time to accomplish. Similarly for copy and snapshot operations, this two-step preparation and activation structure allows the Policy Engine to proceed with an operation only if resources for all of the collection members can be allocated.

Object Maintenance

Object Maintenance operations are a series of operations for maintaining data objects, including creation, destruction, and duplication. The Object Manager and Data Mover use functionality provided by a Pool Request Broker (more below) to implement these operations. The data objects may be maintained at a global level, at each Storage Pool, or preferably both.

Collections

Collection operations are auxiliary functions. Collections are abstract software concepts, lists maintained in memory by the object manager. They allow the Policy Engine 206 to request a series of operations over all of the members in a collection, allowing a consistent application of a request to all members. The use of collections allows for simultaneous activation of the point-in-time snapshot so that multiple Data Storage Objects are all captured at precisely the same point in time, as this is typically required by the application for a logically correct restore. The use of collections allows for convenient request of a copy operation across all members of a collection, where an application would use multiple storage objects as a logical whole.

Resource Discovery Operations

The Object Manager discovers Virtual Storage Pools by issuing Object Management Operations 505 to the Pool Manager 504, and uses the information obtained about each of the pools to select one that meets the required criteria for a given request, or in the case where none match, a default pool is selected, and the Object Manager can then create a data storage object using resources from the selected Virtual Storage Pool.

Mapping and Access

The Object Manager also provides sets of Object Management operations to allow and maintain the availability of these objects to external Applications. The first set is operations for registering and unregistering the computers where the user's Applications reside. The computers are registered by the identities typical to the storage network in use (e.g. Fibre Channel WWPN, iSCSI identity, etc.). The second set is "mapping" operations, and when permitted by the storage pool from which an object is created, the Data Storage Object can be "mapped," that is, made available for use to a computer on which a user Application resides.

This availability takes a form appropriate to the storage, e.g. a block device presented on a SAN as a Fibre Channel disk or iSCSI device on a network, a filesystem on a file sharing network, etc. and is usable by the operating system on the Application computer. Similarly, an "unmapping" operation reverses the availability of the virtual storage device on the network to a user Application. In this way, data stored for one Application, i.e. a backup, can be made available to another Application on another computer at a later time, i.e. a restore.

502 Data Mover

The Data Mover 502 is a software component within the Object Manager and Data Mover that reads and writes data among the various Data Storage Objects 503 according to instructions received from the Object Manager for Snapshot (Point in Time) Copy requests and standard copy requests. The Data Mover provides operations for reading and writing data among instances of data objects throughout the system. The Data Mover also provides operations that allow querying and maintaining the state of long running operations that the Object Manager has requested for it to perform.

The Data Mover uses functionality from the Pool Functionality Providers (see FIG. 6) to accomplish its operation. The Snapshot functionality provider 608 allows creation of a data object instance representing an initial object instance at a specific point in time. The Difference Engine functionality provider 614 is used to request a description of the differences between two data objects that are related in a temporal chain. For data objects stored on content-addressable pools, a special functionality is provided that can provide differences between any two arbitrary data objects. This functionality is also provided for performance-optimized pools, in some cases by an underlying storage virtualization system, and in other cases by a module that implements this on top of commodity storage. The Data Mover 502 uses the information about the differences to select the set of data that it copies between instances of data objects 503.

For a given Pool, the Difference Engine Provider provides a specific representation of the differences between two states of a Data Storage Object over time. For a Snapshot provider the changes between two points in time are recorded as writes to a given part of the Data Storage Object. In one embodiment, the difference is represented as a bitmap where each bit corresponds to an ordered list of the Data Object areas, starting at the first and ascending in order to the last, where a set bit indicates a modified area. This bitmap is derived from the copy-on-write bitmaps used by the underlying storage virtualization system. In another embodiment, the difference may be represented as a list of extents corresponding to changed areas of data. For a Content Addressable storage provider 610, the representation is described below, and is used to determine efficiently the parts of two Content Addressable Data Objects that differ.

The Data Mover uses this information to copy only those sections that differ, so that a new version of a Data Object can be created from an existing version by first duplicating it, obtaining the list of differences, and then moving only the data corresponding to those differences in the list. The Data Mover 502 traverses the list of differences, moving the indicated areas from the source Data Object to the target Data Object. (See Optimal Way for Data Backup and Restore.)

506 Copy Operation—Request Translation and Instructions

The Object Manager 501 instructs the Data Mover 502 through a series of operations to copy data among the data objects in the Virtual Storage Pools 418. The procedure comprises the following steps, starting at the reception of instructions:

First, create Collection request. A name for the collection is returned.

Second, add Object to Collection. The collection name from above is used as well as the name of the source Data Object that is to be copied and the name of two antecedents: a Data Object against which differences are to be taken in the source Storage Resource Pool, and a corresponding Data Object in the target Storage Resource Pool. This step is repeated for each source Data Object to be operated on in this set.

Third, prepare Copy Request. The collection name is supplied as well as a Storage Resource Pool to act as a target. The prepare command instructs the Object Manager to contact the Storage Pool Manager to create the necessary target Data Objects, corresponding to each of the sources in the collection. The prepare command also supplies the corresponding Data Object in the target Storage Resource Pool to be duplicated, so the Provider can duplicate the provided object and use that as a target object. A reference name for the copy request is returned.

Fourth, activate Copy Request. The reference name for the copy request returned above is supplied. The Data Mover is instructed to copy a given source object to its corresponding target object. Each request includes a reference name as well as a sequence number to describe the overall job (the entire set of source target pairs) as well as a sequence number to describe each individual source-target pair. In addition to the source-target pair, the names of the corresponding antecedents are supplied as part of the Copy instruction.

Fifth, the Copy Engine uses the name of the Data Object in the source pool to obtain the differences between the antecedent and the source from the Difference Engine at the source. The indicated differences are then transmitted from the source to the target. In one embodiment, these differences are transmitted as bitmaps and data. In another embodiment, these differences are transmitted as extent lists and data.

503 Data Storage Objects

Data Storage Objects are software constructs that permit the storage and retrieval of Application data using idioms and methods familiar to computer data processing equipment and software. In practice these currently take the form of a SCSI block device on a storage network, e.g. a SCSI LUN, or a content-addressable container, where a designator for the content is constructed from and uniquely identifies the data therein. Data Storage Objects are created and maintained by issuing instructions to the Pool Manager. The actual storage for persisting the Application data is drawn from the Virtual Storage Pool from which the Data Storage Object is created.

The structure of the data storage object varies depending on the storage pool from which it is created. For the objects that take the form of a block device on a storage network, the data structure for a given block device Data Object implements a mapping between the Logical Block Address (LBA) of each of the blocks within the Data Object to the device identifier and LBA of the actual storage location. The identifier of the Data Object is used to identify the set of mappings to be used. The current embodiment relies on the services provided by the underlying physical computer platform to implement this mapping, and relies on its internal data structures, such as bitmaps or extent lists.

For objects that take the form of a Content Addressable Container, the content signature is used as the identifier, and the Data Object is stored as is described below in the section about deduplication.

504 Pool Manager

A Pool Manager 504 is a software component for managing virtual storage resources and the associated functionality and characteristics as described below. The Object manager 501 and Data Movement Engine 502 communicate with one or more Pool Managers 504 to maintain Data Storage Objects 503.

510 Virtual Storage Resources

Virtual Storage Resources 510 are various kinds of storage made available to the Pool Manager for implementing storage pool functions, as described below. In this embodiment, a storage virtualizer is used to present various external Fibre Channel or iSCSI storage LUNs as virtualized storage to the Pool Manager 504.

The Storage Pool Manager

Figure 6:
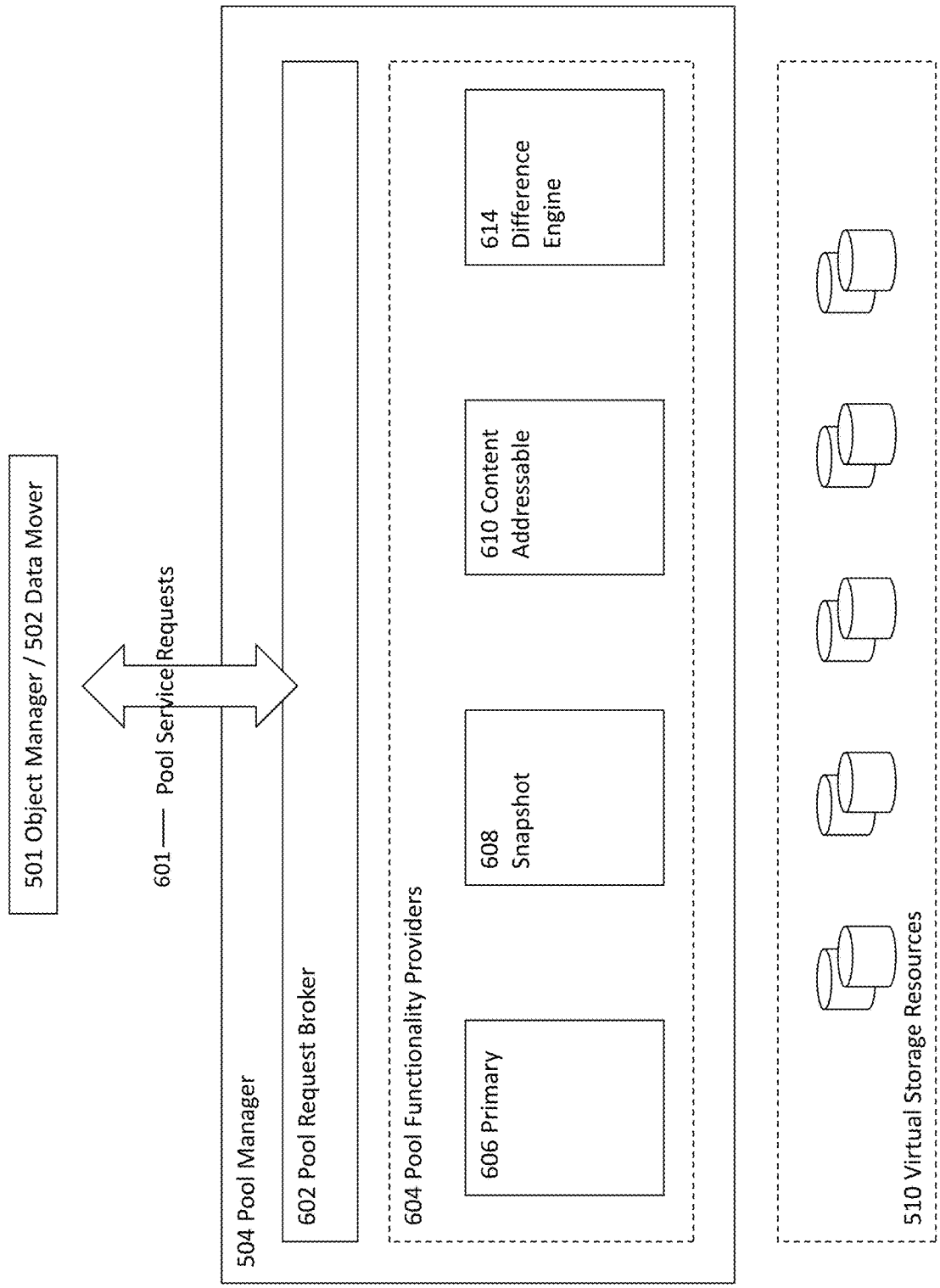
FIG. 6 shows the Storage Pool Manager.

FIG. 6 further illustrates the Storage Pool Manager 504. The purpose of the storage pool manager is to present underlying virtual storage resources to the Object Manager/Data Mover as Storage Resource Pools, which are abstractions of storage and data management functionality with common interfaces that are utilized by other components of the system. These common interfaces typically include a mechanism for identifying and addressing data objects associated with a specific temporal state, and a mechanism for producing differences between data objects in the form of bitmaps or extents. In this embodiment, the pool manager presents a Primary Storage Pool, a Performance Optimized Pool, and a Capacity Optimized Pool. The common interfaces allow the object manager to create and delete Data Storage objects in these pools, either as copies of other data storage objects or as new objects, and the data mover can move data between data storage objects, and can use the results of data object differencing operations.

The storage pool manager has a typical architecture for implementing a common interface to diverse implementations of similar functionality, where some functionality is provided by "smart" underlying resources, and other functionality must be implemented on top of less functional underlying resources.

Pool request broker 602 and pool functionality providers 604 are software modules executing in either the same process as the Object Manager/Data Mover, or in another process communicating via a local or network protocol such as TCP. In this embodiment the providers comprise a Primary Storage provider 606, Snapshot provider 608, Content Addressable provider 610, and Difference Engine provider 614, and these are further described below. In another embodiment the set of providers may be a superset of those shown here.

Virtual Storage Resources 510 are the different kinds of storage made available to the Pool Manager for implementing storage pool functions. In this embodiment, the virtual storage resources comprise sets of SCSI logical units from a storage virtualization system that runs on the same hardware as the pool manager, and accessible (for both data and management operations) through a programmatic interface: in addition to standard block storage functionality additional capabilities are available including creating and deleting snapshots, and tracking changed portions of volumes. In another embodiment the virtual resources can be from an external storage system that exposes similar capabilities, or may differ in interface (for example accessed through a file-system, or through a network interface such as CIFS, iSCSI or CDMI), in capability (for example, whether the resource supports an operation to make a copy-on-write snapshot), or in non-functional aspects (for example, high-speed/limited-capacity such as Solid State Disk versus low-speed/high-capacity such as SATA disk). The capabilities and interface available determine which providers can consume the virtual storage resources, and which pool functionality needs to be implemented within the pool manager by one or more providers: for example, this implementation of a content addressable storage provider only requires "dumb" storage, and the implementation is entirely within content addressable provider 610; an underlying content addressable virtual storage resource could be used instead with a simpler "pass-through" provider. Conversely, this implementation of a snapshot provider is mostly "pass-through" and requires storage that exposes a quick point-in-time copy operation.

Pool Request Broker 602 is a simple software component that services requests for storage pool specific functions by executing an appropriate set of pool functionality providers against the configured virtual storage resource 510. The requests that can be serviced include, but are not limited to, creating an object in a pool; deleting an object from a pool; writing data to an object; reading data from an object; copying an object within a pool; copying an object between pools; requesting a summary of the differences between two objects in a pool.

Primary storage provider 606 enables management interfaces (for example, creating and deleting snapshots, and tracking changed portions of files) to a virtual storage resource that is also exposed directly to applications via an interface such as fibre channel, iSCSI, NFS or CIFS.

Snapshot provider 608 implements the function of making a point-in-time copy of data from a Primary resource pool. This creates the abstraction of another resource pool populated with snapshots. As implemented, the point-in-time copy is a copy-on-write snapshot of the object from the primary resource pool, consuming a second virtual storage resource to accommodate the copy-on-write copies, since this management functionality is exposed by the virtual storage resources used for primary storage and for the snapshot provider.

Difference engine provider 614 can satisfy a request for two objects in a pool to be compared that are connected in a temporal chain. The difference sections between the two objects are identified and summarized in a provider-specific way, e.g. using bitmaps or extents. For example, the difference sections might be represented as a bitmap where each set bit denotes a fixed size region where the two objects differ; or the differences might be represented procedurally as a series of function calls or callbacks.

Depending on the virtual storage resource on which the pool is based, or on other providers implementing the pool, a difference engine may produce a result efficiently in various ways. As implemented, a difference engine acting on a pool implemented via a snapshot provider uses the copy-on-write nature of the snapshot provider to track changes to objects that have had snapshots made. Consecutive snapshots of a single changing primary object thus have a record of the differences that is stored alongside them by the snapshot provider, and the difference engine for snapshot pools simply retrieves this record of change. Also as implemented, a difference engine acting on a pool implemented via a Content Addressable provider uses the efficient tree structure of the content addressable implementation to do rapid comparisons between objects on demand.

Content addressable provider 610 implements a write-once content addressable interface to the virtual storage resource it consumes. It satisfies read, write, duplicate and delete operations. Each written or copied object is identified by a unique handle that is derived from its content.

Pool Manager Operations

In operation, the pool request broker 502 accepts requests for data manipulation operations such as copy, snapshot, or delete on a pool or object. The request broker determines which provider code from pool 504 to execute by looking at the name or reference to the pool or object. The broker then translates the incoming service request into a form that can be handled by the specific pool functionality provider, and invokes the appropriate sequence of provider operations.

For example, an incoming request could ask to make a snapshot from a volume in a primary storage pool, into a snapshot pool. The incoming request identifies the object (volume) in the primary storage pool by name, and the combination of name and operation (snapshot) determines that the snapshot provider should be invoked which can make point-in-time snapshots from the primary pool using the underlying snapshot capability. This snapshot provider will translate the request into the exact form required by the native copy-on-write function performed by the underlying storage virtualization appliance, such as bitmaps or extents, and it will translate the result of the native copy-on-write function to a storage volume handle that can be returned to the object manager and used in future requests to the pool manager.

Optimal Way for Data Backup Using the Object Manager and Data Mover

Optimal Way for Data Backup is a series of operations to make successive versions of Application Data objects over time, while minimizing the amount of data that must be copied by using bitmaps, extents and other temporal difference information stored at the Object Mover. It stores the application data in a data storage object and associates with it the metadata that relates the various changes to the application data over time, such that changes over time can be readily identified.

In a preferred embodiment, the procedure comprises the following steps:

1. The mechanism provides an initial reference state, e.g. T0, of the Application Data within a Data Storage Object.
2. Subsequent instances (versions) are created on demand over time of the Data Storage Object in a Virtual Storage Pool that has a Difference Engine Provider.
3. Each successive version, e.g. T4, T5, uses the Difference Engine Provider for the Virtual Storage Pool to obtain the difference between it and the instance created prior to it, so that T5 is stored as a reference to T4 and a set of differences between T5 and T4.
4. The Copy Engine receives a request to copy data from one data object (the source) to another data object (the destination).
5. If the Virtual Storage Pool in which the destination object will be created contains no other objects created from prior versions of the source data object, then a new object is created in the destination Virtual Storage Pool and the entire contents of the source data object are copied to the destination object; the procedure is complete. Otherwise the next steps are followed.
6. If the Virtual Storage Pool in which the destination object is created contains objects created from prior versions of the source data object, a recently created prior version in the destination Virtual Storage Pool is selected for which there exists a corresponding prior version in the Virtual Storage Pool of the source data object. For example, if a copy of T5 is initiated from a snapshot pool, and an object created at time T3 is the most recent version available at the target, T3 is selected as the prior version.
7. Construct a time-ordered list of the versions of the source data object, beginning with an initial version identified in the previous step, and ending with the source data object that is about to be copied. In the above example, at the snapshot pool, all states of the object are available, but only the states including and following T3 are of interest: T3, T4, T5.
8. Construct a corresponding list of the differences between each successive version in the list such that all of the differences, from the beginning version of the list to the end are represented. Difference both, identify which portion of data has changed and includes the new data for the corresponding time. This creates a set of differences from the target version to the source version, e.g. the difference between T3 and T5.
9. Create the destination object by duplicating the prior version of the object identified in Step 6 in the destination Virtual Storage Pool, e.g. object T3 in the target store.
10. Copy the set of differences identified in the list created in Step 8 from the source data object to the destination object; the procedure is complete.

Each data object within the destination Virtual Storage Pool is complete; that is, it represents the entire data object and allows access to the all of the Application Data at the point in time without requiring external reference to state or representations at other points in time. The object is accessible without replaying all deltas from a baseline state to the present state. Furthermore, the duplication of initial and subsequent versions of the data object in the destination Virtual Storage Pool does not require exhaustive duplication of the Application Data contents therein. Finally, to arrive at second and subsequent states requires only the transmission of the changes tracked and maintained, as described above, without exhaustive traversal, transmission or replication of the contents of the data storage object.

Optimal Way for Data Restore Using the Object Manager and Data Mover

Intuitively, the operation of the Optimal Way for Data Restore is the converse of the Optimal Way for Data Backup. The procedure to recreate the desired state of a data object in a destination Virtual Storage Pool at a given point in time comprises the following steps:

1. Identify a version of the data object in another Virtual Storage Pool that has a Difference Engine Provider, corresponding to the desired state to be recreated. This is the source data object in the source Virtual Storage Pool.
2. Identify a preceding version of the data object to be recreated in the destination Virtual Storage Pool.
3. If no version of the data object is identified in Step 2, then create a new destination object in the destination Virtual Storage Pool and copy the data from the source data object to the destination data object. The procedure is complete. Otherwise, proceed with the following steps.
4. If a version of the data object is identified in Step 2, then identify a data object in the source Virtual Storage Pool corresponding to the data object identified in Step 2.
5. If no data object is identified in Step 4, then create a new destination object in the destination Virtual Storage Pool and copy the data from the source data object to the destination data object. The procedure is complete. Otherwise, proceed with the following steps.
6. Create a new destination data object in the Destination Virtual Storage Pool by duplicating the data object identified in Step 2.
7. Employ the Difference Engine Provider for the source Virtual Storage Pool to obtain the set of differences between the data object identified in Step 1 and the data object identified in Step 4.
8. Copy the data identified by the list created in Step 7 from the source data object to the destination data object. The procedure is complete.

Access to the desired state is complete: it does not require external reference to other containers or other states. Establishing the desired state given a reference state requires neither exhaustive traversal nor exhaustive transmission, only the retrieved changes indicated by the provided representations within the source Virtual Storage Pool.

The Service Level Agreement

Figure 7:
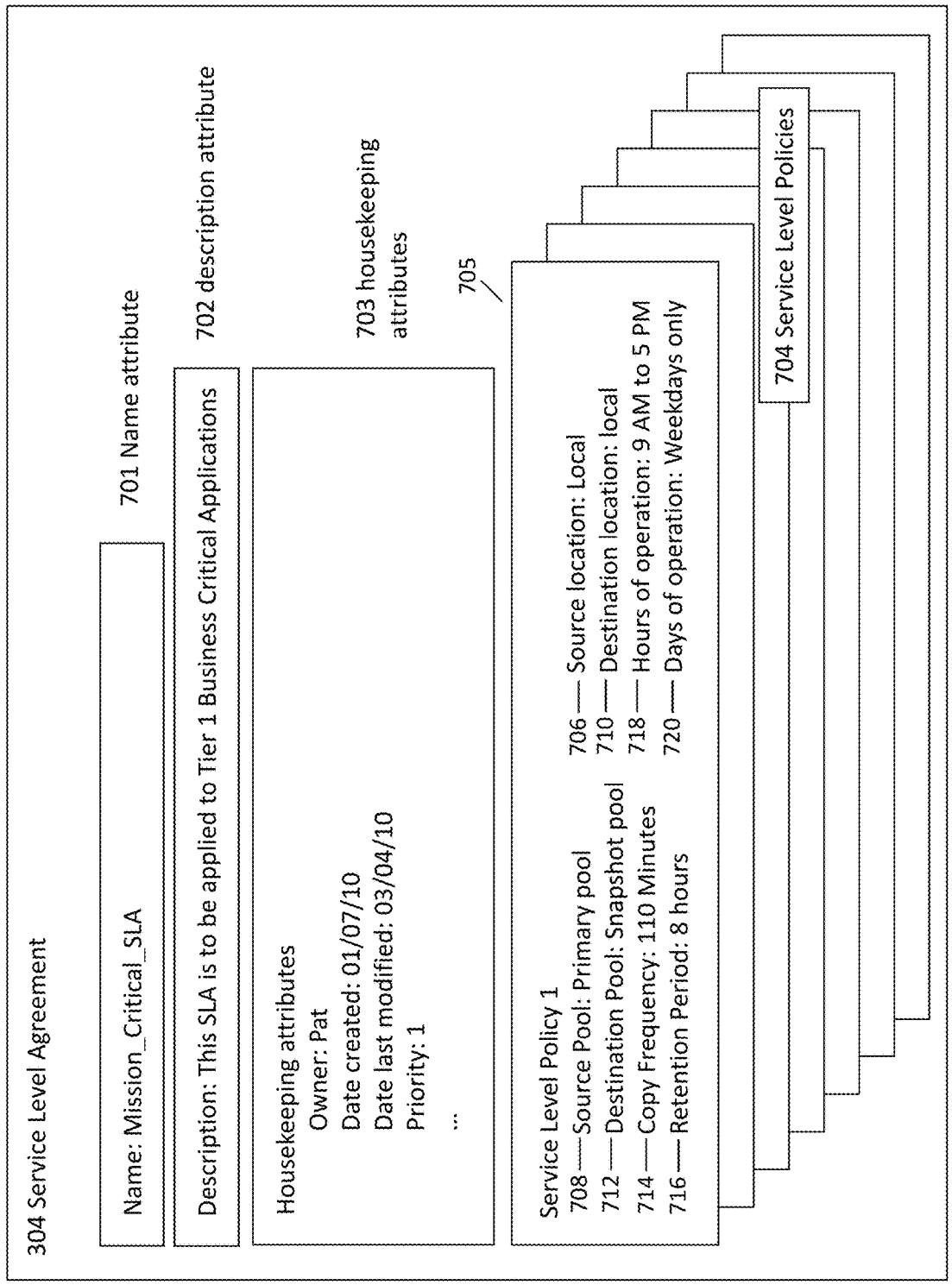
FIG. 7 shows the decomposition of the Service Level Agreement.

FIG. 7 illustrates the Service Level Agreement. The Service Level Agreement captures the detailed business requirements with respect to secondary copies of the application data. In the simplest description, the business requirements define when and how often copies are created, how long they are retained and in what type of storage pools these copies reside. This simplistic description does not capture several aspects of the business requirements. The frequency of copy creation for a given type of pool may not be uniform across all hours of the day or across all days of a week. Certain hours of the day, or certain days of a week or month may represent more (or less) critical periods in the application data, and thus may call for more (or less) frequent copies. Similarly, all copies of application data in a particular pool may not be required to be retained for the same length of time. For example, a copy of the application data created at the end of monthly processing may need to be retained for a longer period of time than a copy in the same storage pool created in the middle of a month.

The Service Level Agreement 304 of certain embodiments has been designed to represent all of these complexities that exist in the business requirements. The Service Level Agreement has four primary parts: the name, the description, the housekeeping attributes and a collection of Service Level Policies. As mentioned above, there is one SLA per application.

The name attribute 701 allows each Service Level Agreement to have a unique name.

The description attribute 702 is where the user can assign a helpful description for the Service Level Agreement.

The Service Level agreement also has a number of housekeeping attributes 703 that enable it to be maintained and revised. These attributes include but are not limited to the owner's identity, the dates and times of creation, modification and access, priority, enable/disable flags.

The Service Level Agreement also contains a plurality of Service Level Policies 705. Some Service level Agreements may have just a single Service Level Policy. More typically, a single SLA may contain tens of policies.

Each Service Level Policy consists of at least the following, in certain embodiments: the source storage pool location 706 and type 708; the target storage pool location 710 and type 712; the frequency for the creation of copies 714, expressed as a period of time; the length of retention of the copy 716, expressed as a period of time; the hours of operation 718 during the day for this particular Service Level Policy; and the days of the week, month or year 720 on which this Service Level Policy applies.

Each Service Level Policy specifies a source and target storage pool, and the frequency of copies of application data that are desired between those storage pools. Furthermore, the Service Level Policy specifies its hours of operation and days on which it is applicable. Each Service Level Policy is the representation of one single statement in the business requirements for the protection of application data. For example, if a particular application has a business requirement for an archive copy to be created each month after the monthly close and retained for three years, this might translate to a Service level Policy that requires a copy from the Local Backup Storage Pool into the Long-term Archive Storage Pool at midnight on the last day of the month, with a retention of three years.

All of the Service Level Policies with a particular combination of source and destination pool and location, say for example, source Primary Storage pool and destination local Snapshot pool, when taken together, specify the business requirements for creating copies into that particular destination pool. Business requirements may dictate for example that snapshot copies be created every hour during regular working hours, but only once every four hours outside of these times. Two Service Level Policies with the same source and target storage pools will effectively capture these requirements in a form that can be put into practice by the Service Policy Engine.

This form of a Service Level Agreement allows the representation of the schedule of daily, weekly and monthly business activities, and thus captures business requirements for protecting and managing application data much more accurately than traditional RPO and RPO based schemes. By allowing hour of operation and days, weeks, and months of the year, scheduling can occur on a "calendar basis."

Taken together, all of the Service Level Policies with one particular combination of source and destinations, for example, "source: local primary and destination: local performance optimized", captures the non-uniform data protection requirements for one type of storage. A single RPO number, on the other hand, forces a single uniform frequency of data protection across all times of day and all days. For example, a combination of Service Level Policies may require a large number of snapshots to be preserved for a short time, such as 10 minutes, and a lesser number of snapshots to be preserved for a longer time, such as 8 hours; this allows a small amount of information that has been accidentally deleted can be reverted to a state not more than 10 minutes before, while still providing substantial data protection at longer time horizons without requiring the storage overhead of storing all snapshots taken every ten minutes. As another example, the backup data protection function may be given one Policy that operates with one frequency during the work week, and another frequency during the weekend.

When Service Level Policies for all of the different classes of source and destination storage are included, the Service Level Agreement fully captures all of the data protection requirements for the entire application, including local snapshots, local long duration stores, off-site storage, archives, etc. A collection of policies within a SLA is capable of expressing when a given function should be performed, and is capable of expressing multiple data management functions that should be performed on a given source of data.

Service Level Agreements are created and modified by the user through a user interface on a management workstation. These agreements are electronic documents stored by the Service Policy Engine in a structured SQL database or other repository that it manages. The policies are retrieved, electronically analyzed, and acted upon by the Service Policy Engine through its normal scheduling algorithm as described below.

Figure 8:
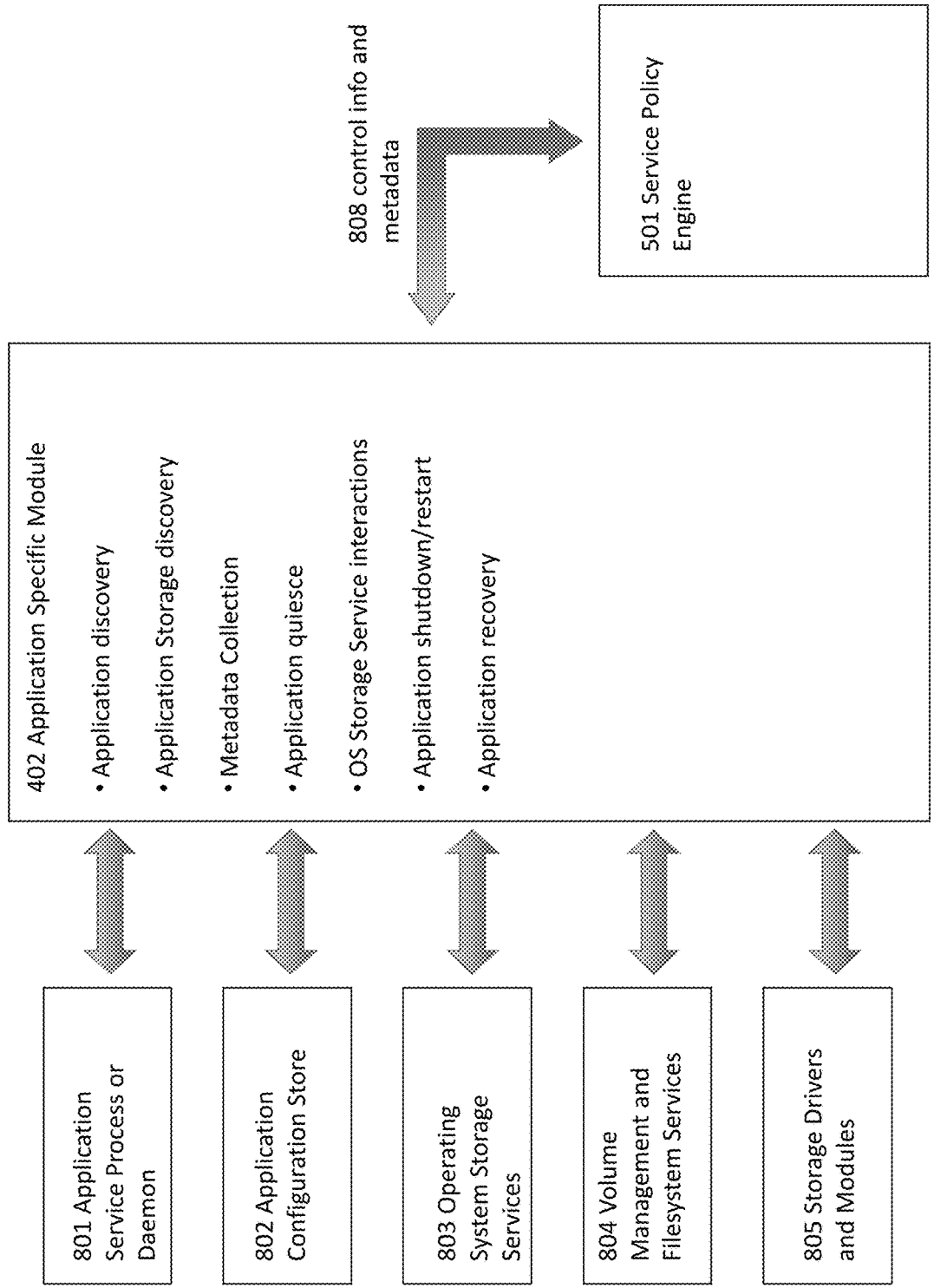
FIG. 8 illustrates the Application Specific Module.

FIG. 8 illustrates the Application Specific Module 402. The Application Specific module runs close to the Application 300 (as described above), and interacts with the Application and its operating environment to gather metadata and to query and control the Application as required for data management operations.

The Application Specific Module interacts with various components of the application and its operating environment including Application Service Processes and Daemons 801, Application Configuration Data 802, Operating System Storage Services 803 (such as VSS and VDS on Windows), Logical Volume Management and Filesystem Services 804, and Operating System Drivers and Modules 805.

The Application Specific Module performs these operations in response to control commands from the Service Policy Engine 406. There are two purposes for these interactions with the application: Metadata Collection and Application Consistency.

Metadata Collection is the process by which the Application Specific Module collects metadata about the application. In some embodiments, metadata includes information such as: configuration parameters for the application; state and status of the application; control files and startup/shutdown scripts for the application; location of the datafiles, journal and transaction logs for the application; and symbolic links, filesystem mount points, logical volume names, and other such entities that can affect the access to application data.

Metadata is collected and saved along with application data and SLA information. This guarantees that each copy of application data within the system is self contained and includes all of the details required to rebuild the application data.

Application Consistency is the set of actions that ensure that when a copy of the application data is created, the copy is valid, and can be restored into a valid instance of the application. This is critical when the business requirements dictate that the application be protected while it is live, in its online, operational state. The application may have interdependent data relations within its data stores, and if these are not copied in a consistent state will not provide a valid restorable image.

The exact process of achieving application consistency varies from application to application. Some applications have a simple flush command that forces cached data to disk. Some applications support a hot backup mode where the application ensures that its operations are journalled in a manner that guarantees consistency even as application data is changing. Some applications require interactions with operating system storage services such as VSS and VDS to ensure consistency. The Application Specific Module is purpose-built to work with a particular application and to ensure the consistency of that application. The Application Specific Module interacts with the underlying storage virtualization device and the Object Manager to provide consistent snapshots of application data.

For efficiency, the preferred embodiment of the Application Specific Module 402 is to run on the same server as Application 300. This assures the minimum latency in the interactions with the application, and provides access to storage services and filesystems on the application host. The application host is typically considered primary storage, which is then snapshotted to a performance-optimized store.

In order to minimize interruption of a running application, including minimizing preparatory steps, the Application Specific Module is only triggered to make a snapshot when access to application data is required at a specific time, and when a snapshot for that time does not exist elsewhere in the system, as tracked by the Object Manager. By tracking which times snapshots have been made, the Object Manager is able to fulfill subsequent data requests from the performance-optimized data store, including for satisfying multiple requests for backup and replication which may issue from secondary, capacity-optimized pools. The Object Manager may be able to provide object handles to the snapshot in the performance-optimized store, and may direct the performance-optimized store in a native format that is specific to the format of the snapshot, which is dependent on the underlying storage appliance. In some embodiments this format may be application data combined with one or more LUN bitmaps indicating which blocks have changed; in other embodiments it may be specific extents. The format used for data transfer is thus able to transfer only a delta or difference between two snapshots using bitmaps or extents.

Metadata, such as the version number of the application, may also be stored for each application along with the snapshot. When a SLA policy is executed, application metadata is read and used for the policy. This metadata is stored along with the data objects. For each SLA, application metadata will only be read once during the lightweight snapshot operation, and preparatory operations which occur at that time such as flushing caches will only be performed once during the lightweight snapshot operation, even though this copy of application data along with its metadata may be used for multiple data management functions.

The Service Policy Engine

Figure 9:
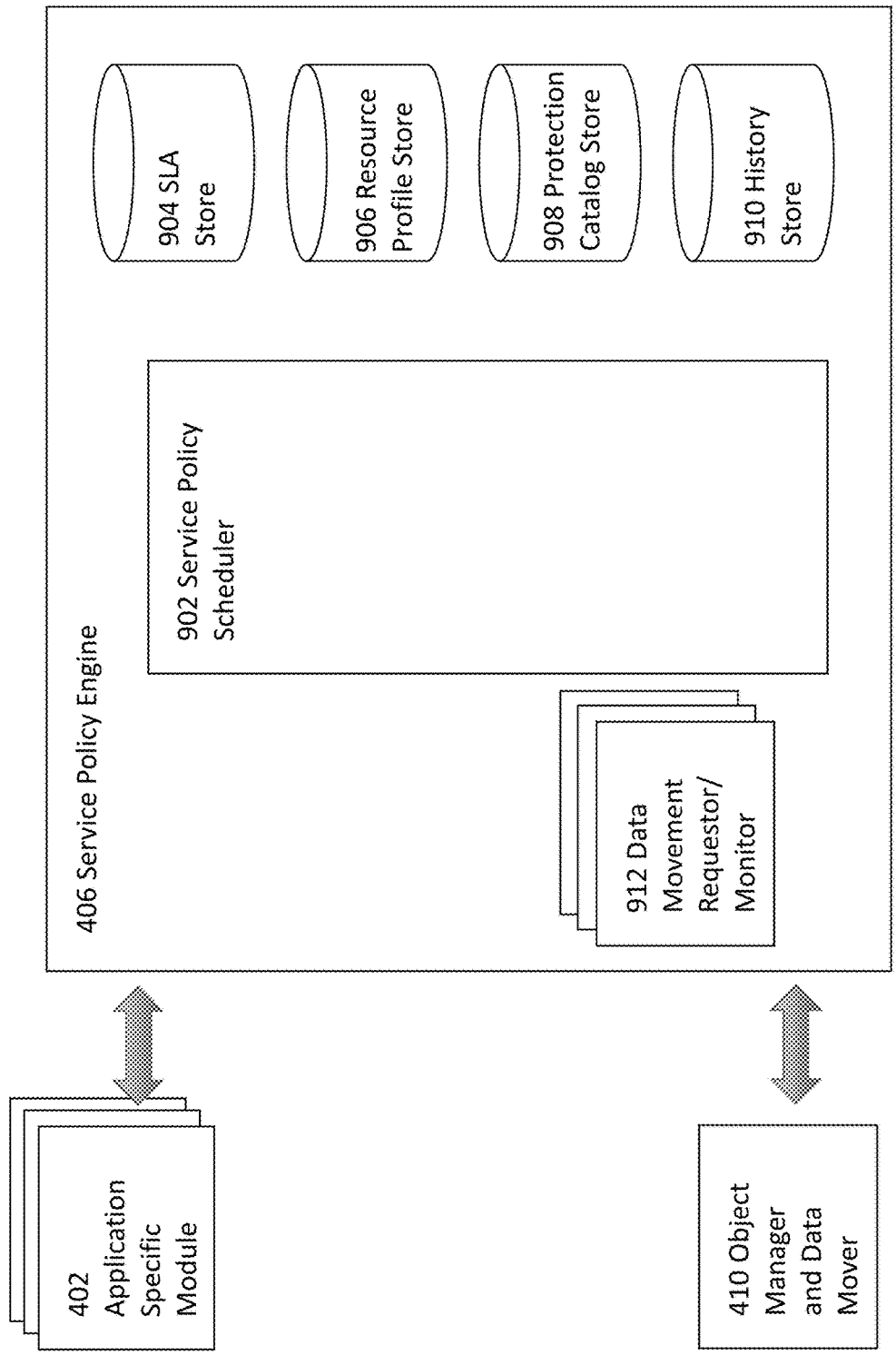
FIG. 9 shows the Service Policy Manager.

FIG. 9 illustrates the Service Policy Engine 406. The Service Policy Engine contains the Service Policy Scheduler 902, which examines all of the Service Level Agreements configured by the user and makes scheduling decisions to satisfy Service Level Agreements. It relies on several data stores to capture information and persist it over time, including, in some embodiments, a SLA Store 904, where configured Service Level Agreements are persisted and updated; a Resource Profile Store 906, storing Resource Profiles that provide a mapping between logical storage pool names and actual storage pools; Protection Catalog Store 908, where information is cataloged about previous successful copies created in various pools that have not yet expired; and centralized History Store 910.

History Store 910 is where historical information about past activities is saved for the use of all data management applications, including the timestamp, order and hierarchy of previous copies of each application into various storage pools. For example, a snapshot copy from a primary data store to a capacity-optimized data store that is initiated at 1 P.M. and is scheduled to expire at 9 P.M. will be recorded in History Store 910 in a temporal data store that also includes linked object data for snapshots for the same source and target that have taken place at 11 A.M. and 12 P.M.

These stores are managed by the Service Policy Engine. For example, when the user, through the Management workstation creates a Service Level Agreement, or modifies one of the policies within it, it is the Service Policy Engine that persists this new SLA in its store, and reacts to this modification by scheduling copies as dictated by the SLA. Similarly, when the Service Policy Engine successfully completes a data movement job that results in a new copy of an application in a Storage Pool, the Storage Policy Engine updates the History Store, so that this copy will be factored into future decisions.

The preferred embodiment of the various stores used by the Service Policy Engine is in the form of tables in a relational database management system in close proximity to the Service Policy Engine. This ensures consistent transactional semantics when querying and updating the stores, and allows for flexibility in retrieving interdependent data.

Figure 10:
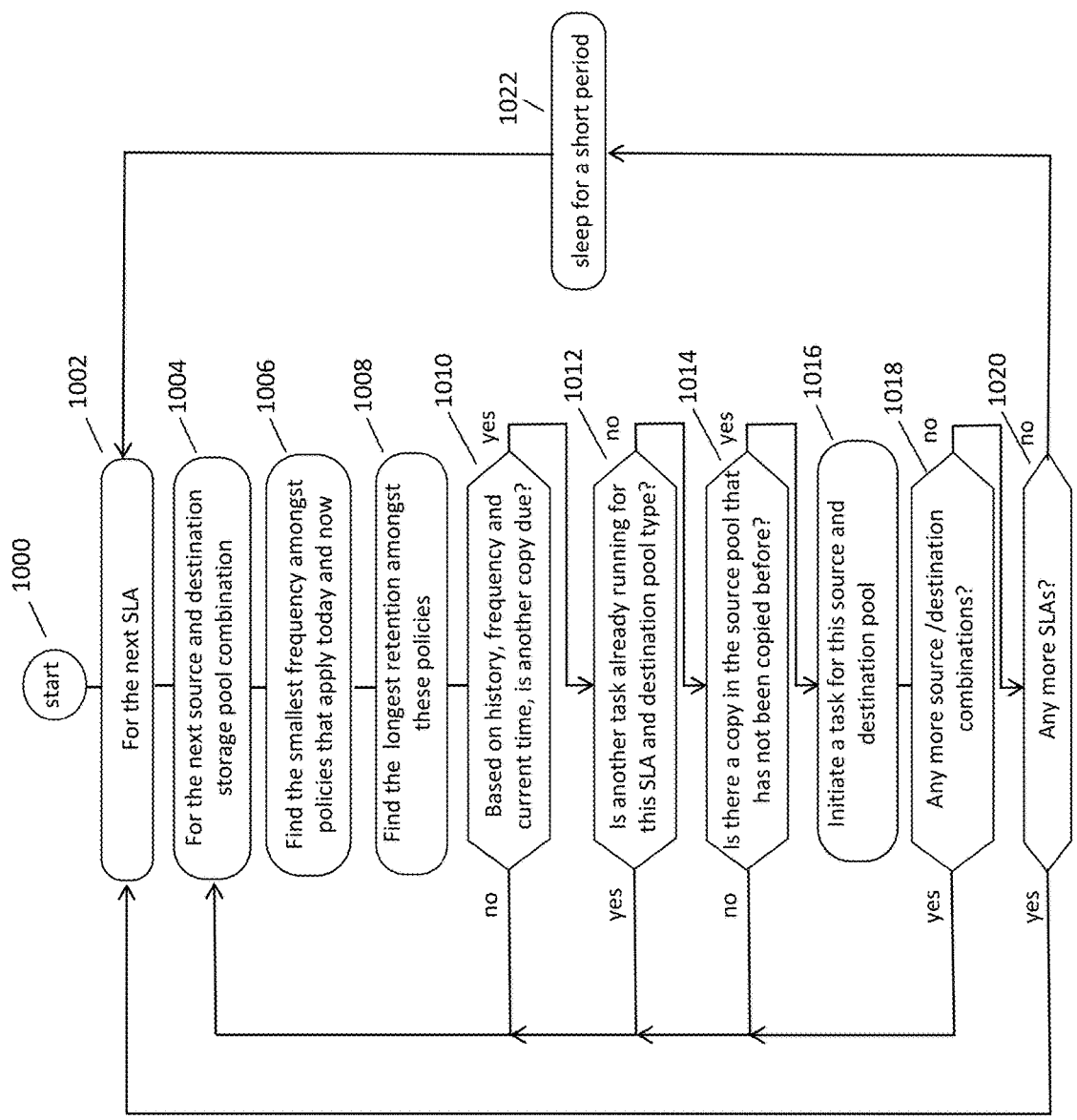
FIG. 10 is a flowchart of the Service Policy Scheduler.

The scheduling algorithm for the Service Policy Scheduler 902 is illustrated in FIG. 10. When the Service Policy Scheduler decides it needs to make a copy of application data from one storage pool to another, it initiates a Data Movement Requestor and Monitor task, 912. These tasks are not recurring tasks and terminate when they are completed. Depending on the way that Service Level Policies are specified, a plurality of these requestors might be operational at the same time.

The Service Policy Scheduler considers the priorities of Service Level Agreements when determining which additional tasks to undertake. For example, if one Service Level Agreement has a high priority because it specifies the protection for a mission-critical application, whereas another SLA has a lower priority because it specifies the protection for a test database, then the Service Policy Engine may choose to run only the protection for the mission-critical application, and may postpone or even entirely skip the protection for the lower priority application. This is accomplished by the Service Policy Engine scheduling a higher priority SLA ahead of a lower priority SLA. In the preferred embodiment, in such a situation, for auditing purposes, the Service Policy Engine will also trigger a notification event to the management workstation.

The Policy Scheduling Algorithm

FIG. 10 illustrates the flowchart of the Policy Schedule Engine. The Policy Schedule Engine continuously cycles through all the SLAs defined. When it gets to the end of all of the SLAs, it sleeps for a short while, e.g. 10 seconds, and resumes looking through the SLAs again. Each SLA encapsulates the complete data protection business requirements for one application; thus all of the SLAs represent all of the applications.

For each SLA, the schedule engine collects together all of the Service Level Policies that have the same source pool and destination pool 1004 the process state at 1000 and iterates to the next SLA in the set of SLAs in 1002. Taken together, this subset of the Service Level Policies represent all of the requirements for a copy from that source storage pool to that particular destination storage pool.

Among this subset of Service Level Policies, the Service Policy Scheduler discards the policies that are not applicable to today, or are outside their hours of operation. Among the policies that are left, find the policy that has the shortest frequency 1006, and based on the history data and in history store 910, the one with the longest retention that needs to be run next 1008.

Next, there are a series of checks 1010-1014 which rule out making a new copy of application data at this time—because the new copy is not yet due, because a copy is already in progress or because there is not new data to copy. If any of these conditions apply, the Service Policy Scheduler moves to the next combination of source and destination pools 1004. If none of these conditions apply, a new copy is initiated. The copy is executed as specified in the corresponding service level policy within this SLA 1016.

Next, the Scheduler moves to the next Source and Destination pool combination for the same Service Level agreement 1018. If there are no more distinct combinations, the Scheduler moves on to the next Service Level Agreement 1020.

After the Service Policy Scheduler has been through all source/destination pool combinations of all Service Level Agreements, it pauses for a short period and then resumes the cycle.

A simple example system with a snapshot store and a backup store, with only 2 policies defined, would interact with the Service Policy Scheduler as follows. Given two policies, one stating "backup every hour, the backup to be kept for 4 hours" and another stating "backup every 2 hours, the backup to be kept for 8 hours," the result would be a single snapshot taken each hour, the snapshots each being copied to the backup store but retained a different amount of time at both the snapshot store and the backup store. The "backup every 2 hours" policy is scheduled to go into effect at 12:00 P.M by the system administrator.

At 4:00 P.M., when the Service Policy Scheduler begins operating at step 1000, it finds the two policies at step 1002. (Both policies apply because a multiple of two hours has elapsed since 12:00 P.M.) There is only one source and destination pool combination at step 1004. There are two frequencies at step 1006, and the system selects the 1-hour frequency because it is shorter than the 2-hour frequency. There are two operations with different retentions at step 1008, and the system selects the operation with the 8-hour retention, as it has the longer retention value. Instead of one copy being made to satisfy the 4-hour requirement and another copy being made to satisfy the 8-hour requirement, the two requirements are coalesced into the longer 8-hour requirement, and are satisfied by a single snapshot copy operation. The system determines that a copy is due at step 1010, and checks the relevant objects at the History Store 910 to determine if the copy has already been made at the target (at step 912) and at the source (at step 914). If these checks are passed, the system initiates the copy at step 916, and in the process triggers a snapshot to be made and saved at the snapshot store. The snapshot is then copied from the snapshot store to the backup store. The system then goes to sleep 1022 and wakes up again after a short period, such as 10 seconds. The result is a copy at the backup store and a copy at the snapshot store, where every even-hour snapshot lasts for 8 hours, and every odd-hour snapshot lasts 4 hours. The even-hour snapshots at the backup store and the snapshot store are both tagged with the retention period of 8 hours, and will be automatically deleted from the system by another process at that time.

Note that there is no reason to take two snapshots or make two backup copies at 2 o'clock, even though both policies apply, because both policies are satisfied by a single copy. Combining and coalescing these snapshots results in the reduction of unneeded operations., while retaining the flexibility of multiple separate policies. As well, it may be helpful to have two policies active at the same time for the same target with different retention. In the example given, there are more hourly copies kept than two-hour copies, resulting in more granularity for restore at times that are closer to the present. For example, in the previous system, if at 7:30 P.M. damage is discovered from earlier in the afternoon, a backup will be available for every hour for the past four hours: 4, 5, 6, 7 P.M. As well, two more backups will have been retained from 2 P.M. and 12 P.M.

Calculating Compliance with Service Level Agreements

FIGS. 11-28 illustrate aspects of the SLA Compliance Engine 450, according to some embodiments of the present disclosure. The SLA Compliance Engine determines whether there has been a violation of the SLA 304. In some embodiments, the SLA Compliance Engine 450 can be implemented in the Service Level Policy Engine 406 within the Data Management Virtualization Engine 306, or within Data Management Virtualization Engine 306, such as the systems and methods discussed above.

As described previously, for example in the background section, certain scheduling and compliance systems used counting-based methods. There are a number of issues with this type of logic:

First, it does not support continuous schedules, such as running a backup job every 5 hours. There is no way to estimate the number of jobs expected in a backup window if there is no window. For example, if a schedule specifies backup jobs every 5 hours, the number of backup jobs per day can be unpredictable. That is, assuming everything runs according to schedule, some days there will be 4 jobs run and others will have 5 jobs run.

Second, it cannot be configured to handle jobs that continue beyond the end of a backup window. Because SLA Compliance is evaluated at or soon after the end of the window, the system must arbitrarily decide whether a job that is still running at that time should be considered as a success or violation.

Third, it does not account for schedule drift. If one job starts a few minutes later than scheduled because it needs to wait for a resource to become available, that can cause the following job to start late as well in some scheduling systems. That may in turn cause fewer jobs than expected to run, even though the schedule drift may be minor and inconsequential to the user's needs.

Fourth, it does not account for schedules where an undetermined number of successful jobs are expected. Consider a situation where jobs are scheduled to run every 14 hours in a 24-hour window. Is 1 job expected or 2? Different users will have different expectations, and will not have any way to control how SLA compliance is measured.

Fifth, does not use the information from other policies to determine how many jobs are to be expected by dependent policies that exist for purposes like long-term retention in a vault and deduplication repository. If backup snapshots are done once per day, but there is a schedule calling for snapshots to be deduplicated every 4 hours, SLA violations will be reported for 5 of the 6 daily deduplication jobs that were expected.

A context-sensitive algorithm would look at all relevant backup schedules to determine what is reasonably expected.

In certain embodiments, the Compliance Engine 450 allows, for example, centralized compliance analysis for all Service Level Policies in a Service Level Agreement. By creating, for example, monitoring events and storage databases as illustratively discussed below, the Compliance Engine 450 can determine compliane for each of a variety of Service Level Policies of different types efficiently and in a centralized fashion. The monitoring events can, for example, include information necessary for the Compliance Engine 450 to determine compliance with the associated Service Level Policy. In addition, in certain embodiments, the Compliance Engine 450 can iteratively and efficiently measure compliance of each Service Level Policy within a Service Level Agreement. For example and as illustratively discussed below, distinct monitoring events are performed, and the results of which are used to schedule future monitoring. Furthermore, in certain embodiments, using consistency time to determine compliance with a Service Level Policy permits more accurate compliance determinations.

Figure 11:
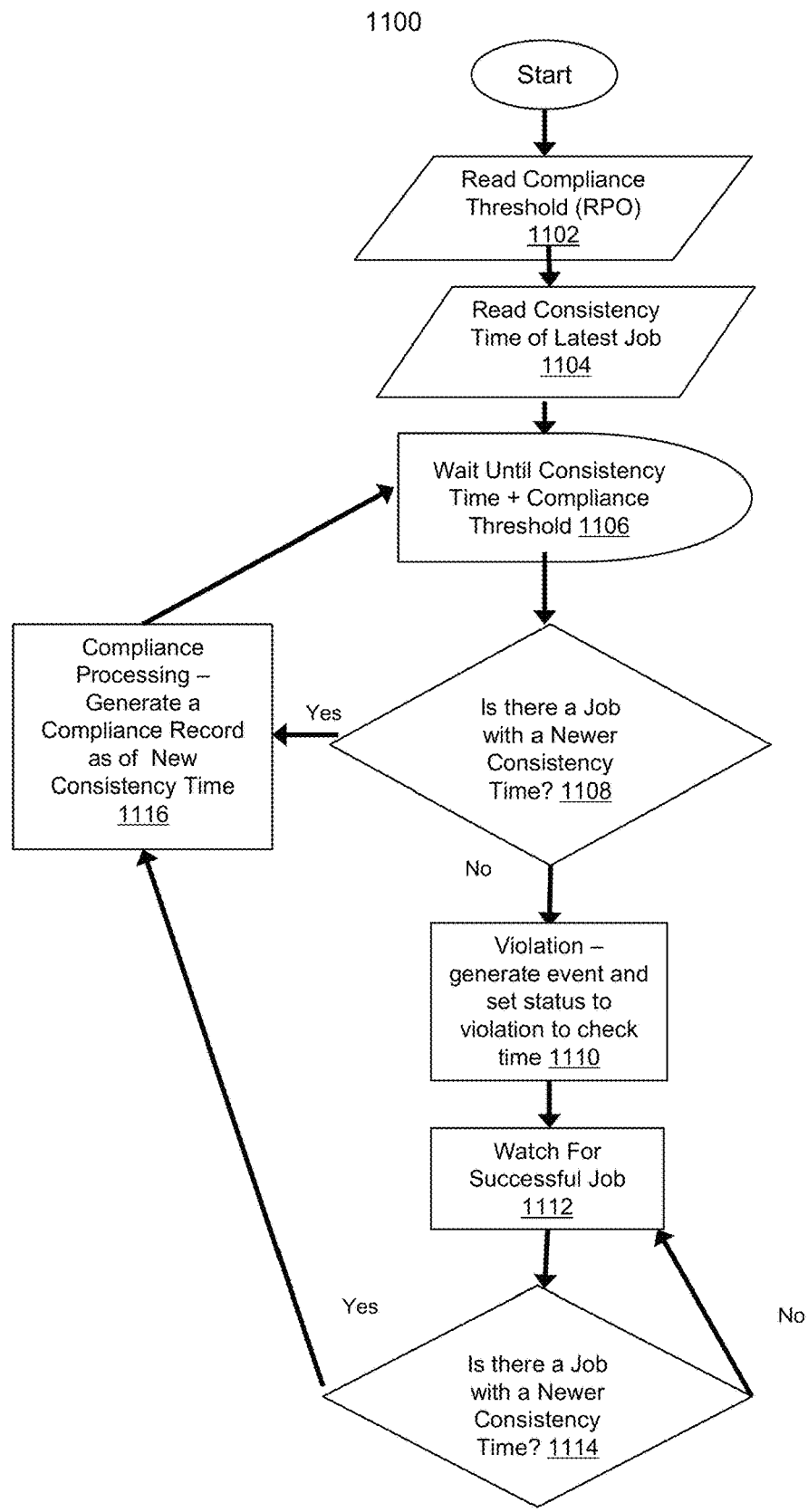
FIG. 11 is a computerized method 100 for calculating SLA compliance for a continuous schedule, according to some embodiments of the present disclosure.

FIG. 11 is a computerized method 100 for calculating SLA compliance for a continuous schedule, according to some embodiments of the present disclosure.

At step 1102, the SLA compliance engine 450 reads the compliance threshold from a data store such as a database. In one embodiment, the compliance threshold can be determined or inferred from the attributes of the SLA 304. For example, a compliance threshold can be set for a fixed amount of time after the end of a backup window, e.g., for a job that runs every two hours, there may be a violation if the completion time of one job is greater than three hours since the consistency time of the previous backup. In other embodiments, the compliance thershold can be recorded in the SLA Store 904, received from the Service Policy Engine 406, or configured by a user. As explained above, the compliance threshold is the amount of time permitted that is elapsed between the consistency time of one successful backup job and the successful run of the next job. It represents the permissible data loss if a restore had to be performed at any point of time, which is described in more detail in FIG. 5 and discussion thereof.

At step 1104, the SLA compliance engine reads the consistency time of the most recent successful job. The consistency time is defined as the time that the backed-up application would be reverted to if the user restores the application from the backup data, which is described in more detail in FIG. 15 and discussion thereof. In one embodiment, the consistency time can be included in the History Store 910. In some embodiments, the consistency time is later than a backup start time. The difference in the consistency time and the backup start time can be attributed to setup operations to prepare data for backup.

At step 1106, the system waits until an expiration of a consistency time plus the compliance threshold. This is the point in time in which the SLA compliance engine determines whether a newer successful backup is in SLA Compliance, which is described in more detail in FIG. 15 and discussion thereof.

Referring to step 1108, the SLA compliance engine checks to see if a newer successful backup has been created. If so, an SLA compliance event is recorded (step 1116) with a compliance time matching the consistency time of that new backup image. The compliance threshold is then added to that consistency time and the system waits for that time to occur in step 1106 as the process repeats.

If no new job has been found, step 1110 is executed and an SLA violation is recorded. An SLA violation is an indication that the user's SLA compliance thresholds have not been met. The system records each violation in a data store such as a database for use in later reporting. In one embodiment, violations are recorded in the Protection Catalog Store 908 or the History Store 910. In another embodiment, the Service Level Policy Engine 406 or the Management Workstation 1308 can be notified of violations. Also, users are generally notified of the violation so they do not have to run a report to find out about violations. This notification can be by email, SNMP trap, and/or other mechanisms.

The system then periodically checks in step 1112 for new successful backups. In one embodiment, the SLA Compliance Engine 450 can check for new successful backups in the History Store 910. If one is found (step 1114), a new SLA compliance event is recorded in step 1116 with a compliance time matching the consistency time of that new backup image. In one embodiment, the compliance time can be recorded in the Protection Catalog Store 908 or the History Store 910. In another embodiment, the Service Level Policy Engine 406 or the Management Workstation 308 can be notified of the compliance time. If no new backup images are found, the system continues to watch for one in step 112.

Figure 12:
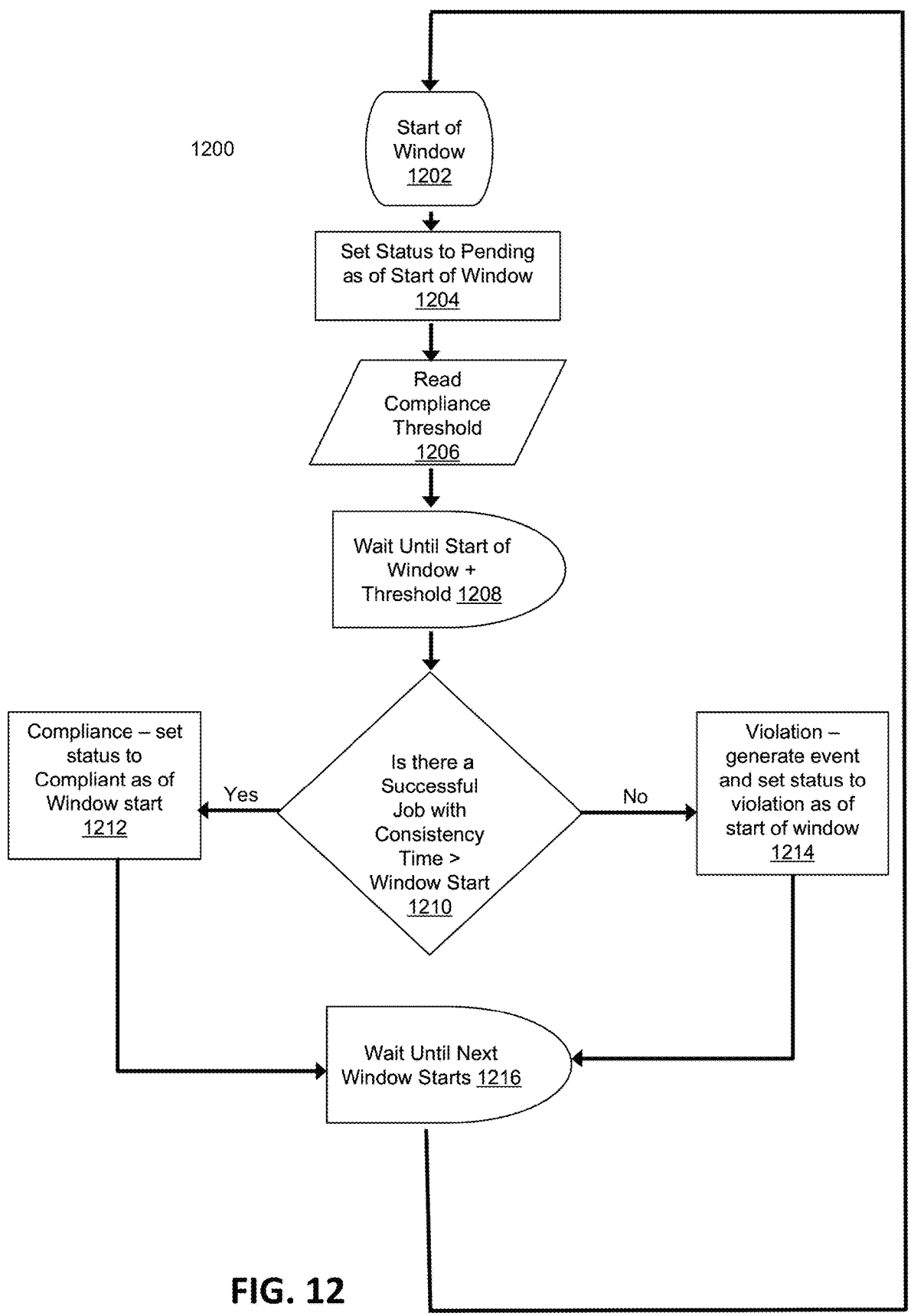
FIG. 12 is a computerized method 200 for calculating SLA compliance for a windowed schedule where 1 job is expected to start within the window, according to some embodiments of the present disclosure.

FIG. 12 is a computerized method 1200 for calculating SLA compliance for a windowed schedule where one job is expected to start within the window, according to some embodiments of the present disclosure. For example, a schedule with a single job can include a schedule where a single backup is requested to run in an overnight off-peak backup window.

At step 1202, the window period starts. The SLA compliance engine sets the SLA compliance status to pending at this time (step 1204) so that users will know that compliance with the current window has not yet been evaluated. In some embodiments, users who query the system regarding a current status of SLA compliance can see a status of "pending" (e.g., through a user interface). At step 1206, the SLA compliance engine reads the compliance threshold from a data store such as a database. In one embodiment, the compliance threshold can be determined based on the attributes of the SLA 304. In another embodiment, it can be recorded in the SLA Store 904. In yet another embodiment, it can be received from the Service Policy Engine 406. In some embodiments, a user interface, for example at Management Workstation 308, can guide a user to setting reasonable thresholds. For a continuous policy, reasonable values can be determined as being between the schedule period and twice the schedule period. If the policy is scheduled to run every 4 hours, the range will be 4 hours to 8 hours. However, users can set the compliance threshold to any value they like by overriding the guidance At step 1208, the system then adds the compliance threshold to the start of the window and waits until this time elapses. At step 1210, the system checks to see if there are any successful backups with a consistency time greater than the start of the window. In one embodiment, the SLA Compliance Engine 450 can check for new successful backups in the History Store 910. This check is needed in case a job that started before this window such as the previous day ran long.

If a successful job was found, step 1212 is executed and an SLA compliance event is recorded with a compliance time matching the start of the window. This indicates that the policy is in compliance for the window, and will remain so until the start of the next window. In one embodiment, the compliance time can be recorded in the Protection Catalog Store 908 or the History Store 910. In another embodiment, the SLA Compliance Engine can notify the Service Level Policy Engine 406 or the Management Workstation 308 of the compliance time. If no successful job was found, step 1214 is executed and an SLA violation event is recorded with a violation time matching the start of the window. In one embodiment, a violation event is recorded in the Protection Catalog Store 908 or the History Store 910. In another embodiment, the Service Level Policy Engine 406 or the Management Workstation 308 can be notified of the violation event.

Referring to step 1216, the system waits until the next window starts.

Figure 13A:
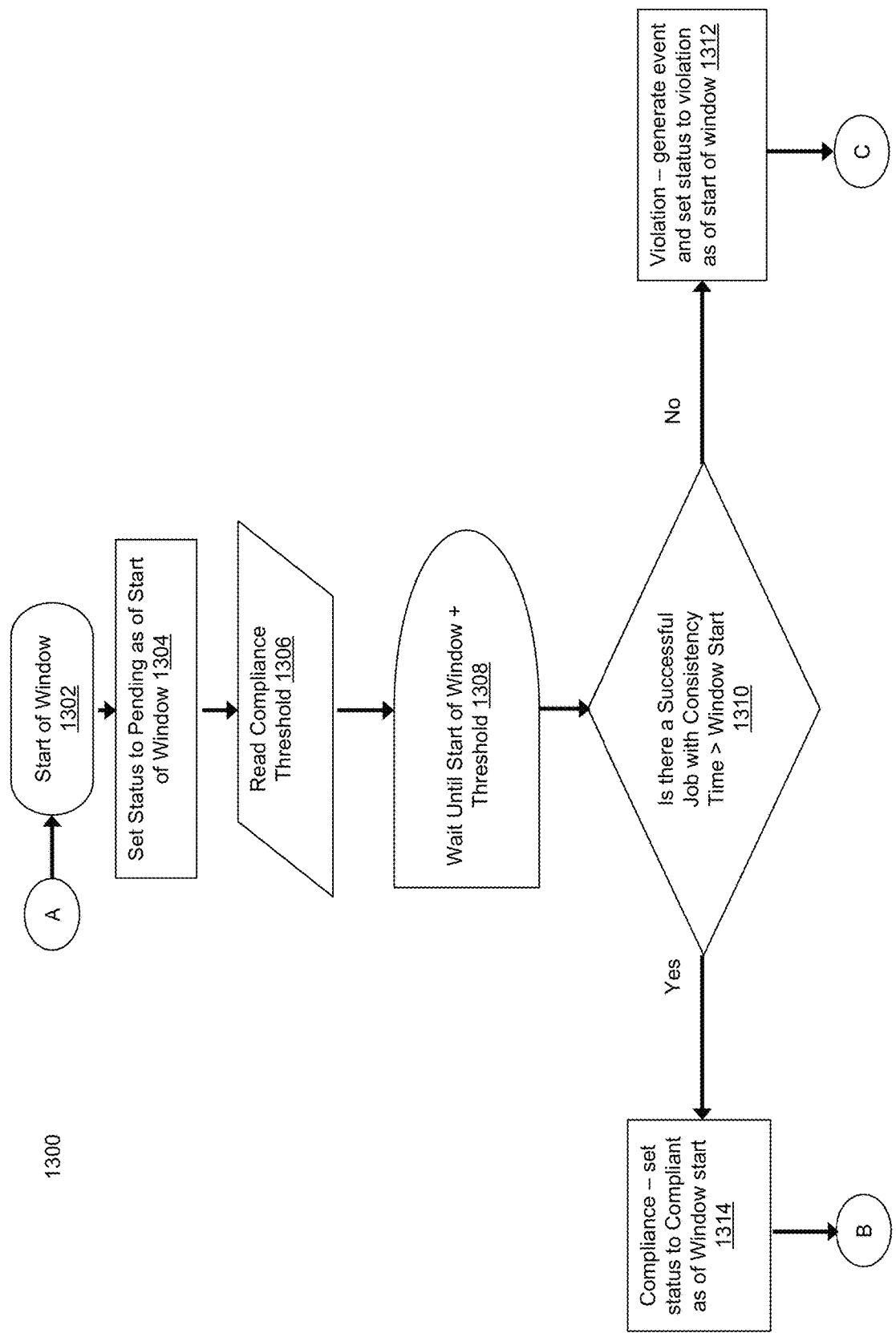
FIGS. 13A and 13B taken together are a computerized method 300 for calculating SLA compliance for a windowed schedule where more than 1 job is expected to start within the window, according to some embodiments of the present disclosure.
Figure 13B:
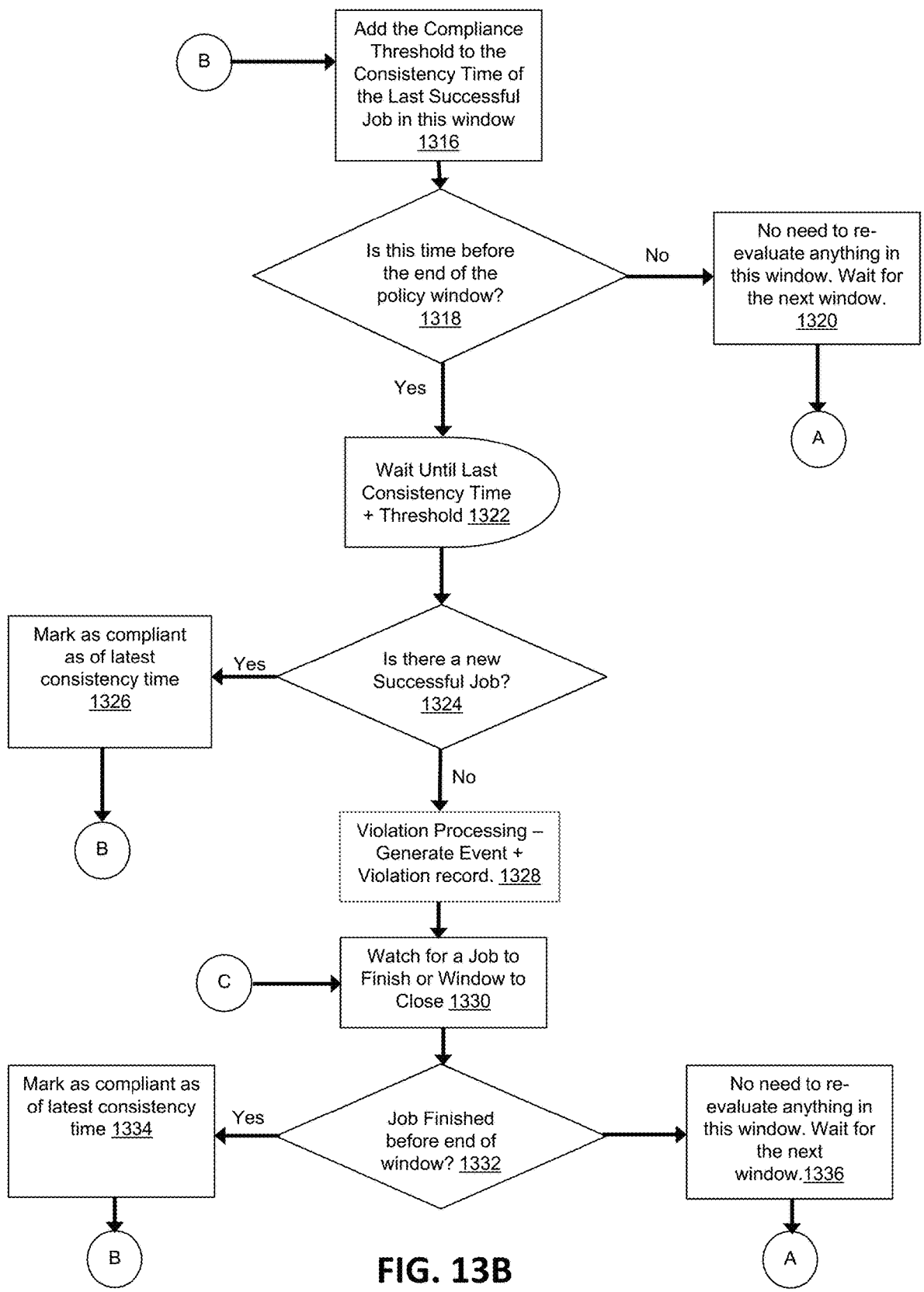

FIGS. 13A and 13B taken together are a flowchart showing a computerized method 1300 for calculating SLA compliance for a windowed schedule where more than 1 job is expected to start within the window, according to some embodiments of the present disclosure. An example would be a policy where a database needs to be backed up every hour from 9:00 am until 5:00 pm.

The method is a hybrid of that in FIG. 12, which describes the method used when one job is expected in a window, and FIG. 11, which describes the method for continuously executing policies. The first job uses the method from FIG. 12, while subsequent jobs use the method from FIG. 11.

At step 1302, the window period starts. The SLA compliance engine sets the SLA compliance status to pending at this time (step 1304) so that users will know that compliance with the current window has not yet been evaluated. At step 1306, the SLA compliance engine reads the compliance threshold from a data store such as a database. In one embodiment, the compliance threshold can be determined based on the attributes of the SLA 304. In another embodiment, it can be recorded in the SLA Store 904. In yet another embodiment, it can be received from the Service Level Policy Engine 406. In another embodiment, it may be configured by a user.

The SLA compliance engine then adds the compliance threshold to the start of the window and waits in step 1308. At step 1310, the system checks to see if there are any successful backups with a consistency time greater than the start of the window. This check is needed in case a job that started before this window such as the previous day ran long. In one embodiment, the SLA Compliance Engine 450 can check for new successful backups in the History Store 910.

If a successful job was found, step 1314 is executed and an SLA compliance event is recorded with a compliance time matching the start of the window. In one embodiment, the compliance time can be recorded in the Protection Catalog Store 908 or the History Store 910. In another embodiment, the Service Level Policy Engine 406 or the Management Workstation 308 can be notified of the compliance time. The system then moves to step 1316 to start evaluation of the next scheduled job.

If no successful job was found, step 1312 is executed and an SLA violation event is recorded with a violation time matching the start of the window. In one embodiment, violation time is recorded in the Protection Catalog Store 908 or the History Store 910. In another embodiment, the Service Level Policy Engine 406 or the Management Workstation 308 can be notified of the violation time. The system then moves to step 1330 to wait for either a job to finish successfully, or the window to end.

If the first job succeeded within its threshold, step 1316 is executed. The compliance threshold is added to the consistency time of the successful backup. In step 1318, the SLA compliance engine compares this time with the end of the window. If it is beyond the end of the window, the SLA compliance engine stops evaluation for that window in step 1320 and wait for the next window to open in step 1302.

If the next job is expected before the end of the window, the SLA compliance engine waits for that time in step 1322 and then checks to see if there is a new successful job in step 1324. If so, an SLA compliance event is recorded (step 1326) with a compliance time matching the consistency time of that new backup image. The compliance threshold is then added to that consistency time in step 1316 as the process repeats.

If no new job has been found, step 1328 is executed and an SLA violation is recorded. The SLA compliance engine then periodically checks in step 1330 for either a new successful backup to occur or the window to end. If a successful backup is found before the window ends (step 1332), a new SLA compliance event is recorded in step 1334 with a compliance time matching the consistency time of that new backup image. The compliance threshold is then added to that consistency time in step 1316 as the process repeats.

If no new backup images are found before the window ends (step 1336), the system waits for the start of the next window (step 1302).

Figure 14:
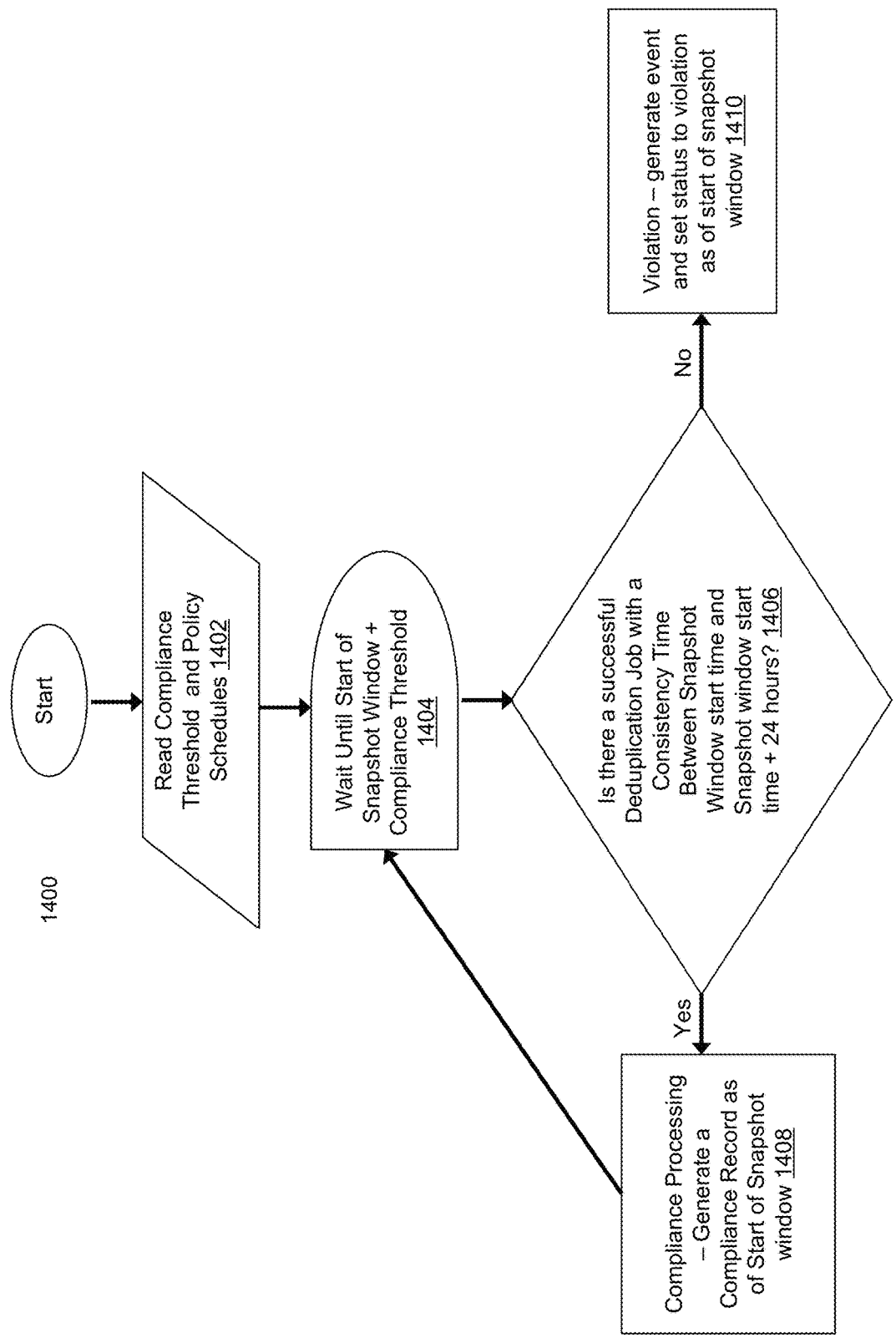
FIG. 14 is a computerized method 400 for calculating SLA compliance for a deduplication job schedule where the underlying snapshot job is scheduled to run once per day, according to some embodiments of the present disclosure.

FIG. 14 is a computerized method 1400 for calculating SLA compliance for a deduplication job schedule where the underlying snapshot job is scheduled to run once per day, according to some embodiments. As discussed above, it is common for backup software to store backup images in a lower cost or more efficient data store for long-term retention. This data store is typically a deduplication pool, online vault, or magnetic tape. These data stores have a longer recovery time than the primary data store such as a local disk copy or snapshot pool.

This method evaluates the success of this second-level copy based on the schedule of the underlying snapshot policy. In one embodiment, the snapshot policy can be included in SLA 304. Even if the deduplication policy calls for deduplication jobs to be attempted every 30 minutes, the actual jobs cannot be run more frequently than the underlying snapshots are created. Furthermore, the policy is evaluated based upon how long it takes for the deduplication job to complete from the start of the snapshot window. For example, if a user's snapshots are scheduled to run between 7 pm and 7 am, and there is a 24-hour threshold, the deduplication policy will be considered to be in compliance if a new deduplicated image is created by 7 pm the following day.

The method starts in step 1402 by reading all the policy schedules and the compliance threshold from a data store such as a database. In one embodiment, the policy schedules and the compliance threshold can be determined based on the attributes of the SLA 304. In another embodiment, they can be recorded in the SLA Store 904. In yet another embodiment, they can be received from the Service Level Policy Engine 406. In yet another embodiment, they can be configured by a user. The SLA compliance engine waits in step 1404 until the start of the snapshot window plus the compliance threshold. It then evaluates in step 1406 whether a successful dedup job ran since the start of the snapshot window that has a consistency time within 24 hours of the start of that window. This check is performed because a backup with a consistency time greater than 24 hours past the start of the snapshot window would apply to the following day, not the day being evaluated. In one embodiment, the SLA Compliance Engine 450 can check for a new successful dedup job in the History Store 910.

If a successful job was found, step 1408 is executed and an SLA compliance event is recorded with a compliance time matching the start of the snapshot window. This indicates that the policy is in compliance for the window, and will remain so until the start of the next window. In one embodiment, the compliance time can be recorded in the Protection Catalog Store 908 or the History Store 910. In another embodiment, the Service Level Policy Engine 406 or the Management Workstation 308 can be notified of the compliance time. If no successful job was found, step 1410 is executed and an SLA violation event is recorded with a violation time matching the start of the snapshot window. In one embodiment, violation time can be recorded in the Protection Catalog Store 908 or the History Store 910. In another embodiment, the Service Level Policy Engine 406 or the Management Workstation 308 can be notified of the violation time.

The SLA compliance engine then repeats the process, evaluating compliance for the following day. It goes back to step 1404 to wait until the start of that day's snapshot window plus the compliance threshold.

Figure 15:
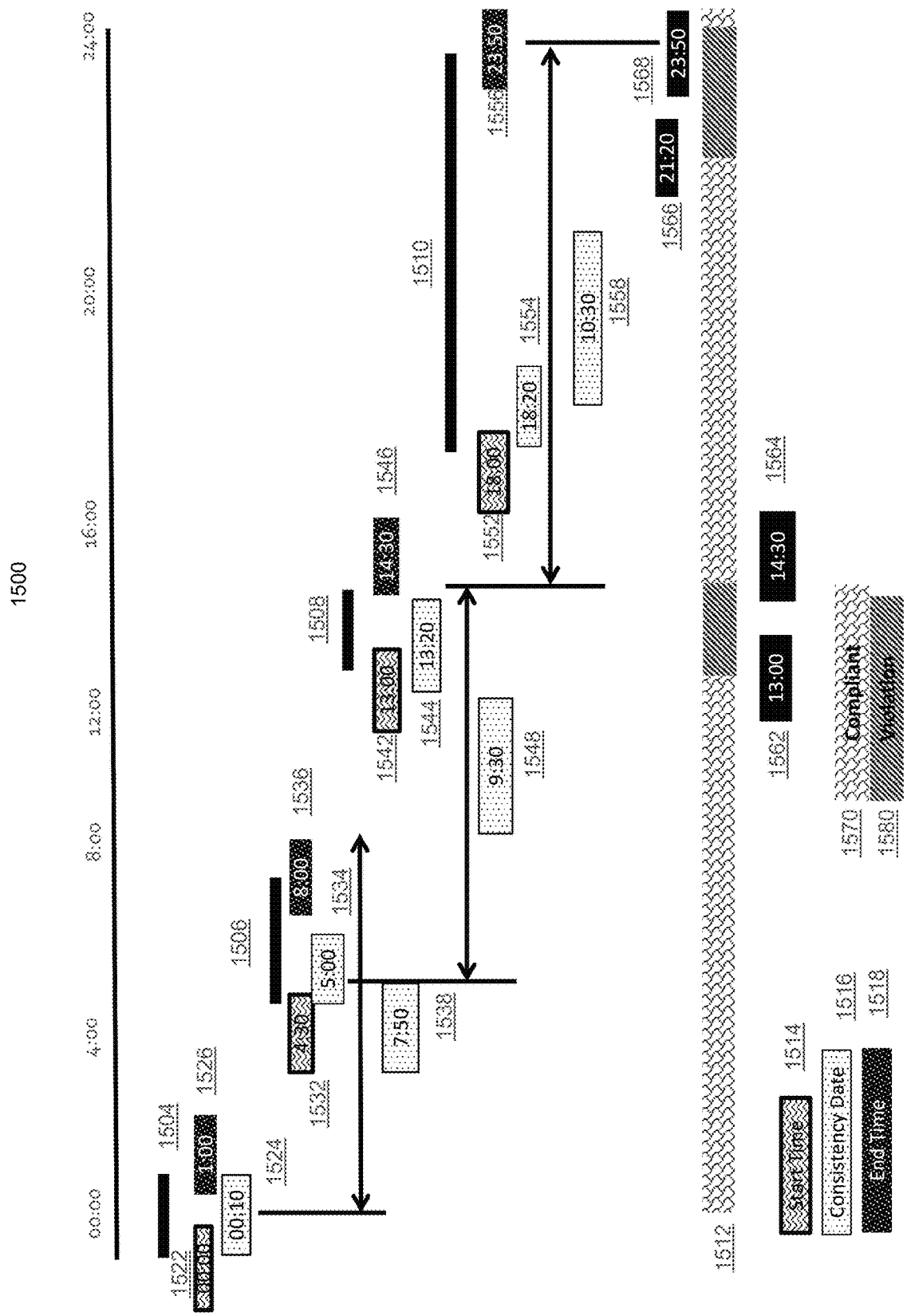
FIG. 15 is a timeline visualization 500 illustrating how SLA compliance calculations work and can be displayed to a user for a continuous policy, according to some embodiments of the present disclosure.

FIG. 15 is a timeline visualization 1500 illustrating how SLA compliance calculations work and can be displayed to a user for a continuous policy that has an 8-hour compliance threshold, according to some embodiments of the present disclosure. By way of example, and as shown in FIG. 15, the timelines for the various jobs can be:

| Job | Start Time (1514) | Consistency Time (1516) | End Time (1518) |
|---|---|---|---|
| Job 1 (1504) | 00:00 (1522) | 00:10 (1524) | 01:00 (1526) |
| Job 2 (1506) | 04:30 (1532) | 05:00 (1534) | 08:00 (1536) |
| Job 3 (1508) | 13:00 (1542) | 13:20 (1544) | 14:30 (1546) |
| Job 4 (1510) | 18:00 (1552) | 18:20 (1554) | 23:50 (1556) |

In the status bar 1512, FIG. 15 shows when a backup is in compliance 1570 or in violation 1580. In some embodiments, the status bar can be displayed to users to allow users to see when a policy is in compliance and when it is in violation. FIG. 15 also shows a start time 1514, consistency time 1516, and end time 1518 for each job.

Referring to job 1 1504, the start time of job 1 1504 is 0:00 1522, the consistency time of 1 is 00:10 1524, and the end time of 1 is 1:00 1526. At the completion of 1 at 1:00, the backup job is marked compliant.

Referring to job 2 1506, the start time of job 2 1506 is 4:30 1532, the consistency time of job 2 is 5:00 1534, and the end time of job 2 is 8:00 1536. Because job 2 1506 ends within 8 hours (which is the set compliance window) of the consistency time of job 1 1524, the backup is still marked compliant. Specifically, the end of job 2 (i.e., 8:00) minus the consistency time of job 1 (i.e., 00:10) is a duration of 7 hours and 50 minutes 1538, which is less than 8 hours.

Referring to job 3 1508, the start time of job 3 1508 is 13:00 1542, the consistency time of job 3 is 13:20 1544, and the end time of job 3 is 14:30 1546. Because job 3 1508 ends more than 8 hours after the consistency time of job 2 1534, the backup is marked in violation. The violation period begins at 13:00 1562, which is 8 hours after the consistency time of job 2 and lasts until the completion of job 3, which is 14:30 1564. Specifically, the end of job 3 (i.e., 14:30) minus the consistency time of job 2 (i.e., 05:00) is a duration of 9 hours and 30 minutes 1548, which is greater than 8 hours.

Referring to job 4 1510, the start time of job 4 1510 is 18:00 1552, the consistency time of job 4 is 18:20 1554, and the end time of job 4 is 23:50 1546. Because job 4 1510 ends more than 8 hours after the consistency time of job 3 1544, the backup is marked in violation. The violation period begins at 21:20 1566, which is 8 hours after the consistency time of job 4 and lasts until the completion of job 4, which is 23:50 1556. Specifically, the end of job 4 (i.e., 23:50) minus the consistency time of job 3 (i.e., 18:20) is a duration of 10 hours and 30 minutes 1558, which is greater than 8 hours.

Figure 16:
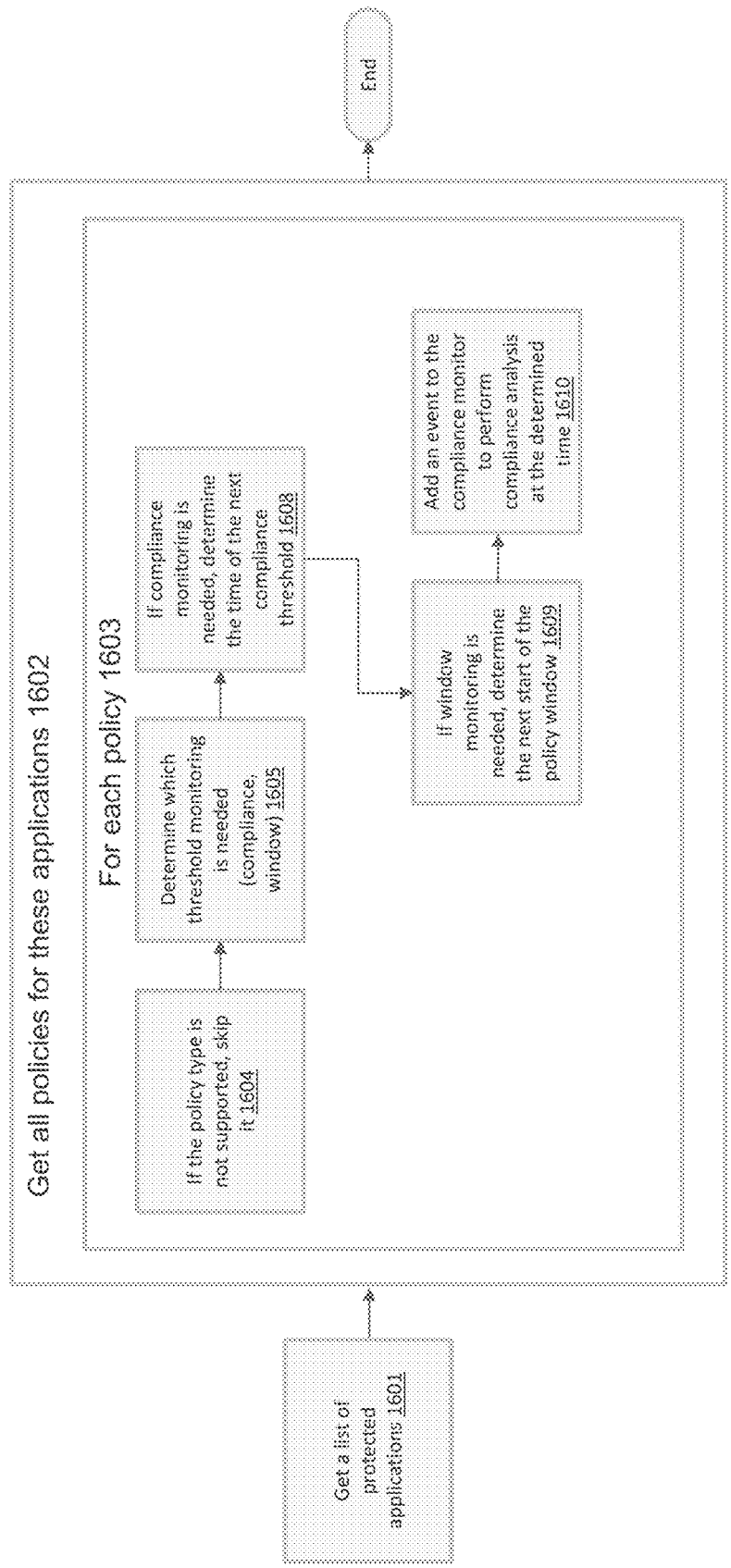
FIG. 16 is a diagram of the compliance monitoring startup process 600, according to some embodiments of the present disclosure.

FIG. 16 is a diagram of the compliance monitoring startup process 1600, according to some embodiments of the present disclosure.

The SLA compliance engine queries the persistent data store for a list of all protected applications 1601. It does this by checking the data store for any application that has at least one policy associated with it and is flagged as active. In one embodiment, the SLA Compliance Engine 450 can query the Service Level Policy Engine 406. The policies can be stored in the SLA Store 904.

Referring to step 1602, the SLA compliance engine retrieves policies for the protected applications 1602. The policies for a given application are contained in the persistent data store 2600 (FIG. 26). An active application can have one or more policies, for example, Service Level Policies 705, associated with it which define the SLA details for the application.

Then a process loops over the list of applications 1602 and for each policy 1603 (e.g., Service Level Policies 705) the SLA compliance engine and performs the following steps:

Referring to step 1604, if the policy is not of a type that is supported for compliance analysis, the policy is skipped and the next policy is examined. A policy type is considered supported if its data contains sufficient information to act as inputs to the compliance calculation. If the policy is defined in a way where it is impossible to determine when a job should run in the future then the policy is not supported for compliance analysis.

Referring to step 1605, the SLA compliance engine then determines which type of compliance analysis is to be performed (e.g., compliance, end of window, return to compliance), assuming that the policy is of a type that is supported for compliance analysis. The type of analysis is defined when the schedule record is created, as shown and described in FIG. 12 and accompanying text. The method for determining the type of analysis is outlined in FIG. 25.

If compliance monitoring is needed, determine the time of the next compliance analysis 1608, as shown and described in FIG. 12 and accompanying text. The event details contain the application and the type of monitoring event that is desired as well as the time after which the analysis should be performed. The scheduling system persists this information to the Monitoring Event Schedule database 2800 (FIG. 28) to ensure that the information is durable. Monitoring events are defined as a type of analysis (compliance, start of window, etc.) and the point in time at which that analysis needs to be performed.

If start of window monitoring is needed, determine the start of the next policy window 1609. If compliance and/or window monitoring is needed, add events to the scheduling system to perform the analysis at the given time in the future.

Figure 17:
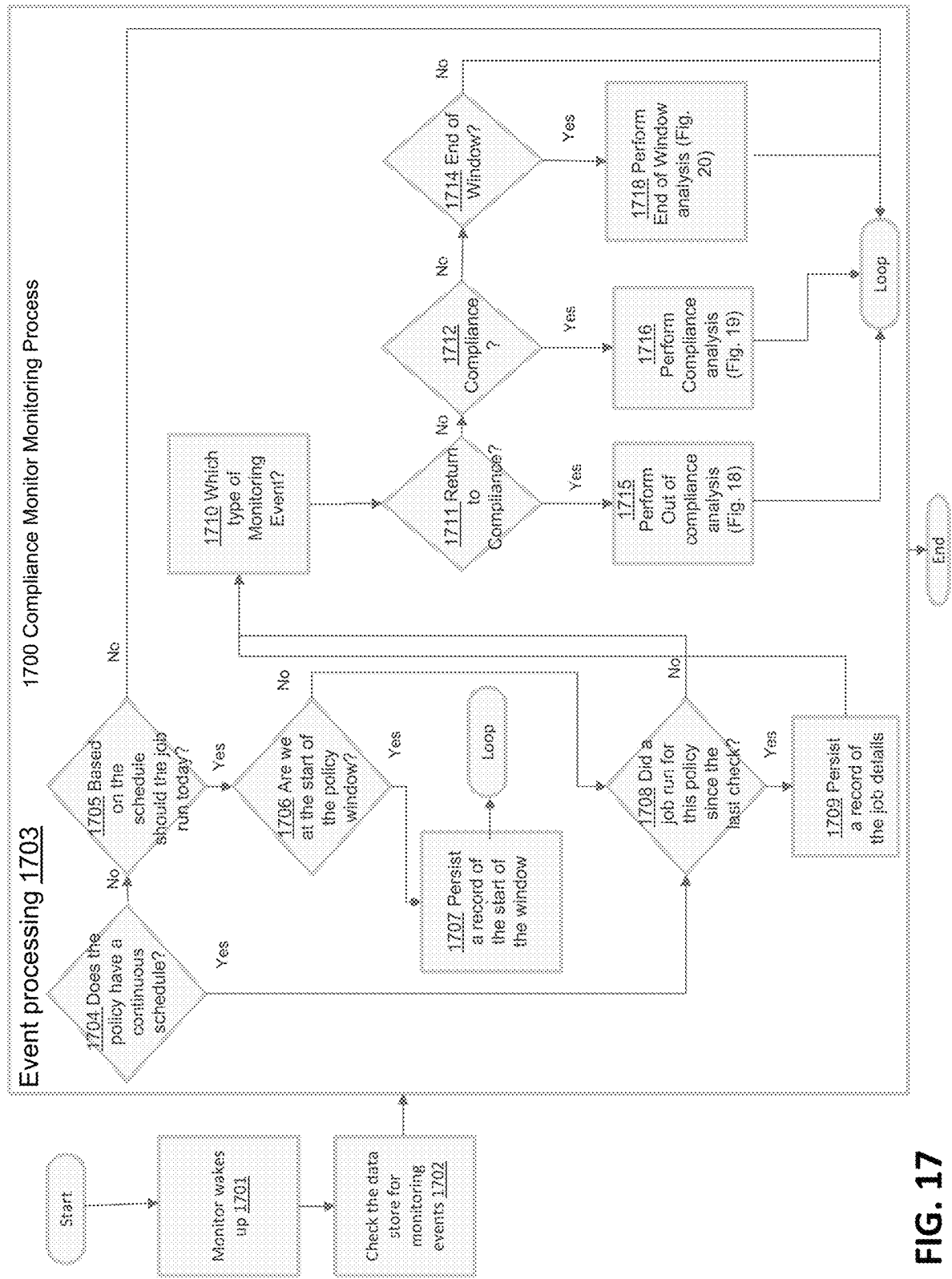
FIG. 17 is a diagram of the Compliance Monitor monitoring process 700, according to some embodiments of the present disclosure.

Referring to step 1610, the system adds an entry to the Monitor Event Schedule database (FIG. 28) to perform compliance analysis at the determined time, as described in more detail in FIG. 17 and accompanying text.

FIG. 17 is a diagram of the compliance monitoring process 1700, according to some embodiments.

At set intervals, the SLA compliance engine wakes up from a dormant state 1701. The interval is determined at the start of the scheduler process. The interval can be configured by the user or can be set as a default value. For example, the compliance monitoring process can run by default every 15 minutes. The length of the compliance monitoring wake up interval should be substantially less than the shortest period for any policy. This allows for finer granularity in the monitoring process especially in the case of return to compliance analysis.

The SLA compliance engine then checks the Monitoring Event Schedule Database (FIG. 28) for any monitoring events that need to be handled since the last time it ran 1702. It does this by examining the scheduled date for any scheduled events where the scheduled date is after the last time the process was run and before the current time. For each monitoring event the SLA compliance engine performs the following process 1703.

The SLA compliance engine checks to see if the policy (as defined in FIG. 26) has a continuous schedule 1704. As described above, a continuous schedule is one that repeats at a specified time interval. In some embodiments, if the policy's definition does not contain start and end times or if the span of the start and end times are greater than 23 hours and 55 minutes, the SLA compliance engine views the policy as continuous. In one embodiment, the type of schedule can be determined by the attributes of the Service Level Agreement 304, or the information contained in the Service Level Policy discussed above.

If the policy does not have a continuous schedule, the SLA compliance engine examines the policy and checks if a job should run on the given calendar day 1705. This is determined by examining the policy schedule, specifically the schedule type (daily, weekly, etc.) and any exclusions to that schedule (every other Tuesday, the last Sunday of the month, etc.). If a job is not expected, the process skips this monitoring event.

If a job is expected, the SLA compliance engine 450 checks if the policy is at the start of its operational window 1706. This is done by checking the start time of the policy and comparing it to the time the last analysis was run. If the start time is between the last time the analysis was run and the current time, the policy is at the start of its window, and a record of the start of the policy window is persisted to the Compliance History database 2400 (FIG. 24) 1707 and the next analysis is scheduled and the SLA compliance engine loops to the next monitoring event. If the schedule was determined to be continuous in 1704 or if a job was expected in 1705 and it is not the start of the policy window, the SLA compliance engine next checks if a job has run for the given policy since the last check by comparing the end dates of the jobs to the most recent entry in the Compliance history database 2400 (FIG. 24) for the given policy 1708. The SLA Compliance engine does this by querying the Job History Database 2700 (FIG. 27) for history of any jobs that had been run for the policy since the last check was made. In one embodiment, the SLA Compliance Engine 450 can check for jobs in the Protection Catalog Store 908 or the History Store 910. In another embodiment, it can check with the Service Level Policy Engine 406. If it has, the monitor persists the job details to the Compliance history database 2400 (FIG. 24) 1709. Next, the type of monitoring event is checked to determine which type of analysis to perform 1710. For example, the analysis could be one of the methods of FIGS. 18-20. The type of monitoring is included in the record for the monitoring event. If the monitoring event is a return to compliance monitoring 1711, out of compliance analysis is performed 1715 (see FIG. 18). If the monitoring event is compliance monitoring 1712, compliance analysis is performed 1716 (see FIG. 19). If the monitoring event is for end of policy window analysis 1714, then end of window analysis is performed 1718 (see FIG. 20). Once the desired analysis is performed, the process loops, repeating steps 1704-1718 for the next monitoring event.

Figure 18:
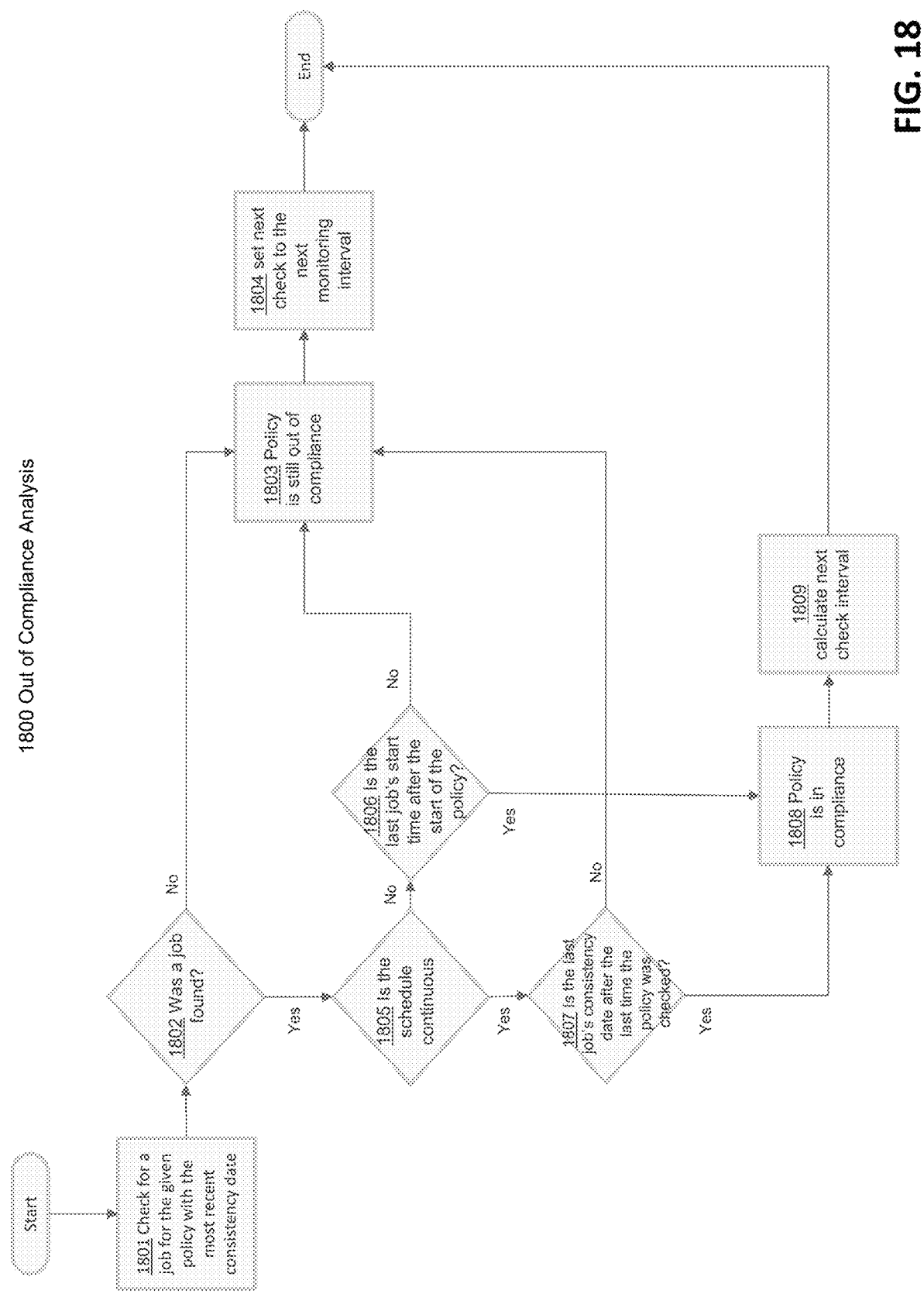
FIG. 18 is a diagram of the out of compliance analysis process 800, according to some embodiments of the present disclosure.

FIG. 18 is a diagram of the out of compliance analysis process 1800, according to some embodiments of the present disclosure. The process can be performed by the SLA compliance engine, 450. The process starts by checking the job history database 2800 (FIG. 28) for a job from the given policy with the most recent consistency date 1801. The consistency date is the point in time that the backup data reflects. It then checks if such a job exists by querying the Job History database 2700 (FIG. 27) for a job in the history that matches those criteria 1802. If a job is not found, the policy is determined to be out of compliance 1803. The Monitoring Event Schedule database 2800 (FIG. 28) is updated to set the next analysis time for the given policy to be the next compliance monitoring analysis interval as defined in the Policy database 2600 (FIG. 26) 1804. If the job does exist, the policy's schedule is checked to determine if the schedule is continuous 1805. If the schedule is not continuous, the job's consistency date is compared to the last time the analysis was run for the given policy 1807. The last time the analysis was run is included in the data for the analysis event in the compliance history database 2400 (FIG. 24). If the compliance date is later than the last time the policy was analyzed, the policy is found to be in compliance 1808. A new entry is added to the Monitoring Event Schedule database (FIG. 26) with the next time the policy needs to be analyzed for out of compliance 1809. This time is the current time plus the compliance interval for the given policy. If the compliance date is not later than the time of the last analysis, the policy is found to be out of compliance 1803 and an entry is added to the Monitoring Event Schedule database 2600 (FIG. 26) to analyze the policy again in the next compliance analysis interval 1804. If the schedule was determined not to be continuous in 1805, the job's start time is compared to the last start of the policy's operating window 1806. If the job is later than the start of the policy window, the policy is determined to be in compliance 1808 and an entry is added to the Monitoring Event Schedule database (FIG. 26) where the next check time is set to the current time plus the policy's check interval 1809.

Figure 19:
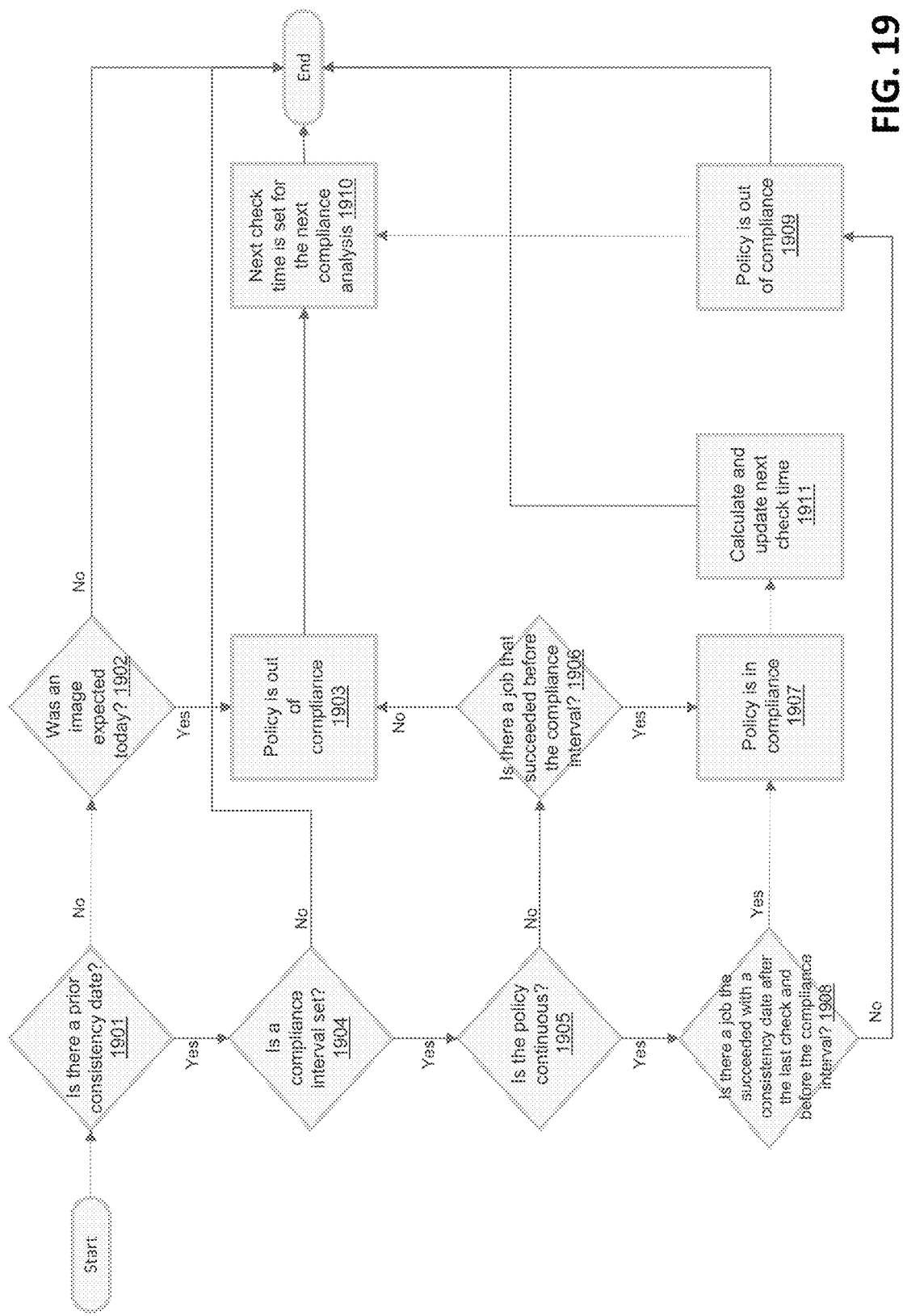
FIG. 19 is a diagram of the compliance analysis process 900, according to some embodiments of the present disclosure.

FIG. 19 is a diagram of the compliance analysis process 1900, according to some embodiments of the present disclosure. The process can be performed by the SLA compliance engine, 450. The process starts by checking the Job History Database 2700 (FIG. 27) for a backup from the given policy with the most recent consistency date 1901. If no prior successful backups were found, the process checks if an image was expected for the given day 1902. This is determined by examining the policy schedule, specifically the schedule type (daily, weekly, etc.) and any exclusions to that schedule (every other Tuesday, the last Sunday of the month, etc.). If there was an image expected, the policy is found to be out of compliance 1903. An entry is added to the Monitoring Event Schedule database (FIG. 28) with a next check time for the given policy set to the next compliance analysis interval 1910. If no image was expected, the analysis for the given policy is skipped. If a prior consistency date was found in 1901, the process checks if a compliance interval is configured for the policy 1904. This is done by querying the Policy database 2600 (FIG. 26) for the compliance interval for the given policy. A compliance interval specifies the amount of time that is allowable to elapse between backup images. If no compliance interval was set, analysis for the policy is skipped. If an interval is set, the policy is checked to see if its schedule is continuous 1905.

If it is continuous, the process checks the Job History database (FIG. 27) for a successful job for the given policy with a consistency date after the last time the policy was analyzed and before the compliance threshold 1908. If one is found 1906, the policy is determined to be in compliance 1907 and an entry is added to the Monitoring Event Schedule database 2800 (FIG. 28) with a check time for the policy set to the consistency time of the last image plus the compliance interval 1911. If not, the policy is found to be out of compliance 1909 and an entry is added to the Monitoring Event Schedule database 2800 (FIG. 28) with a check time is set to the next compliance analysis interval 1910.

If it is not continuous, the analysis checks the Job History database 2700 (FIG. 27) to see if there was as successful job that occurred after the start of the policy window and before the compliance threshold. If there is not a successful job, the policy is found to be out of compliance 1903. An entry is added to the Monitoring Event Schedule database 2800 (FIG. 28) for the given policy to check for return to compliance at the next compliance analysis interval 1910. If there is a successful job, the policy is found to be in compliance 1907 and the next check time for the policy is set in the Monitoring Event Schedule database (FIG. 28) to the current time plus the compliance threshold as defined in the policy 1911.

Figure 20:
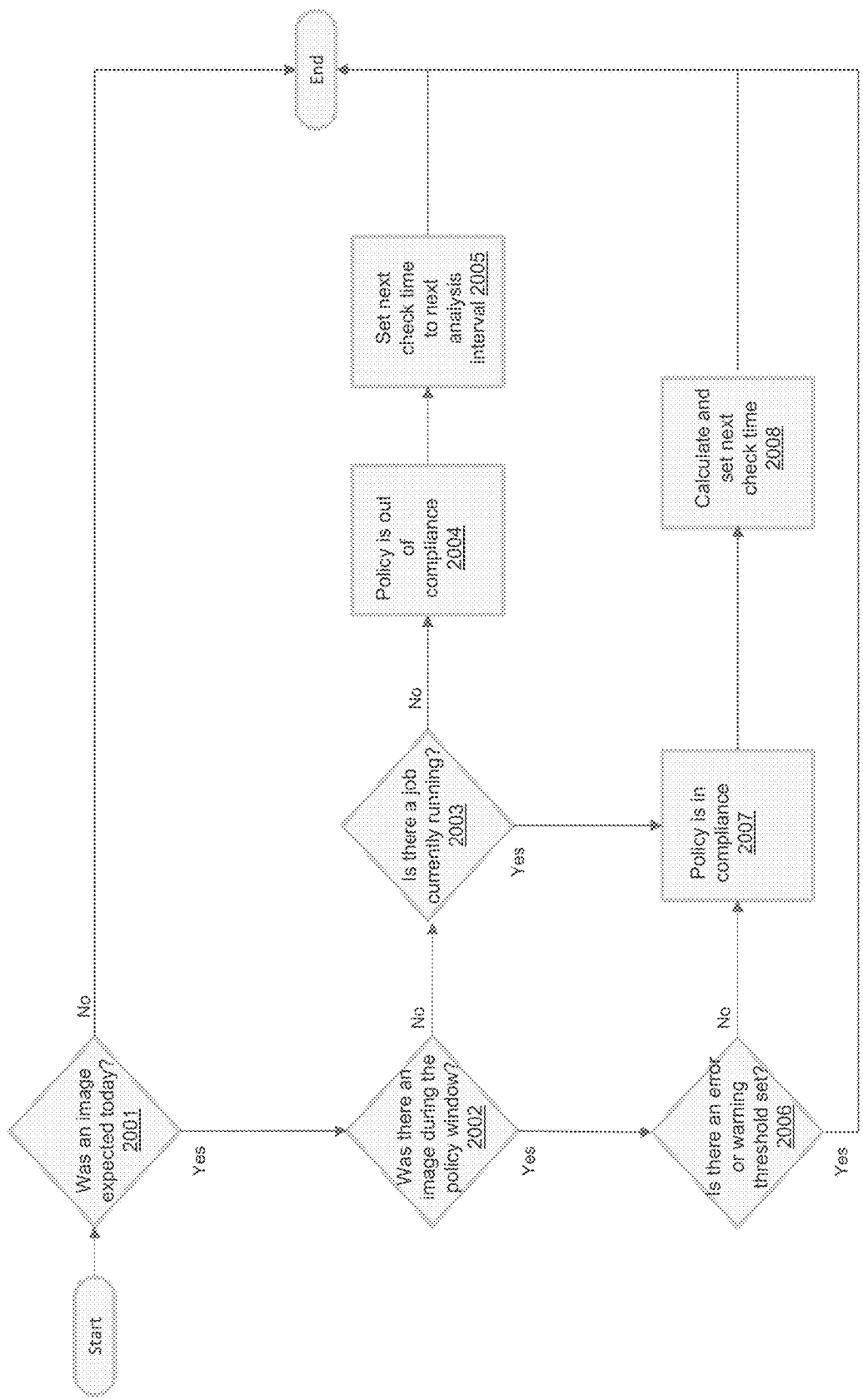
FIG. 20 is a diagram of the end of the policy window analysis 2000, according to some embodiments of the present disclosure.

FIG. 20 is a diagram of the end of the policy window analysis 2000, according to some embodiments of the present disclosure. The process can be performed by the SLA compliance engine, 450. The process starts by checking if an image is expected for the given day 2001. This is determined by examining the policy schedule, specifically the schedule type (daily, weekly, etc.) and any exclusions to that schedule (every other Tuesday, the last Sunday of the month, etc.). If an image is expected, the process checks the protection catalog store 908 for a new image taken during the policy window 2002. If there is a new image, the process checks if a compliance interval is set for the given policy 2006. If there is a compliance interval set, the analysis exits with no compliance determination—that is the system does not make a decision whether the policy is in or out of compliance. If there is no compliance interval set, the policy is found to be in compliance 2007. The process then determines and schedules the next time to check the given policy (see FIG. 21) 2008. If no new image was found in 2002, the analysis checks the Job History database (FIG. 27) for a record of a job for the given policy currently running 2103. If there is a job currently running, the policy is found to be in compliance 2007 and the next analysis time is calculated and scheduled (see FIG. 21) 2008. If there is no running job, the policy is found to be out of compliance 2004. The policy is scheduled to be checked again at the next analysis interval 2005.

Figure 21:
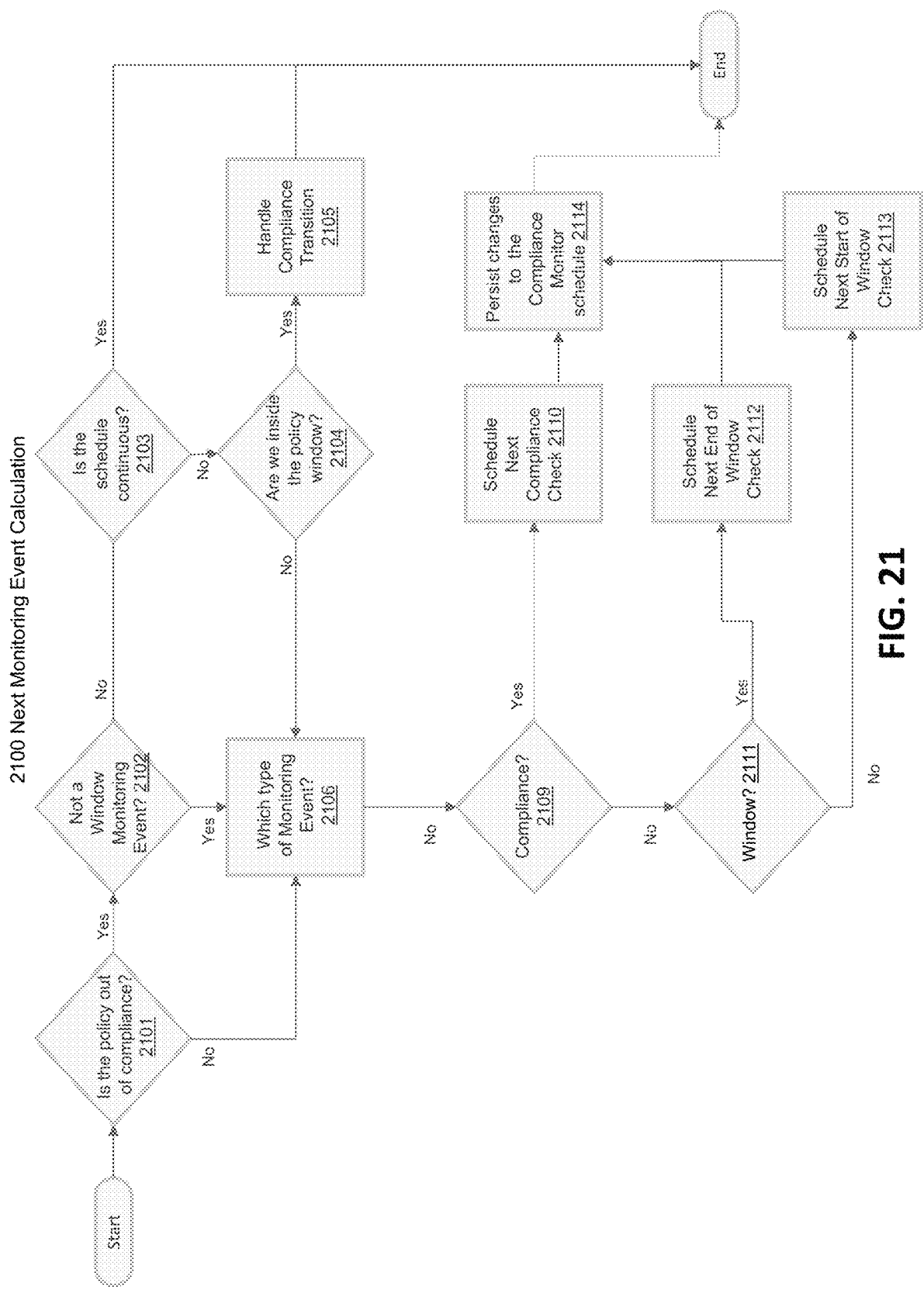
FIG. 21 describes the process of calculating the next monitoring event for a given policy 2100, according to some embodiments of the present disclosure.

FIG. 21 describes the process of calculating the next monitoring event for a given policy 2100, according to some embodiments of the present disclosure. The process can be performed by the SLA compliance engine, 450. The calculation starts by checking the Compliance History database 2400 (FIG. 24) to determine if the policy is currently out of compliance 2101. If it is, the SLA compliance engine 450 checks if it is being calculated for an end of policy window monitoring event 2102. If it is not an end of policy window monitoring event, the SLA compliance engine checks if the policy is continuous 2103. If it is continuous, the calculation ends, not setting a new time for the next monitoring event. If it is not continuous, the calculation checks if the calculation is being performed during the policy's operational window 2104. This is determined by examining the policy schedule, specifically the schedule type (daily, weekly, etc.) and any exclusions to that schedule (every other Tuesday, the last Sunday of the month, etc.) and determining if the current time is between the start time and end time of the policy. If it is during the policy's window, a compliance transition is handled 2105. If it is not during the policy window in 2104, it is a window monitoring event in 2102 or the policy is determined to be in compliance in 2101, the calculation determines what type of monitoring event the calculation is for 2106. If it is a compliance monitoring event 2109, the next compliance check is scheduled 2110. The change is persisted to the persistent data store 2114 and the calculation exits. If it is a windowed monitoring event 2111, the next end of window check is scheduled for the given policy 2112. The change is persisted to the persistent data store 2114 and the calculation exits. If it is not a compliance or end of window monitoring event, the next start of policy window monitoring event is scheduled 2113 and persisted to the persistent data store 2114 and the calculation exits.

Figure 22:
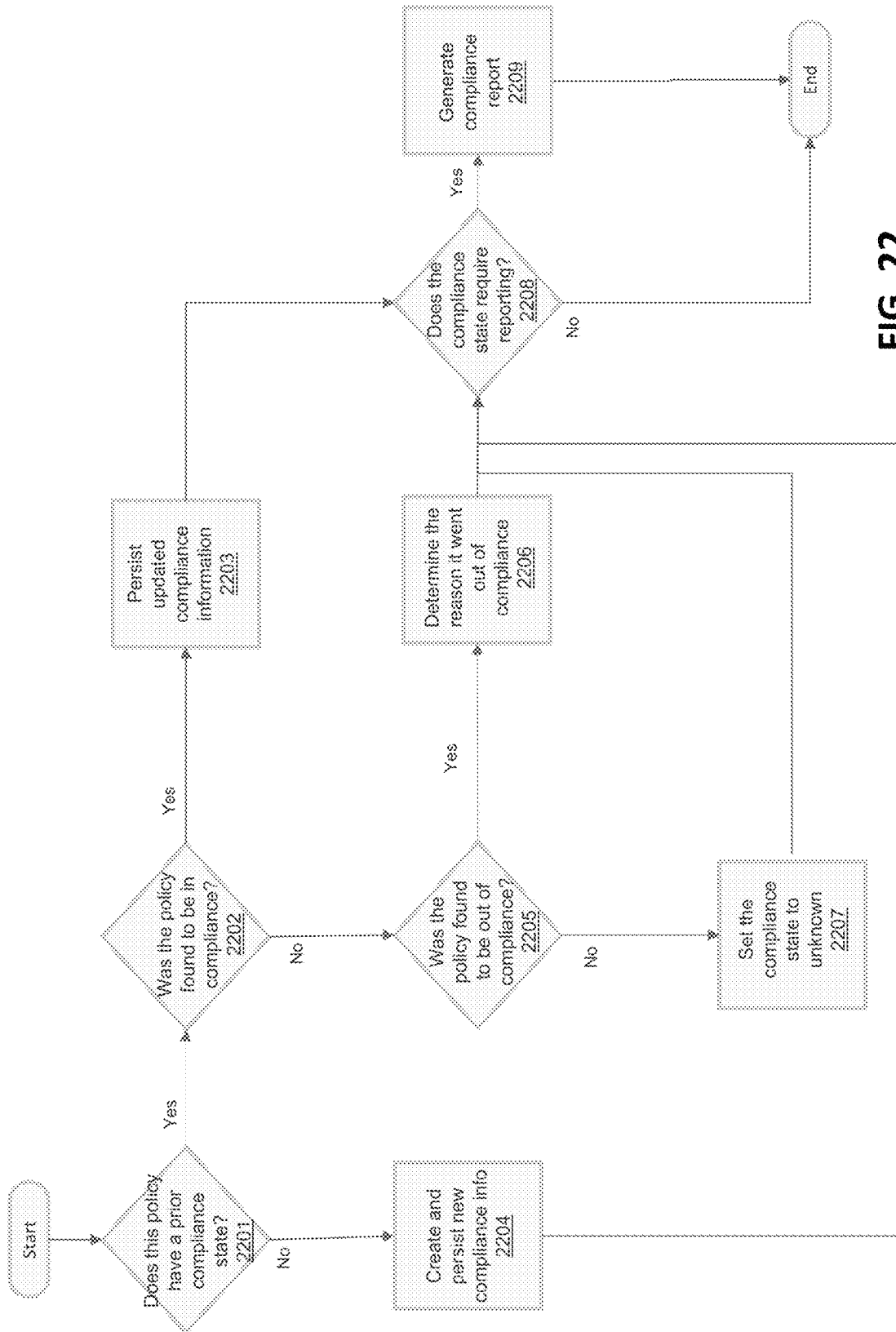
FIG. 22 is a diagram of the compliance transition handling process 2200, according to some embodiments of the present disclosure.

FIG. 22 is a diagram of the compliance transition handling process 2200, according to some embodiments. The process can be performed by the SLA compliance engine, 450. The process starts by checking the policy's compliance history in the Compliance History database (FIG. 24) to determine if the given policy has a previous compliance state 2201. If it does not, a new compliance history object is created and persisted to the Compliance History database 2400 at step 2204. This object contains information to uniquely identify the policy and its current compliance state. If this compliance transition requires reporting 2208, a compliance report is generated 2209 and the process exits. Whether or not a compliance transition requires reporting is determined by user configuration and is specified by the type of compliance transition. For instance, a user, for example at Management workstation 308, can select to have transitions out of compliance reported but not transitions back to compliance. If there is a prior compliance state found in 2201, the process checks if the policy is transitioning into 'compliance' 2202. If it is, the compliance info object is updated and persisted to the Compliance History Database 2400 2203. If the transition requires reporting 2208, a compliance report is generated 2209 and the process exits. A compliance report contains information to identify the policy, the application associated with the policy, and information about the transition—why type of transition it is, when the transition occurred and any information about what cause the transition to occur. If the policy is not transitioning into 'compliance' in 2202, the process checks if the transitions is to 'out of compliance' 2205. If it is not, the compliance state is set to 'unknown' and persisted 2206. The process then attempts to determine a reason that the compliance state is unknown 2206. If this compliance transition requires reporting 2208, a compliance report is generated 2209 and the process exits. The report could be delivered in a variety of formats based on user preferences such as SNMP traps, email, pdfs, etc.) If the compliance transition is to 'out of compliance' in 2205, the process attempts to determine the reason that the policy is out of compliance 2206. If this compliance transition requires reporting 2208, a compliance report is generated 2209 and the process exits.

Figure 23:
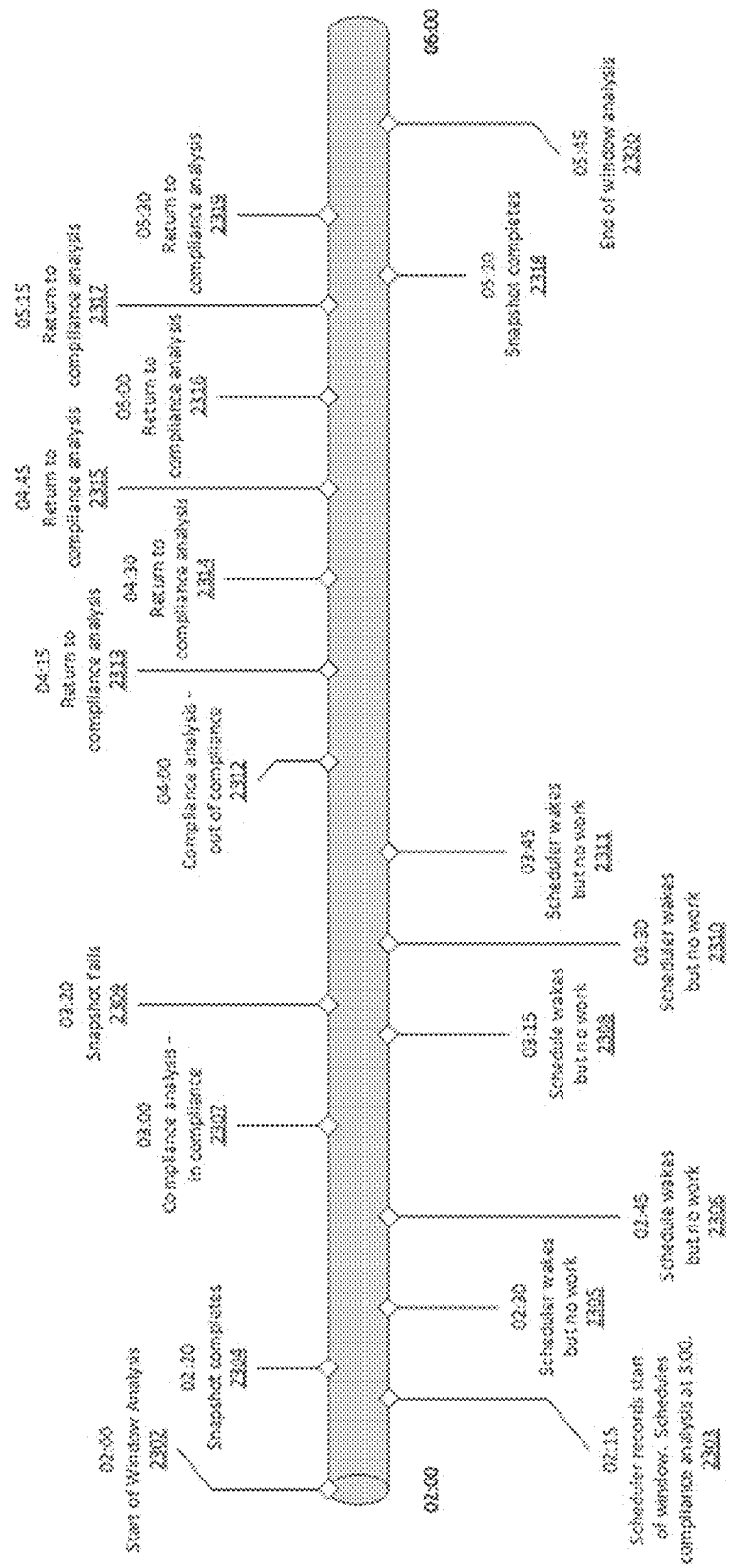
FIG. 23 is a diagram of an example compliance analysis timeline 2300, according to some embodiments of the present disclosure.

FIG. 23 is a timeline visualization of compliance monitoring, according to some embodiments of the present disclosure. It details a windowed policy that is scheduled to run from 02:00 to 05:45 and should take a snapshot every hour. The user has configured a compliance interval of 1 hour in policy details 2301. The policy window starts at 02:00 2302. At 02:15, the compliance engine wakes up and records that the policy was at the start of its window. It schedules a compliance analysis for 03:00 2303. At 02:20 the application's snapshot completes successfully 2304. At 02:30, the compliance engine wakes up but finds there is nothing to do since there are no compliance events that need to be processed 2305. The same thing happens at 02:45 2306. At 03:00 the compliance engine wakes and sees that a compliance analysis needs to be performed. Since there was a snapshot at 02:20, this falls within the 1-hour compliance interval and the policy is found to be in compliance. It schedules a compliance analysis for 04:00, an hour from the last analysis 2307. The scheduler wakes at 03:15 but finds there are no analyses to perform 2308. At 03:20 a snapshot fails 2309. At 03:30 and 03:45 the compliance engine wakes but find there is no analysis to perform 2310-2411. At 04:00 the compliance engine wakes and runs a compliance analysis. Since the last snapshot happened at 02:20, which is more than an hour in the past, the policy is found to be out of compliance. A return to compliance analysis is scheduled for the next analysis interval at 04:15 2312. At 04:15. 04:30, 04:45, 05:00 and 05:15 the compliance engine wakes and runs a return to compliance analysis 2313-2317. Since there has not been a successful backup during these intervals, the policy is viewed as remaining out of compliance and another return to compliance analysis is scheduled for the following analysis interval. At 05:20 there is a successful backup 2318. At 05:30 the compliance engine wakes up and runs a return to compliance analysis 2319. Since there has been a new snapshot within the last hour, the policy is seen as returning to compliance. Since the policy window ends in less than the one-hour compliance interval, no further compliance analysis is scheduled. Instead an end of window analysis is scheduled for 05:45. At 05:45 the compliance engine wakes and runs an end of window analysis 2320. Since the policy is currently in compliance, it remains in compliance. A start of window analysis is scheduled for 02:00 the next day.

Figure 25:
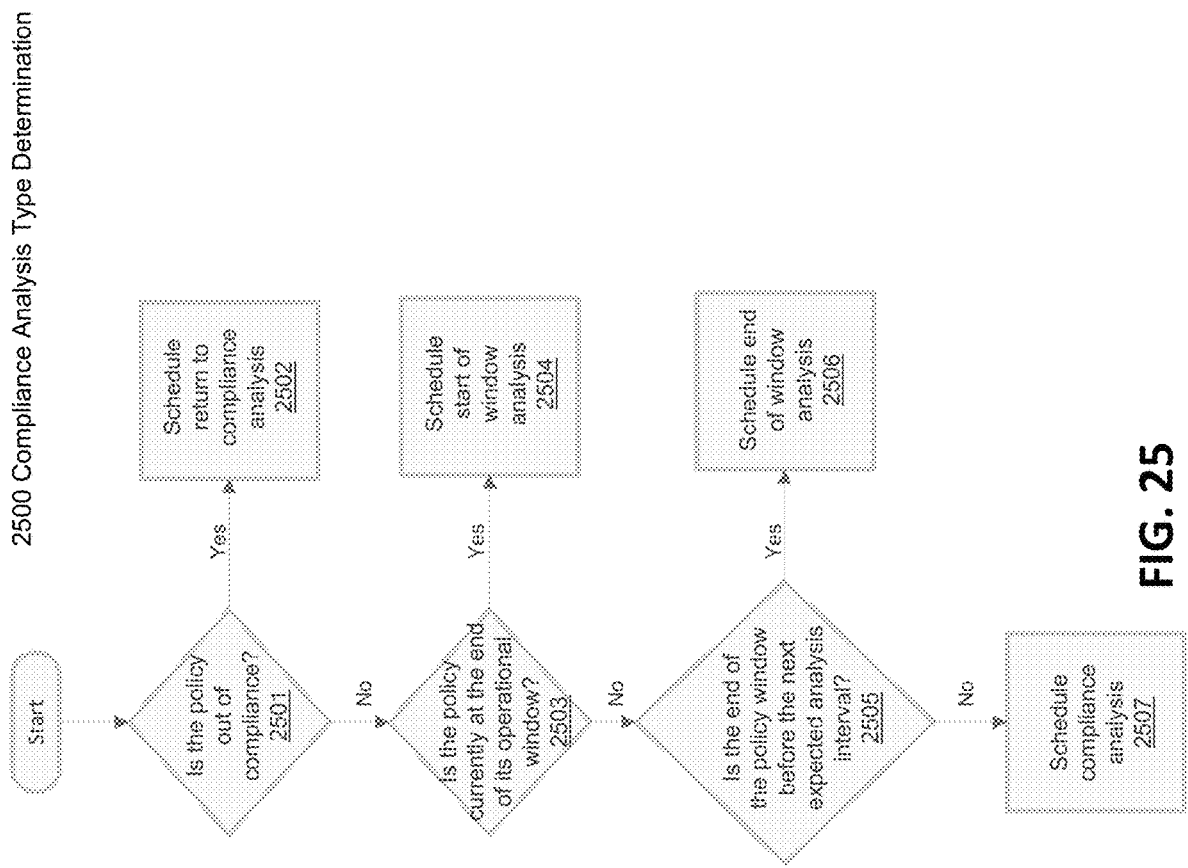
FIG. 25 is a diagram of a compliance type determination 2500, according to some embodiments of the present disclosure.

FIG. 25 describes the how the SLA compliance engine determines what type of analysis should be performed at the next monitoring event according to some embodiments of the present disclosure. The SLA compliance engine first checks the most recent entry in the Compliance History database (FIG. 24) to determine if the policy is currently out of compliance 2501. If it is then the next monitoring event is configured to perform a return to compliance analysis and it is persisted to the Monitoring Event Schedule database 2800 (FIG. 28) 2502. The SLA compliance engine then checks if the current monitoring event performed an end of window analysis meaning that the policy is at the end of its operational window 2503. If it has then the next monitoring event should perform a start of window analysis and should be scheduled for the start of the policy's operational window. This monitoring event is persisted to the Monitoring Event Schedule database 2800 (FIG. 28) 2504. The time is determined by examining the start time of the policy in the Policy database 2600 (FIG. 26). If the current monitoring event did not perform an end of window analysis, the SLA compliance engine then determines when the next compliance check should occur based on the user's configuration of the compliance interval. It compares this time to the end of the operational window for the policy. It determines this by querying the Policy database (FIG. 26) 2505. If the end of the policy's operational window will occur before the next expected compliance check, then the next monitoring event should perform an end of window analysis at the time the operational window ends. This monitoring event is persisted to the Monitoring Event Schedule database 2800 (FIG. 289) 2706. If the end of the operational window is not before the next expected monitoring event then a compliance analysis should be performed. This monitoring event is persisted to the Monitoring Event Schedule database (FIG. 28) 2507.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the foregoing description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of iteratively determining compliance of a backup system with a service level agreement, the method comprising:
receiving, by a computing device, a service level policy, the service level policy being associated with a service level agreement representing a plurality of service level policies, each of the plurality of service level policies including a schedule for performing data management functions for a corresponding application, the schedule indicating a first backup time of a first backup job, the first backup job associated with:
a first backup job success status, the first backup job success status indicating one of a successful status, an unsuccessful status, and a running status, the successful status indicating that the first backup job succeeded, the unsuccessful status indicating that the first backup job failed, and the running status indicating that the first backup job is currently running, and
a first backup job consistency time when the first backup job is associated with the successful status, the first backup job consistency time indicating a restoration time associated with the first backup job;
determining, by the computing device, a first compliance analysis time and a service level policy schedule type, the service level policy schedule type being based on the service level policy, the service level policy schedule type comprising one of a windowed type and a continuous type, the first compliance analysis time being based on the service level policy schedule type and the first backup time;
determining, by the computing device, a first monitoring event associated with the first compliance analysis time, the first monitoring event associated with a first compliance analysis type, the first compliance analysis type including one of out-of-compliance, compliance, and end- of-window;
performing, by the computing device, a first compliance analysis associated with the first compliance analysis type to generate a first compliance status of the first monitoring event, the first compliance status including of one of an in-compliance status, an out-of-compliance status, and a no determination status, wherein the service level policy schedule type is associated with a compliance interval indicator when the service policy schedule type is associated with a compliance interval, the compliance interval comprising a maximum time window for performing a backup job to generate the in-compliance status; and
creating, by the computing device, a second monitoring event, the second monitoring event associated with a second analysis time and a second compliance analysis type, the second compliance analysis type being based on the first compliance status and including one of out of compliance, compliance, and end of window, the second analysis time being based on the first compliance status,
thereby iteratively determining compliance of a backup system with a service level agreement.

2. The computerized method of claim 1, wherein performing the first compliance analysis comprises performing out-of-compliance analysis when the first compliance analysis type is the out-of-compliance, further wherein performing the out-of- compliance analysis comprises:
generating, by the computing device, the first compliance status as the out-of-compliance status when one of:
the first backup job success status is the unsuccessful status, and
the first backup job success status is the successful status and one of:
the service level policy schedule type is the windowed type and the first backup time is before a start time of a current analysis window, and
the service level policy schedule type is the continuous type and the first backup job consistency time is before an analysis time of a last monitoring event;
generating, by the computing device, the first compliance status as the in-compliance status when one of:
the service level policy schedule type is the windowed type and the first backup time is after a start time of a current analysis window, and
the service level policy schedule type is the continuous type and the first backup job consistency time is after an analysis time of a last monitoring event; and
wherein creating the second monitoring event further comprises
setting the second compliance analysis type as out-of-compliance when the first compliance status is out-of-compliance status, and
setting the second compliance analysis type as compliance when the first compliance status is in-compliance status.

3. The computerized method of claim 1, wherein performing the first compliance analysis comprises performing compliance analysis when the first compliance analysis type is the compliance, further wherein performing the compliance analysis comprises:
generating, by the computing device, the first compliance status as the out-of-compliance status when one of:
the first backup job success status is the unsuccessful status and the first backup time is between the first analysis time and after an analysis time of a last monitoring event,
the first backup job success status is the successful status, the compliance interval indicator is compliance interval positive, the service level policy schedule type is the windowed type, and the first backup job consistency time is before the first analysis time less the consistency time, and
the first backup job success status is successful, the compliance interval indicator is compliance interval positive, the service level policy schedule type is the continuous type, and the first backup job consistency time is one of before the first analysis time less the consistency time and before an analysis time of a last monitoring event;
generating, by the computing device, the first compliance status as the in-compliance status when one of:
the first backup job success status is successful, the compliance interval indicator is compliance interval positive, the service level policy schedule type is the windowed type, and the first backup job consistency time is after the first analysis time less the consistency time, and
the first backup job success status is successful, the compliance interval indicator is compliance interval positive, the service level policy schedule type is the continuous type, the first backup job consistency time is after the first analysis time less the consistency time and after an analysis time of a last monitoring event; and generating, by the computing device, the first compliance status as the no determination status when one of:
    the first backup job success status is the unsuccessful status and the first backup time is outside the first analysis time and after an analysis time of a last monitoring event, and
    the first backup job success status is successful, the compliance interval indicator is compliance interval null.

4. The computerized method of claim 1, wherein performing the first compliance analysis comprises performing end-of-window analysis when the first compliance analysis type is the end-of-window, further wherein performing the end-of-window analysis comprises:
at the end of a current analysis window:
    generating, by the computing device, the first compliance status as the out-of-compliance status when the first backup time is between a start time and an end time of a current analysis window, and the first backup job success status is the unsuccessful status;
    generating, by the computing device, the first compliance status as the in-compliance status when one of:
        the first backup time is between a start time and an end time of the current analysis window, and the first backup job success status is the running status, and
        the first backup time is between a start time and an end time of the current analysis window, the first backup job success status is the successful status, and the compliance interval indicator is compliance interval positive; and
    generating, by the computing device, the first compliance status as the no determination status when one of:
        the first backup time is outside a start time and an end time of the current analysis window, and
        the first backup time is between a start time and an end time of a current analysis window, the first backup job success status is the successful status, and the compliance interval indicator is compliance interval null.

5. A computing system for iteratively determining compliance of a backup system with a service level agreement, the computing system comprising:
a processor;
a memory coupled to the processor and including instructions that, when executed by the processor, cause the processor to:
    receive a service level policy, the service level policy being associated with a service level agreement representing a plurality of service level policies, each of the plurality of service level policies including a schedule for performing data management functions for a corresponding application, the schedule indicating a first backup time of a first backup job, the first backup job associated with:
    a first backup job success status, the first backup job success status indicating one of a successful status, an unsuccessful status, and a running status, the successful status indicating that the first backup job succeeded, the unsuccessful status indicating that the first backup job failed, and the running status indicating that the first backup job is currently running, and
    a first backup job consistency time when the first backup job is associated with the successful status, the first backup job consistency time indicating a restoration time associated with the first backup job;
    determine a first compliance analysis time and a service level policy schedule type, the service level policy schedule type being based on the service level policy, the service level policy schedule type comprising one of a windowed type and a continuous type, the first compliance analysis time being based on the service level policy schedule type and the first backup time;
    determine a first monitoring event associated with the first compliance analysis time, the first monitoring event associated with a first compliance analysis type, the first compliance analysis type including one of out-of-compliance, compliance, and end-of-window;
    perform a first compliance analysis associated with the first compliance analysis type to generate a first compliance status of the first monitoring event, the first compliance status including of one of an in-compliance status, an out-of-compliance status, and a no determination status, wherein the service level policy schedule type is associated with a compliance interval indicator when the service policy schedule type is associated with a compliance interval, the compliance interval comprising a maximum time window for performing a backup job to generate the in-compliance status; and
    create a second monitoring event, the second monitoring event associated with a second analysis time and a second compliance analysis type, the second compliance analysis type being based on the first compliance status and including one of out of compliance, compliance, and end of window, the second analysis time being based on the first compliance status,
thereby iteratively determining compliance of a backup system with a service level agreement.

6. The computing system of claim 5, wherein the processor is further caused to perform out-of-compliance analysis when the first compliance analysis type is the out-of- compliance, further wherein to perform the out-of-compliance analysis the processor is further caused to:
generate the first compliance status as the out-of-compliance status when one of:
    the first backup job success status is the unsuccessful status, and the first backup job success status is the successful status and one of:
    the service level policy schedule type is the windowed type and the first backup time is before a start time of a current analysis window, and
    the service level policy schedule type is the continuous type and the first backup job consistency time is before an analysis time of a last monitoring event;
generate the first compliance status as the in-compliance status when one of:
    the service level policy schedule type is the windowed type and the first backup time is after a start time of a current analysis window, and
    the service level policy schedule type is the continuous type and the first backup job consistency time is after an analysis time of a last monitoring event; and
wherein to create the second monitoring event the processor is further caused to:
    set the second compliance analysis type as out-of-compliance when the first compliance status is out-of-compliance status, and
    set the second compliance analysis type as compliance when the first compliance status is in-compliance status.

7. The computing system of claim 5, wherein the processor is further caused to perform compliance analysis when the first compliance analysis type is the compliance, further wherein to perform the compliance analysis the processor is further caused to:
generate the first compliance status as the out-of-compliance status when one of:
the first backup job success status is the unsuccessful status and the first backup time is between the first analysis time and after an analysis time of a last monitoring event,
the first backup job success status is the successful status, the compliance interval indicator is compliance interval positive, the service level policy schedule type is the windowed type, and the first backup job consistency time is before the first analysis time less the consistency time, and
the first backup job success status is successful, the compliance interval indicator is compliance interval positive, the service level policy schedule type is the continuous type, and the first backup job consistency time is one of before the first analysis time less the consistency time and before an analysis time of a last monitoring event;
generate the first compliance status as the in-compliance status when one of:
the first backup job success status is successful, the compliance interval indicator is compliance interval positive, the service level policy schedule type is the windowed type, and the first backup job consistency time is after the first analysis time less the consistency time, and
the first backup job success status is successful, the compliance interval indicator is compliance interval positive, the service level policy schedule type is the continuous type, the first backup job consistency time is after the first analysis time less the consistency time and after an analysis time of a last monitoring event; and
generate the first compliance status as the no determination status when one of:
the first backup job success status is the unsuccessful status and the first backup time is outside the first analysis time and after an analysis time of a last monitoring event, and
the first backup job success status is successful, the compliance interval indicator is compliance interval null.

8. The computing system of claim 5, wherein the processor is further caused to perform end-of-window analysis when the first compliance analysis type is the end-of-window, further wherein to perform the end-of-window analysis the processor is further caused to:
at the end of a current analysis window:
generate the first compliance status as the out-of-compliance status when the first backup time is between a start time and an end time of a current analysis window, and the first backup job success status is the unsuccessful status;
generate the first compliance status as the in-compliance status when one of:
the first backup time is between a start time and an end time of the current analysis window, and the first backup job success status is the running status, and
the first backup time is between a start time and an end time of the current analysis window, the first backup job success status is the successful status, and the compliance interval indicator is compliance interval positive; and
generate the first compliance status as the no determination status when one of:
the first backup time is outside a start time and an end time of the current analysis window, and
the first backup time is between a start time and an end time of a current analysis window, the first backup job success status is the successful status, and the compliance interval indicator is compliance interval null.

9. A non-transitory computer readable medium having executable instructions operable to cause an apparatus to:
receive a service level policy, the service level policy being associated with a service level agreement representing a plurality of service level policies, each of the plurality of service level policies including a schedule for performing data management functions for a corresponding application, the schedule indicating a first backup time of a first backup job;
determine a first compliance analysis time and a service level policy schedule type, the service level policy schedule type being based on the service level policy, the service level policy schedule type comprising one of a windowed type and a continuous type, the first compliance analysis time being based on the service level policy schedule type and the first backup time, the first backup job associated with:
a first backup job success status, the first backup job success status indicating one of a successful status, an unsuccessful status, and a running status, the successful status indicating that the first backup job succeeded, the unsuccessful status indicating that the first backup job failed, and the running status indicating that the first backup job is currently running, and
a first backup job consistency time when the first backup job is associated with the successful status, the first backup job consistency time indicating a restoration time associated with the first backup job;
determine a first monitoring event associated with the first compliance analysis time, the first monitoring event associated with a first compliance analysis type, the first compliance analysis type including one of out-of-compliance, compliance, and end-of-window;
perform a first compliance analysis associated with the first compliance analysis type to generate a first compliance status of the first monitoring event, the first compliance status including of one of an in-compliance status, an out-of-compliance status, and a no determination status, wherein the service level policy schedule type is associated with a compliance interval indicator when the service policy schedule type is associated with a compliance interval, the compliance interval comprising a maximum time window for performing a backup job to generate the in-compliance status; and
create a second monitoring event, the second monitoring event associated with a second analysis time and a second compliance analysis type, the second compliance analysis type being based on the first compliance status and including one of out of compliance, compliance, and end of window, the second analysis time being based on the first compliance status,
thereby iteratively determining compliance of a backup system with a service level agreement.

10. The non-transitory computer readable medium of claim 9, wherein the apparatus is further caused to perform out-of-compliance analysis when the first compliance analysis type is the out-of-compliance, further wherein to perform the out-of-compliance analysis the apparatus is further caused to:
generate the first compliance status as the out-of-compliance status when one of:
the first backup job success status is the unsuccessful status, and
the first backup job success status is the successful status and one of:
the service level policy schedule type is the windowed type and the first backup time is before a start time of a current analysis window, and
the service level policy schedule type is the continuous type and the first backup job consistency time is before an analysis time of a last monitoring event;
generate the first compliance status as the in-compliance status when one of:
the service level policy schedule type is the windowed type and the first backup time is after a start time of a current analysis window, and
the service level policy schedule type is the continuous type and the first backup job consistency time is after an analysis time of a last monitoring event; and
wherein to create the second monitoring event the apparatus is further caused to:
set the second compliance analysis type as out-of-compliance when the first compliance status is out-of-compliance status, and
set the second compliance analysis type as compliance when the first compliance status is in-compliance status.

11. The non-transitory computer readable medium of claim 9, wherein the apparatus is further caused to perform compliance analysis when the first compliance analysis type is the compliance, further wherein to perform the compliance analysis the apparatus is further caused to:
generate the first compliance status as the out-of-compliance status when one of:
the first backup job success status is the unsuccessful status and the first backup time is between the first analysis time and after an analysis time of a last monitoring event,
the first backup job success status is the successful status, the compliance interval indicator is compliance interval positive, the service level policy schedule type is the windowed type, and the first backup job consistency time is before the first analysis time less the consistency time, and
the first backup job success status is successful, the compliance interval indicator is compliance interval positive, the service level policy schedule type is the continuous type, and the first backup job consistency time is one of before the first analysis time less the consistency time and before an analysis time of a last monitoring event;
generate the first compliance status as the in-compliance status when one of:
the first backup job success status is successful, the compliance interval indicator is compliance interval positive, the service level policy schedule type is the windowed type, and the first backup job consistency time is after the first analysis time less the consistency time, and
the first backup job success status is successful, the compliance interval indicator is compliance interval positive, the service level policy schedule type is the continuous type, the first backup job consistency time is after the first analysis time less the consistency time and after an analysis time of a last monitoring event; and
generate the first compliance status as the no determination status when one of:
the first backup job success status is the unsuccessful status and the first backup time is outside the first analysis time and after an analysis time of a last monitoring event, and
the first backup job success status is successful, the compliance interval indicator is compliance interval null.

12. The non-transitory computer readable medium of claim 9, wherein the apparatus is further caused to perform end-of-window analysis when the first compliance analysis type is the end-of-window, further wherein to perform the end-of-window analysis the apparatus is further caused to:
at the end of a current analysis window:
generate the first compliance status as the out-of-compliance status when the first backup time is between a start time and an end time of a current analysis window, and the first backup job success status is the unsuccessful status;
generate the first compliance status as the in-compliance status when one of:
the first backup time is between a start time and an end time of the current analysis window, and the first backup job success status is the running status, and the first backup time is between a start time and an end time of the current analysis window, the first backup job success status is the successful status, and the compliance interval indicator is compliance interval positive; and
generate the first compliance status as the no determination status when one of:
the first backup time is outside a start time and an end time of the current analysis window, and
the first backup time is between a start time and an end time of a current analysis window, the first backup job success status is the successful status, and the compliance interval indicator is compliance interval null.

* * * * *